United States Patent
Yoon et al.

(10) Patent No.: US 10,540,005 B2
(45) Date of Patent: Jan. 21, 2020

(54) MOBILE TERMINAL AND CONTROL METHOD THEREFOR

(71) Applicant: LG ELECTRONICS INC., Seoul (KR)

(72) Inventors: Sunghye Yoon, Seoul (KR); Sooyon Chung, Seoul (KR); Sujin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 15/764,431

(22) PCT Filed: Nov. 19, 2015

(86) PCT No.: PCT/KR2015/012482
§ 371 (c)(1),
(2) Date: Mar. 29, 2018

(87) PCT Pub. No.: WO2017/069324
PCT Pub. Date: Apr. 27, 2017

(65) Prior Publication Data
US 2018/0275749 A1    Sep. 27, 2018

(30) Foreign Application Priority Data

Oct. 22, 2015  (KR) .................. 10-2015-0147203
Oct. 22, 2015  (KR) .................. 10-2015-0147254
Oct. 28, 2015  (KR) .................. 10-2015-0149934

(51) Int. Cl.
*G06F 3/01*    (2006.01)
*G02B 27/01*   (2006.01)
(Continued)

(52) U.S. Cl.
CPC .............. *G06F 3/012* (2013.01); *G06F 3/017* (2013.01); *G06F 3/0482* (2013.01); *G06F 3/14* (2013.01);
(Continued)

(58) Field of Classification Search
CPC . G06F 3/011; G06F 3/017; G06F 3/14; G06F 3/0482; G06F 3/01; G06F 3/0488;
(Continued)

(56) References Cited

U.S. PATENT DOCUMENTS 9,092,051 B2    7/2015  Park et al.
9,298,283 B1 *  3/2016  Lin ...................... G06F 3/0346
(Continued)

FOREIGN PATENT DOCUMENTS

JP          5767386 B1      8/2015
WO    WO 2014/014229 A1    1/2014
(Continued)

*Primary Examiner* — Amr A Awad
*Assistant Examiner* — Maheen I Javed
(74) *Attorney, Agent, or Firm* — Birch, Stewart, Kolasch & Birch, LLP

(57) ABSTRACT

A mobile terminal and a control method thereof are disclosed. The mobile terminal comprises a frame for mounting a portable device thereon, and the portable device mounted on the frame, the portable device comprising: a display unit for playing content; a sensing unit for sensing a direction change of the mobile terminal; a camera for photographing an object of a user; and a control unit, wherein the display unit is disposed so as to be directed toward the eyes of the user wearing the mobile terminal, and the control unit controls the display unit such that the display unit displays, on a partial region, a notification for a sub-menu corresponding to the changed direction of the mobile terminal when the direction of the mobile terminal is changed by a first angle or more during the playing of the content.

17 Claims, 63 Drawing Sheets

(51) Int. Cl.
  *G06F 3/0482* (2013.01)
  *G06F 3/14* (2006.01)
  *G06Q 20/34* (2012.01)
  *G06T 19/00* (2011.01)
  *G06F 3/0488* (2013.01)

(52) U.S. Cl.
  CPC ......... *G06Q 20/352* (2013.01); *G06T 19/006* (2013.01); *G02B 27/0172* (2013.01); *G02B 2027/0138* (2013.01); *G02B 2027/0178* (2013.01); *G06F 3/0488* (2013.01)

(58) Field of Classification Search
  CPC .... G06Q 20/352; G06T 19/006; G02B 27/01; G02B 27/0172; G02B 2027/0138; G02B 2027/0178
  See application file for complete search history.

(56) References Cited

U.S. PATENT DOCUMENTS

| | | | |
|---|---|---|---|
| 2012/0050143 A1* | 3/2012 | Border | G09G 3/3611 345/8 |
| 2013/0050118 A1* | 2/2013 | Kjelsbak | G06F 3/017 345/173 |
| 2013/0106674 A1 | 5/2013 | Wheeler et al. | |
| 2013/0135353 A1 | 5/2013 | Wheeler et al. | |
| 2013/0141313 A1* | 6/2013 | Zhou | G02B 27/017 345/8 |
| 2013/0147686 A1* | 6/2013 | Clavin | G06F 3/013 345/8 |
| 2014/0372944 A1 | 12/2014 | Mulcahy et al. | |
| 2015/0007114 A1 | 1/2015 | Poulos et al. | |
| 2015/0156803 A1 | 6/2015 | Ballard et al. | |
| 2016/0034042 A1* | 2/2016 | Joo | G02B 27/0172 345/633 |
| 2016/0063766 A1* | 3/2016 | Han | G02B 27/017 345/633 |
| 2017/0046881 A1 | 2/2017 | Kuribara | |
| 2017/0075653 A1* | 3/2017 | Dawidowsky | G06F 3/167 |

FOREIGN PATENT DOCUMENTS

| WO | WO 2015/030482 A1 | 3/2015 |
|---|---|---|
| WO | WO 2015/092968 A1 | 6/2015 |

* cited by examiner

FIG. 8
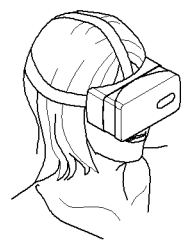 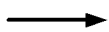 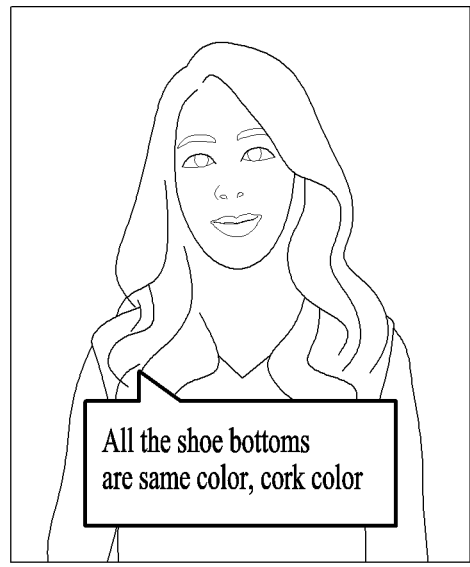
(a)            (b)

FIG. 19
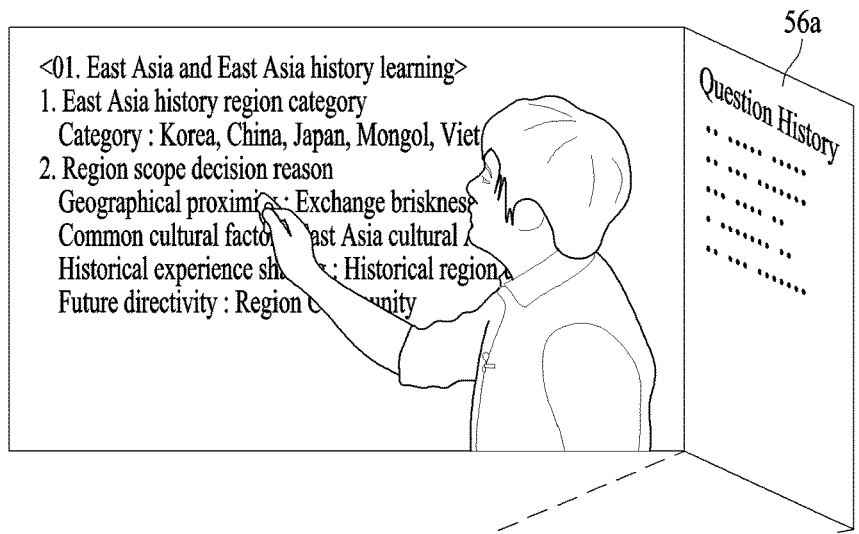
(a)
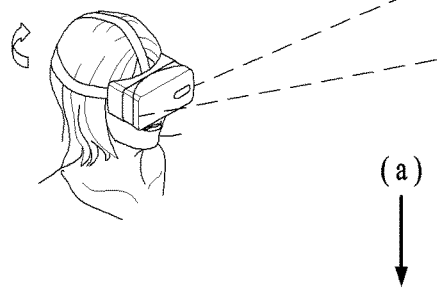
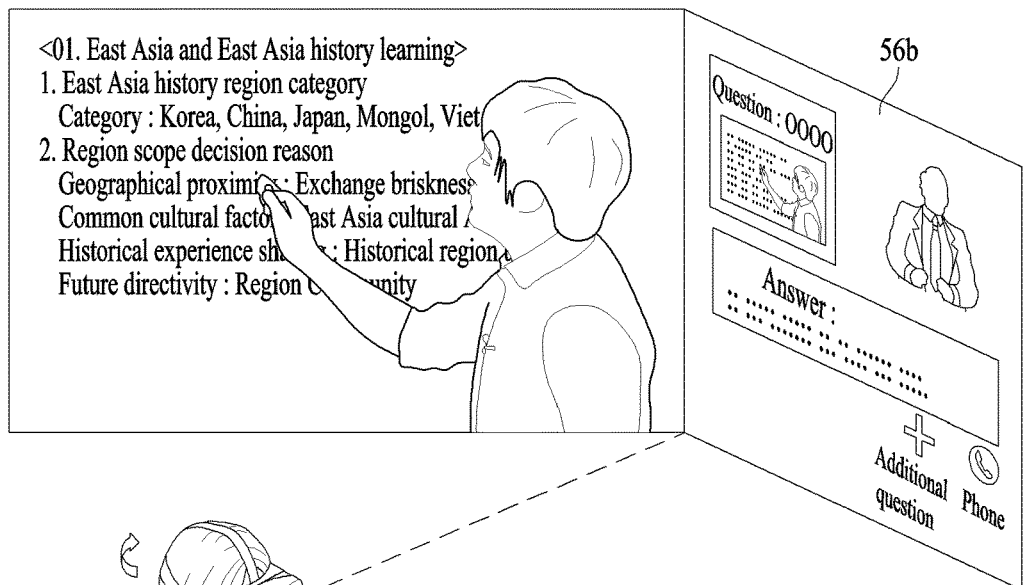
(b)

FIG. 60
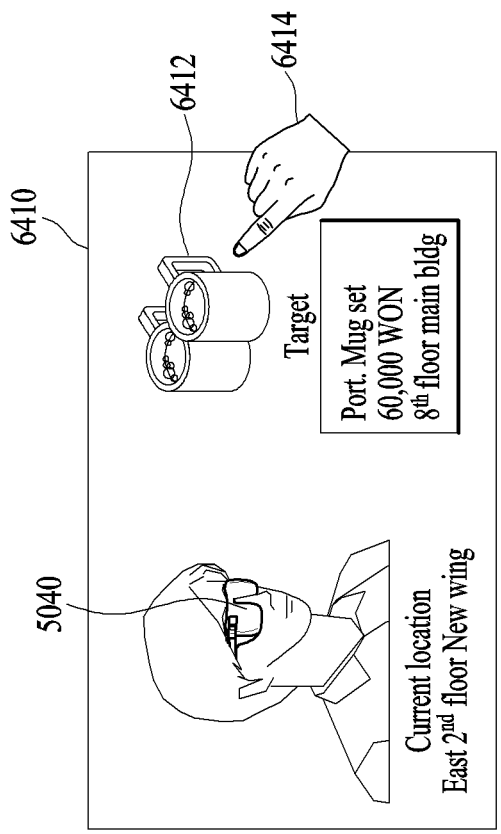
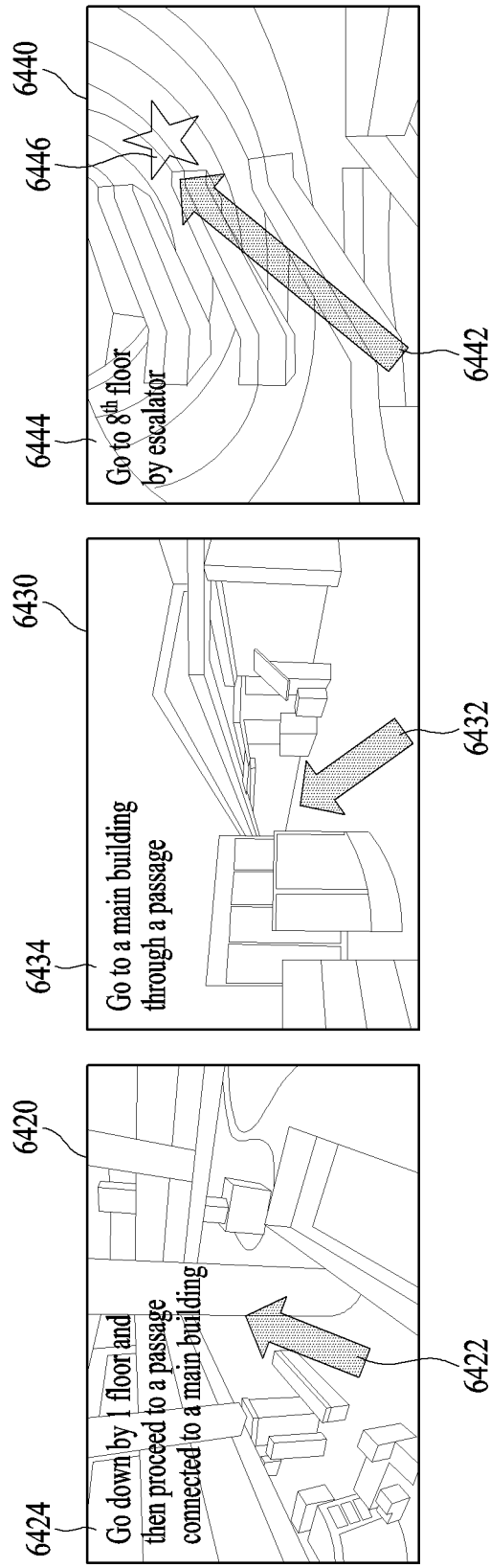

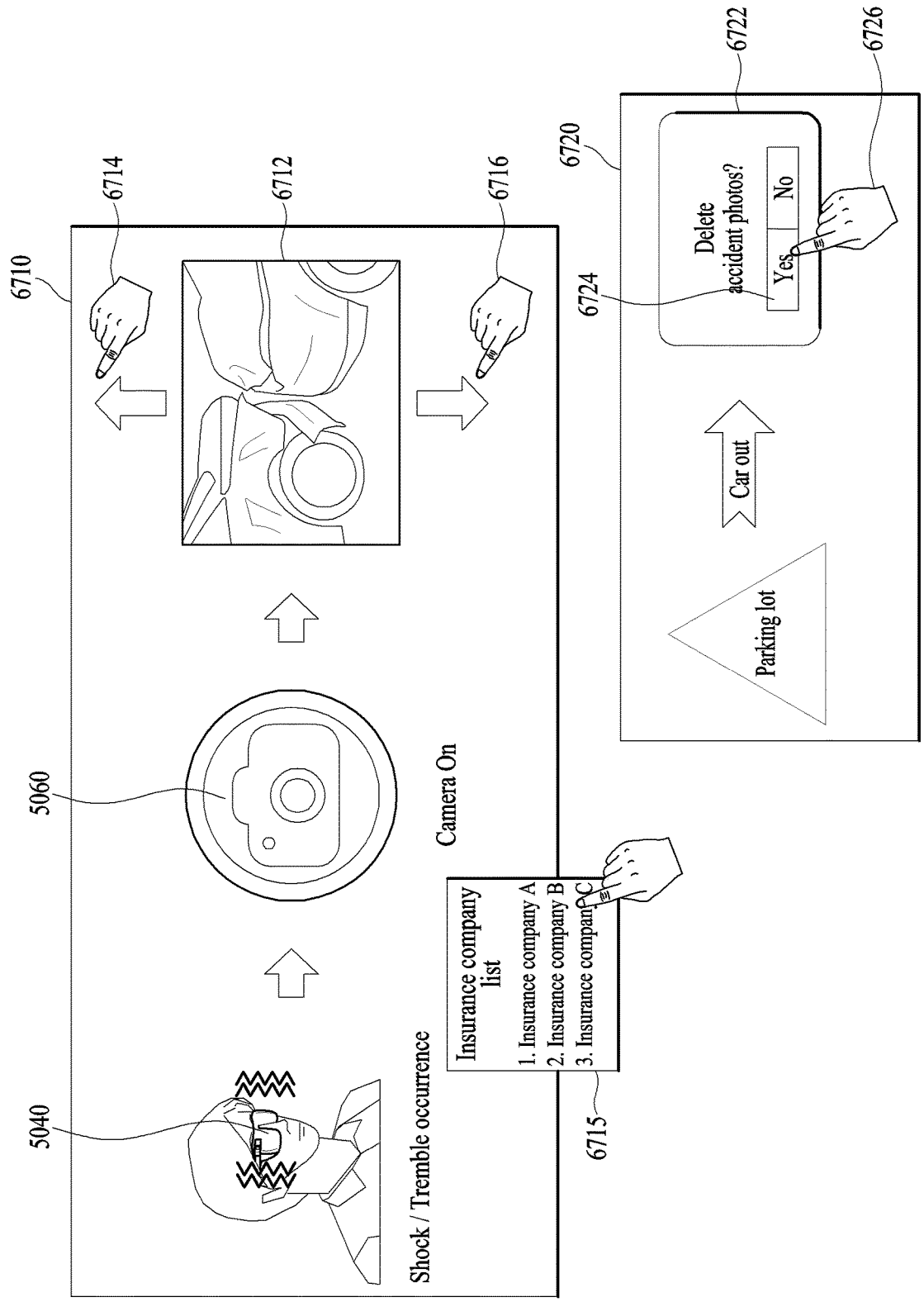

MOBILE TERMINAL AND CONTROL METHOD THEREFOR

CROSS REFERENCE TO RELATED APPLICATIONS

This application is the National Phase of PCT international Application No. PCT/KR2015/012482, filed on Nov. 19, 2015, which claims priority under 35 U.S.C. 119(a) to Patent Application Nos. 10-2015-0147203, filed in Republic of Korea on Oct. 22, 2015, 10-2015-0147254, filed in Republic of Korea on Oct. 22, 2015 and 10-2015-0149934, filed in Republic of Korea on Oct. 28, 2015, all of which are hereby expressly incorporated by reference into the present application.

TECHNICAL FIELD

The present invention relates to a mobile terminal and control method thereof, suitable for enabling a use of terminal to be implemented in further consideration of user's convenience.

BACKGROUND ART

Terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider improving structural parts and/or software parts of the terminal.

Meanwhile, mobile terminals of various types have been developed recently. One of such types is a wearable type. A mobile terminal of a wearable type can operate in a manner of being worn by a user. Thus, the demand for a technology for facilitating a use of a mobile terminal of a wearable type in various ways is rising.

DISCLOSURE OF THE INVENTION

Technical Task

One technical task of the present invention is to solve the above problem and other problems. Another technical task of the present invention is to provide a mobile terminal and control method thereof, which can control a content in response to an action of a user currently wearing the mobile terminal.

In a mobile terminal according to one embodiment of the present invention, one technical task is to provide an AR control of an object sensed from a preview of a camera application.

In a terminal according to another embodiment of the present invention, one technical task is to provide a real control of an external device connected to a mobile terminal through a gesture signal.

If a user wearing a wearable device is interested in a specific object in a specific space, another technical task of the present invention is to provide a wearable device and control method thereof, by which a user can watch an image of a specific object and relevant information of the specific object by photographing the specific object automatically, saving the image of the specific object to a memory, and receiving the relevant information of the specific object from an external device.

If a user wearing a wearable device visits a specific store and shows an interest in a specific product, another technical task of the present invention is to provide a wearable device and control method thereof, which can activate a camera by automatically recognizing that the user is interested in the specific product.

If a user wearing a wearable device visits a specific store and makes a specific gesture at a specific product, another technical task of the present invention is to provide a wearable device and control method thereof, by which a user can photograph the specific product, save an image of the specific product and information related to the specific product to a memory, and utilize them later.

Further technical task of the present invention is to provide a wearable device and control method thereof, by which a user can organize shopping information per product in a manner of displaying a shopping information list containing a specific product after the user wearing the wearable device visited a specific store and then finished the shopping.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a mobile terminal, including a frame having a portable device mounted therein and the portable device mounted in the frame, wherein the portable device comprises a display unit playing a content, a sensing unit sensing a direction change of the mobile terminal, a camera capturing an object of a user, and a controller, wherein the display unit is disposed toward eyes of the user wearing the mobile terminal, and wherein if a direction of the mobile terminal is changed over a first angle during a play of the content, the controller controls the display unit to display a notification of a submenu responding to the changed direction of the mobile terminal on a prescribed region.

If the direction of the mobile terminal is changed over a second angle greater than the first angle, the controller may pause the play of the content, launch the submenu, and control the display unit to display a screen for the launched submenu on a first prescribed region and wherein the first prescribed region comprises a region responding to the changed direction of the mobile terminal.

The controller may launch the submenu based on data included in a play screen of the paused content.

If a preset time or more passes after displaying the screen for the submenu, the controller may dim a play screen of the paused content.

If the play screen of the paused content is dimmed and the direction of the mobile terminal is changed into a direction opposite to the changed direction of the mobile terminal, the controller may control the display unit to display the screen for the submenu in full screen.

When the screen for the submenu is displayed in the full screen, if the direction of the mobile terminal is changed over the first angle into the direction opposite to the changed direction of the mobile terminal, the controller may control the display unit to display a notification of a play of the paused content on a second prescribed region, and the second prescribed region may include a region responding to the changed direction of the mobile terminal.

If the direction of the mobile terminal is changed into the direction opposite to the changed direction of the mobile terminal over the second angle greater than the first angle, the controller may control the display unit to change the displayed screen for the submenu into a screen for the paused content and resume the play of the content.

If the changed direction of the mobile terminal is a first direction, the submenu may include a Q&A (question and answer) menu related to data of the currently played content.

If the Q&A menu is launched, the controller may create a virtual object image responding to the captured object of the user, display the virtual object image on a screen having the Q&A menu launched thereon, sense a movement of the captured object, and move the virtual object image in response to the motion of the captured object.

The controller may control the display unit to display a second menu on a running screen of the Q&A menu. If the virtual object image selects the displayed second submenu, the controller may launch the selected second submenu.

The controller may control the display unit to search for an answer responding to a question if receiving an input of the question and display the found answer. If failing to search for the answer responding to the inputted question, the controller may connect to an adviser.

If the changed direction of the mobile terminal is a second direction, the submenu may include a search menu related to data of the currently played content.

If the search menu is launched, the controller may control the display unit to display the search menu for a sub-item related to the data included in a play screen of the paused content.

If the changed direction of the mobile terminal is a third direction, the submenu may include an input menu related to data of the currently played content.

If the input menu is launched, the controller may capture an external image using the camera and control the display unit to display a display region of the captured external image and a preset information display region.

If the content includes a shopping relevant content, the controller may photograph a payment card using the camera. When the photographed payment card is displayed on the external image display region, the controller may progress a payment procedure.

If the changed direction of the mobile terminal is a fourth direction, the submenu may include a control menu of the currently played screen.

In another technical aspect of the present invention, provided herein is a method of controlling a mobile terminal, including playing a content in a manner that a display unit of a portable device mounted in a frame is disposed toward eyes of a user wearing the mobile terminal, sensing a direction change over a first angle during a play of the content, and displaying a notification of a submenu responding to the changed direction of the mobile terminal on a prescribed region.

The method may further include, if the direction of the mobile terminal is changed over a second angle greater than the first angle, pausing the play of the content, launching the submenu, and displaying a screen for the launched submenu on a first prescribed region. And, the first prescribed region may include a region responding to the changed direction of the mobile terminal.

The method may further include launching the submenu based on data included in a play screen of the paused content.

Advantageous Effects

Effects of a mobile terminal and control method thereof according to the present invention are described as follows.

According to at least one of embodiments of the present invention, a mobile terminal can operate advantageously by being combined with a portable device.

According to at least one of embodiments of the present invention, a user can advantageously control a mobile terminal by turning a user's head while wearing the mobile terminal.

According to at least one of embodiments of the present invention, a content can be advantageously controlled in a manner of photographing an object, creating a virtual object image, and then using the created virtual object image or the photographed object information.

According to at least one of embodiments of the present invention, a content can be advantageously controlled by creating a virtual object image.

According to one embodiment of the present invention, a mobile terminal and control method thereof can be provided so as to provide a virtual simulation of manipulating a device through a display unit in a manner similar to manipulating a device actually.

According to another embodiment of the present invention, a mobile terminal and control method thereof can be provided so as to actually control a device through a gesture signal sensed by the mobile terminal if the mobile terminal and the device are connected to each other.

Additional range of applicability of the present invention will become clear from the detailed description of the invention in the following. Yet, since it will be apparent to those skilled in the art that various modifications and variations can be made therein without departing from the spirit and scope of the invention, it is to be understood that the following detailed description of the present invention and a specific embodiment such as a preferred embodiment of the present invention are exemplary and explanatory.

DESCRIPTION OF DRAWINGS

FIG. 8 is a diagram describing one embodiment of performing a function related to a user's question.

FIG. 19 is a diagram describing one embodiment of a mobile terminal operation according to an angle of switching to a first direction.

FIG. 60 is a diagram showing an operation of if a user selects a specific product stored in a memory when revisiting a department store, guiding a route to a store having the specific product, according to one embodiment of the present invention.

FIG. 63 is a diagram showing an operation of when there is a fender bender, activating a camera and processing accident information, according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

In the present application, terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (e.g., smartwatches, smart glasses, and head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
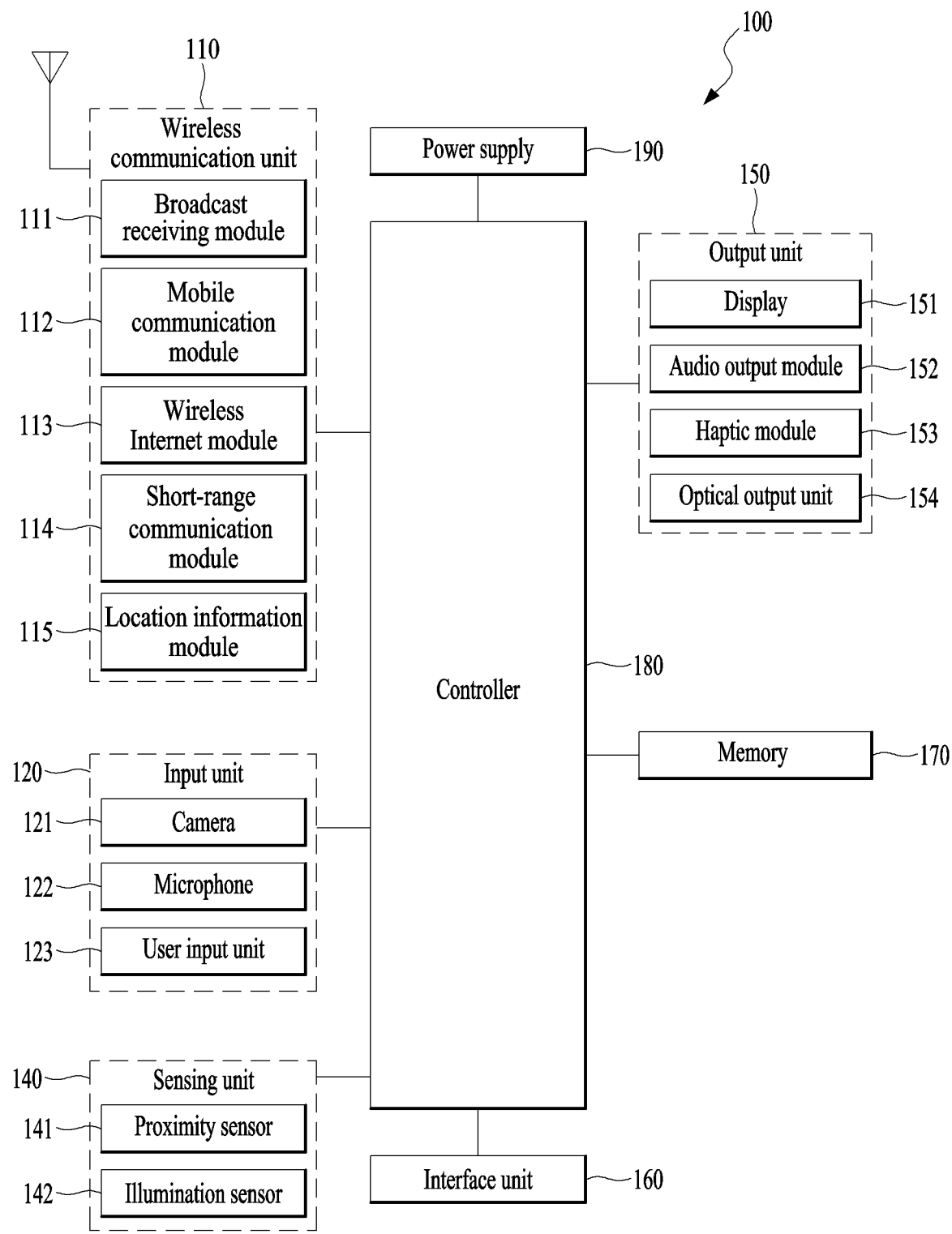
FIG. 1A is a block diagram to describe a mobile terminal related to the present invention.
Figure 1B:
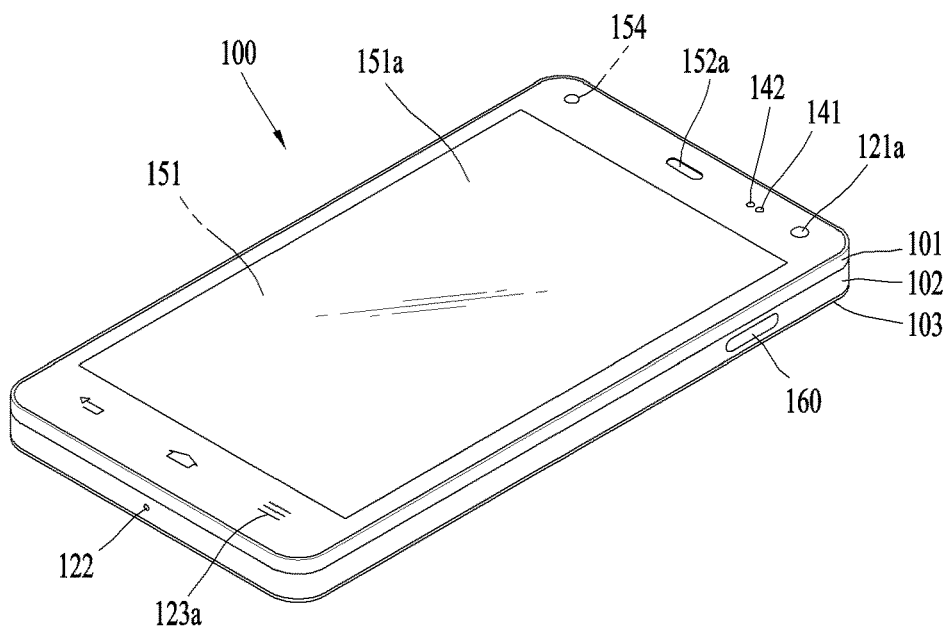
FIG. 1B and FIG. 1C are conceptual diagrams of one example of a mobile terminal related to the present invention, viewed in different directions.
Figure 1C:
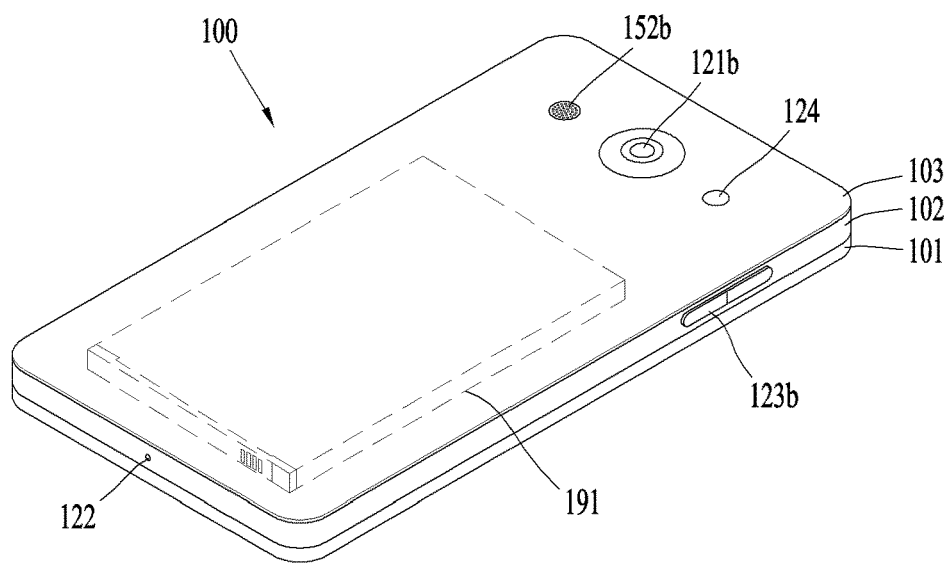

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The position-location module 115 is generally configured to detect, calculate, derive or otherwise identify a position of the mobile terminal. As an example, the position-location module 115 includes a Global Position System (GPS) module, a Wi-Fi module, or both. If desired, the position-location module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Also, various embodiments can be implemented in the computer and similar recording materials using software, hardware and the combination of software and hardware.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b may also be commonly referred to as a manipulating portion, and may employ any tactile method that allows the user to perform manipulation such as touch, push, scroll, or the like.

The first and second manipulation units 123a and 123b may also employ any non-tactile method that allows the user to perform manipulation such as proximity touch, hovering, or the like.

As another example of the user input unit 123, a rear input unit (not shown) may be located on the rear surface of the terminal body.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, a mobile terminal can expand to a wearable device, which is wearable on a body, beyond a dimension in which a user uses the mobile terminal gripped in a hand. Such wearable devices may include a smart watch, a smart glass, a head mounted display (HMD), etc. Examples of a mobile terminal expanding to a wearable device shall be described as follows.

A wearable device can be configured to exchange data (or, interwork) with another mobile terminal 100. The short range communication module can detect (or recognize) a nearby wearable device capable of communication. Moreover, if the detected wearable device is a device authenticated to communicate with the mobile terminal 100, the controller 180 can send at least one portion of data processed by the mobile terminal 100 to the wearable device through the short range communication module 114. Hence, a user can use the data processed by the mobile terminal 100 through the wearable device. For example, if there is an incoming call in the mobile terminal 100, a phone call can be performed through the wearable device. Or, if a message is received by the mobile terminal 100, the received message can be checked through the wearable device.

Figure 2A:
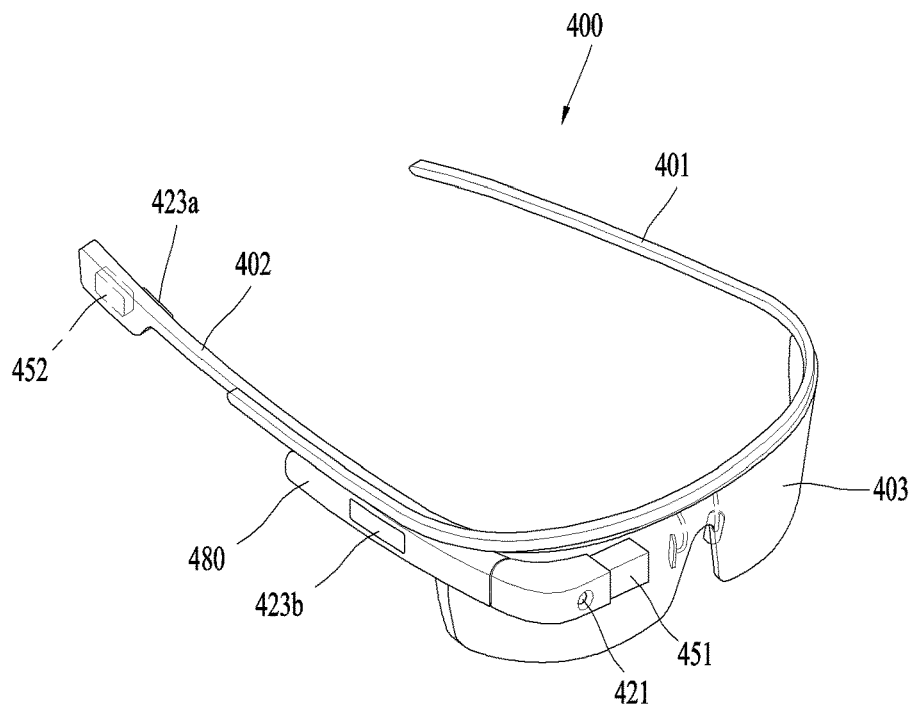
FIG. 2A is a perspective diagram showing one example of a mobile terminal of a glass type related to one embodiment of the present invention.

FIG. 2A is a perspective diagram for one example of a glass type mobile terminal 400 related to further embodiment of the present invention.

The glass type mobile terminal 400 is configured wearable on a head of a human body. To this end, the glass type mobile terminal 400 may include a frame unit (e.g., a case, a housing, etc.). The frame unit may be formed of a flexible material to be easily wearable. According to the example shown in the drawing, the frame unit includes a first frame 401 and a second frame 402, each of which can be made of a different material. In general, the mobile terminal 400 may have the same or similar features of the former mobile terminal 100 shown in FIGS. 1A to 1C.

The frame unit may be supported by the head and provides a space for mounting various components therein. As illustrated, electronic components such as a control module 480, an audio output unit 452 and the like may be installed in the frame unit. And, a lens 403 configured to cover at least one of the left and the right eye may be detachably installed in the frame unit.

The control module 480 is configured to control various electronic components provided to the mobile terminal 400. It may be appreciated that the control module 480 has the configuration corresponding to the aforementioned controller 180. According to the example shown in the present drawing, the control module 480 is installed in the frame unit on one side of the head, by which a location of the control module 480 is non-limited.

The display unit 451 may be embodied into a head mounted display (HMD). The HMD refers to a display system for directly projecting an image in front of user's eyes in a manner of being mounted on the head. In order to provide an image directly in front of the user's eyes, when the user wears the glass type mobile terminal 400, the display unit 451 may be disposed to correspond to at least one of the left eye and the right eye. According to the example shown in the present drawing, the display unit 451 is situated at a location corresponding to the right eye in order to output an image toward the user's right eye.

The display unit 451 may project an image into the user's eye using a prism. And, the prism may be formed to be optically transparent so that the user can watch the projected image and a general visual field (i.e., a range viewed by a user through the corresponding eye) in front of the user.

Thus, the image outputted through the display unit 451 may be viewed in a manner of overlapping the general visual field. The mobile terminal 400 can provide AR (Augmented Reality) that shows a single image by overlaying a virtual image on a real image or a background using the property of the display.

A camera 421 may be disposed adjacent to at least one of the left eye and the right eye to photograph an image in front. Since the camera 421 is situated adjacent to the eye, the camera 421 can obtain an image of a scene currently viewed by the user.

According to the example shown in the present drawing, the camera 421 is provided to the control module 480, by which the present invention is non-limited. Alternatively, the camera 421 may be installed in the frame unit. Alternatively, a plurality of cameras may be provided to obtain stereoscopic images.

The glass type mobile terminal 400 may include user input units 423a and 423b manipulated to receive an input of a control command. The user input units 423a and 423b may employ any manners (e.g., touch, push, etc.) corresponding to a tactile manner in which a user can perform manipulations by experiencing a tactile sense. According to the example shown in the present drawing, the user input units 423a and 423b of the push input manner and the touch input manner are provided to the frame unit and the control module 480, respectively.

Moreover, the mobile terminal 400 may further include a microphone (not shown in the drawing) for receiving an input of a sound and then processing the input sound into electric audio data and an audio output module 452 for outputting audio. The audio output module 452 may be configured to transfer audio in a general audio output manner or an osteoconductive manner. In case that the audio output unit 452 is embodied in the osteoconductive manner, when the user wears the mobile terminal 400, the audio output unit 452 comes in close contact with a user's head and vibrates user's skull to transfer audio.

Figure 2B:
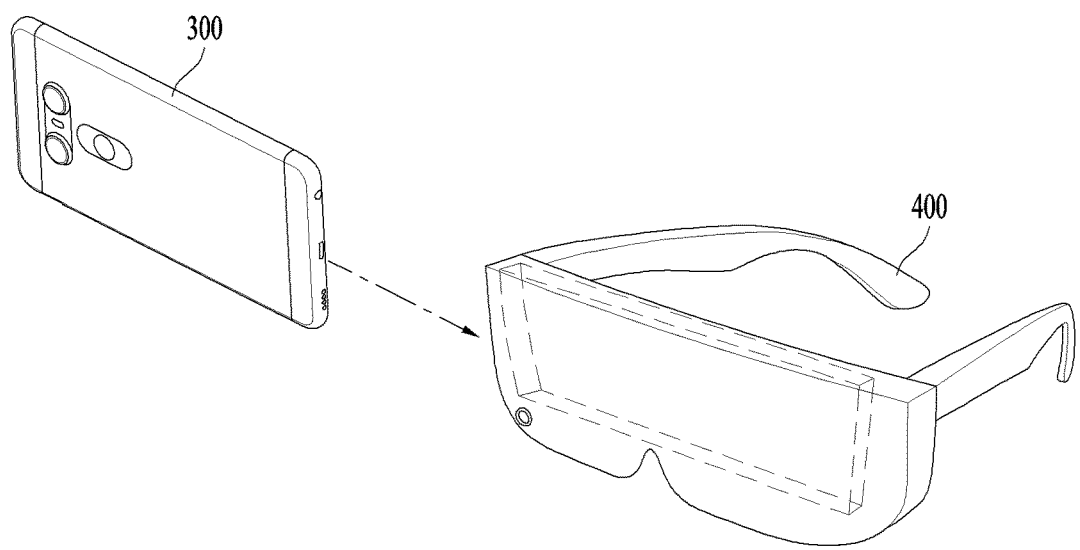
FIG. 2B is a perspective diagram describing one example of a mobile terminal combinable with a portable device in association with one embodiment of the present invention.

FIG. 2B is a perspective diagram describing one example of a mobile terminal combinable with a portable device in association with one embodiment of the present invention.

Referring to FIG. 2B, a portable device 300 and a mobile terminal 400 are illustrated. As described above, the mobile terminal 400 may include a display unit. The display unit may include a glass type that transmits light. And, the display unit may be implemented as a display module such as a display of a general terminal. Moreover, as shown in FIG. 2B, a display unit of the portable device 300 can be used as a main display unit by mounting the portable device 300. For one embodiment, the mobile terminal 400 may include a connector or gender. The portable device 300 can be connected to the mobile terminal 400 by being joined to the connector or gender of the mobile terminal 400. Or, the mobile terminal 400 may include a contact terminal. The portable device 300 can be connected to the mobile terminal 400 by coming into contact with the contact terminal of the mobile terminal 400. Or, the portable device 300 can be connected to the mobile terminal 400 by wireless. For one embodiment, after connecting the portable device 300 to the mobile terminal 400 by wireless, a user can mount the portable device 300 in the mobile terminal 400. Or, if sensing the contact with the mobile terminal 400, the portable device 300 may perform communication connection by wireless. For example, if the portable device 300 comes into contact with the connector or the contact terminal by being mounted in the mobile terminal 400, it can be automatically connected to the mobile terminal 400 by transceiving data with the mobile terminal 400 by wireless.

Once the portable device 300 is connected to the mobile terminal 400, it is able to control the portable device 300 through the mobile terminal 400. For example, if the mobile terminal 400 includes a speaker (or earphone), sound data of the portable device 300 can be outputted through the speaker of the mobile terminal 400. In some cases, the portable device 300 may output sound data through a speaker of its own.

The mobile terminal 400 having the portable device 300 mounted therein can be worn by a user. The mobile terminal 400 can detect a user's motion and then perform a function corresponding to the detected motion.

Description will now be given according to embodiments for a control method implemented in the above-configured mobile terminal disclosed herein, with reference to the accompanying drawings. It will be appreciated by those skilled in the art that the present invention covers the modifications and variations of this invention provided they come within the scope of the appended claims and their equivalents.

Various embodiments of a mobile terminal and control method thereof are described in the following. Besides, those skilled in the art can supplement or modify an embodiment described later by referring to the drawings for the previous description.

Figure 3:
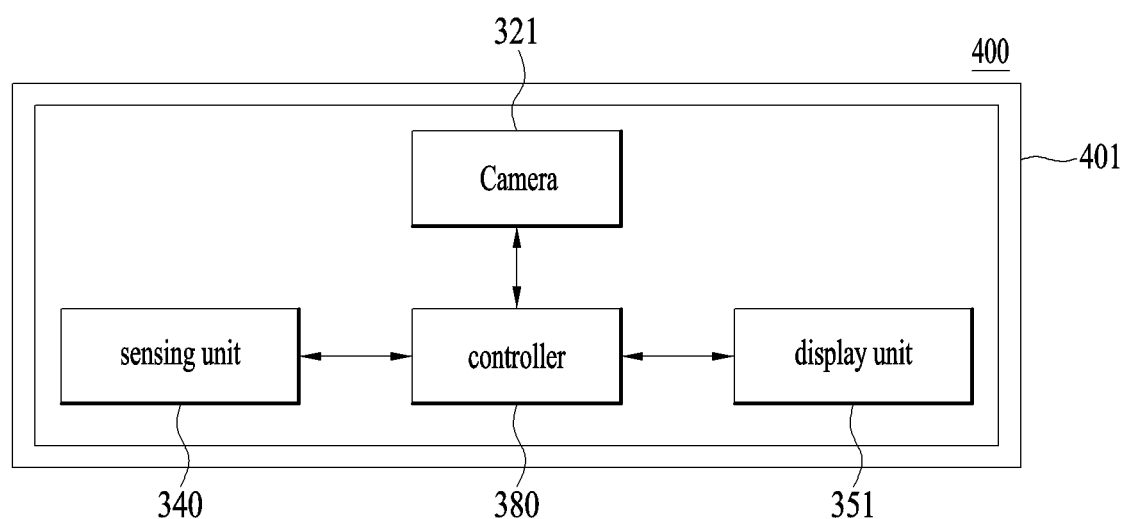
FIG. 3 is a block diagram of a mobile terminal according to one embodiment of the present invention.

FIG. 3 is a block diagram of a mobile terminal according to one embodiment of the present invention.

Referring to FIG. 3, a mobile terminal 400 may include a frame 401. The frame 401 can fix a mounted portable device 300 thereto. The portable device 300 may include a camera 321, a sensing unit 340, a display unit 351 and a controller 380. The portable device 300 can function and operate independently. Yet, if the portable device 300 is mounted in the mobile terminal 400, it can function and operate by being dependent on the mobile terminal 400. The mobile terminal 400 can have the portable device mounted herein and control the portable device 300. Hence, the mobile terminal 400 may be referred to as a mobile terminal system. The mobile terminal 400 may further include various components as well as the mounted portable device 300. For example, the mobile terminal 400 may include the components described with reference to FIG. 1A entirely or in part. Yet, the present specification shall be described centering on the components related to an embodiment of the present invention.

The camera 321 can capture an object. The object may mean an external objector the like. The external object may include a user's hand, a user's finger or the like. Namely, a user's object may mean a user's hand, a user's finger or the like.

The sensing unit 340 can sense a direction change of the mobile terminal 400. The portable device 300 is mounted in the mobile terminal 400. Hence, as a direction of the mobile terminal 400 is changed, a direction of the portable device 300 may be changed. The sensing unit 340 can sense a direction change of the portable device 300. And, the detection of the direction change of the portable device 300 can detect a direction change of the mobile terminal 400.

The display unit 351 can play a content thereon. When the portable device 300 is mounted in the mobile terminal 400, the display unit 351 may be disposed toward user's eyes. Hence, the display unit 351 may play a role as a main display unit of the mobile terminal 400.

The controller 380 can control a content playback. While a content is played, if a direction of the mobile terminal 400 is changed, the controller 380 can control the display unit 351 to display a notification of a submenu responding to the changed direction of the mobile terminal 400 on a prescribed region. For one embodiment, based on a sensing signal of the sensing unit 340, the controller 380 can determine that the mobile terminal 400 is turned in a first direction at an angle equal to or greater than a first angle. The controller 380 can control the display unit 351 to display a notification of a submenu responding to the first direction on a prescribed region of the display unit 351. The prescribed region of the display unit 351 may include a region responding to a rotation direction of the mobile terminal 400. For example, if the mobile terminal 400 changes a direction over a first angle in a right direction, the display unit 351 can display a notification of a submenu on a right prescribed region.

If a direction of the mobile terminal 400 is changed over a second angle greater than the first angle, the controller 380 may pause a play of a content. And, the controller 380 launches a submenu responding to the changed direction, thereby controlling the display unit 351 to display a screen for a launched submenu on a prescribed region of the display unit 351.

Various detailed embodiments are described as follows.

Figure 4:
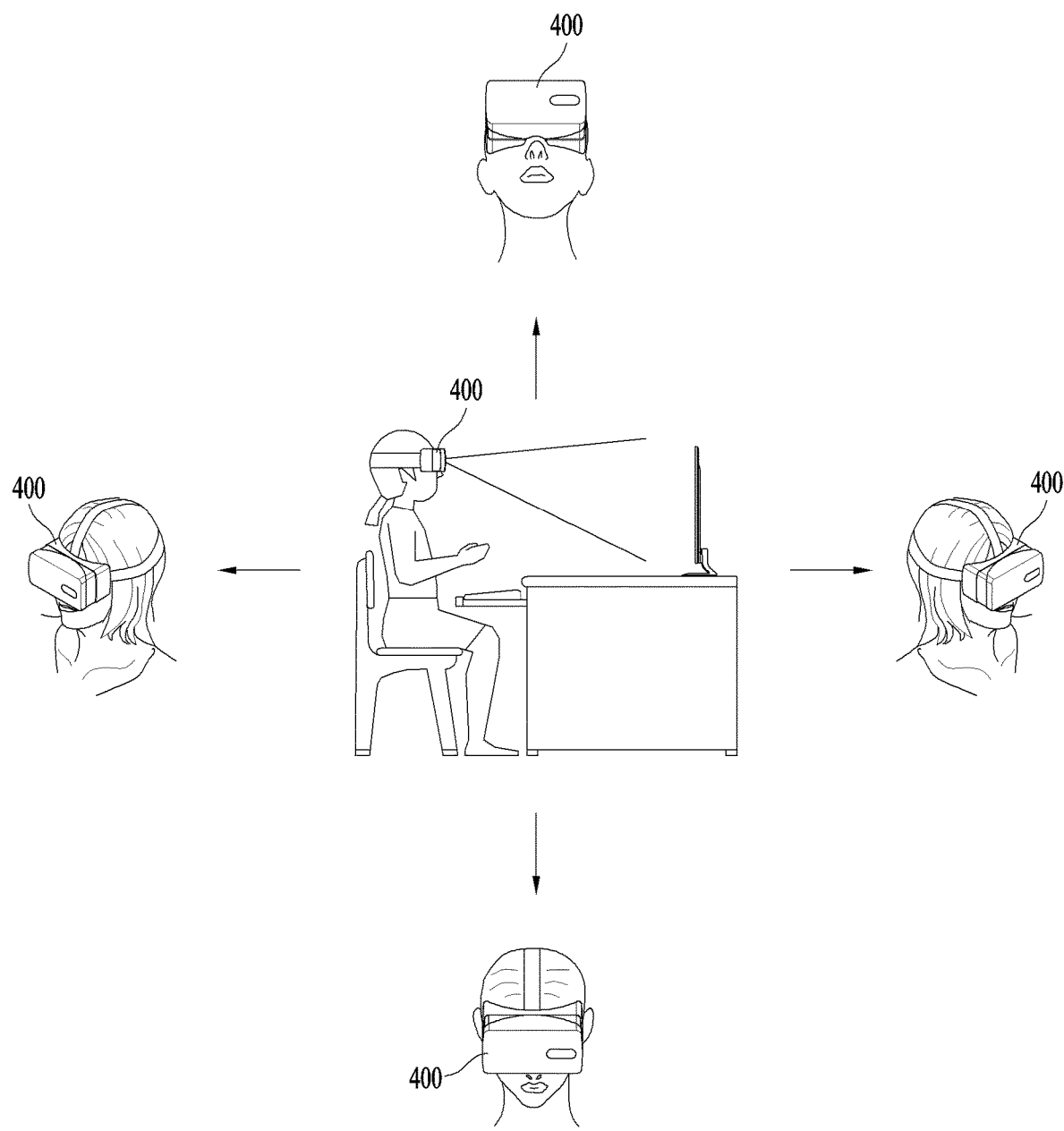
FIG. 4 is a diagram describing a process for controlling a mobile terminal according to one embodiment of the present invention.

FIG. 4 is a diagram describing a process for controlling a mobile terminal according to one embodiment of the present invention.

Referring to FIG. 4, illustrate is a mobile terminal 400 that is controlled according to a direction change. A user can mount a portable device in the mobile terminal 400. A display unit of the portable device 300 is disposed toward the user to play a role as a main display unit of the mobile terminal 400. Or, the mobile terminal 400 may be configured to include a display unit. If the portable device 300 is mounted in the mobile terminal 400, the portable device 300 can operate like a component of the mobile terminal. Hence, the mobile terminal 400 may be referred to as a mobile terminal system. Moreover, if the mobile terminal 400 includes the portable device 300, although the portable device 300 substantially controls a function, the mobile terminal 400 is regarded as controlling the function.

A user can watch a main content by wearing the mobile terminal 400. For example, the main content may include one of an online shopping content, a video lecturing content, and the like. Moreover, a movie content, a music content, a sports content, an entertainment content, a broadcast content or the like may become the main content.

When the main content is played, the user may turn a user's head in a first direction. For example, the first direction may be set to a right direction. In response to a user's motion, the mobile terminal 400 may rotate in the first direction. If detecting the rotation of the mobile terminal 400 in the first direction, the mobile terminal 400 can execute a function corresponding to the first direction. Or, when the main content is played, the user may turn a user's head in a second direction. For example, the second direction may be set to a left direction. In response to a user's motion, the mobile terminal 400 may rotate in the second direction. If detecting the rotation of the mobile terminal 400 in the second direction, the mobile terminal 400 can execute a function corresponding to the second direction.

Or, when the main content is played, the user may turn a user's head in a third direction. For example, the third direction may be set to a bottom direction. In response to a user's motion, the mobile terminal 400 may rotate in the third direction. If detecting the rotation of the mobile terminal 400 in the third direction, the mobile terminal 400 can execute a function corresponding to the third direction. Or, when the main content is played, the user may turn a user's head in a fourth direction. For example, the fourth direction may be set to a top direction. In response to a user's motion, the mobile terminal 400 may rotate in the fourth direction. If detecting the rotation of the mobile terminal 400 in the fourth direction, the mobile terminal 400 can execute a function corresponding to the fourth direction.

The above direction is provided for one embodiment. The first direction may be set to a right direction, a bottom direction or a top direction. An embodiment of a submenu responding to each direction is described in detail as follows.

Figure 5:
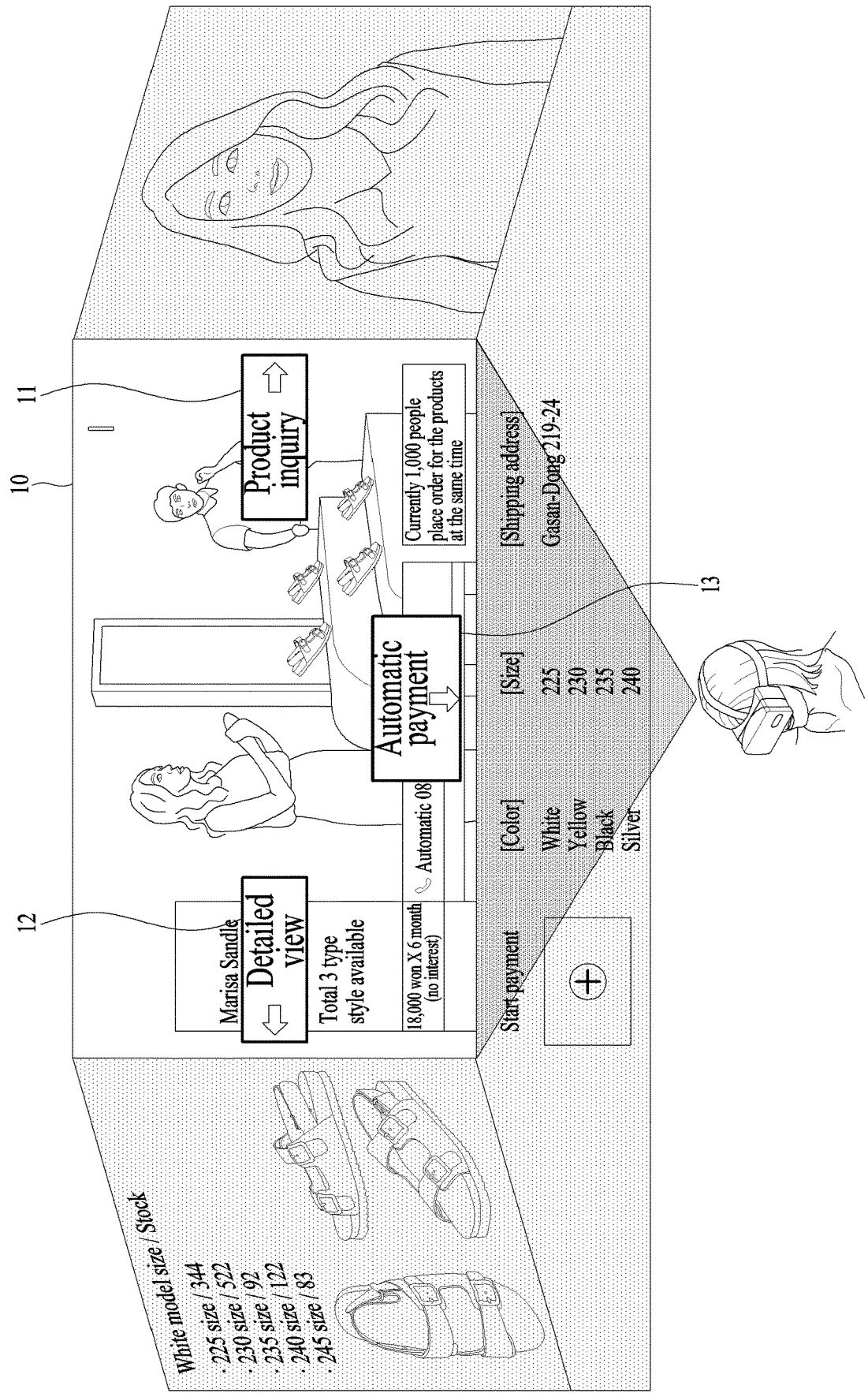
FIG. 5 is a diagram describing one embodiment of a mobile terminal that plays a content.

FIG. 5 is a diagram describing one embodiment of a mobile terminal that plays a content.

Referring to FIG. 5, a display unit can play an online shopping content. Namely, the display unit can display an online shopping content screen 10. As described above, the display unit may be a component included in a mobile terminal. Or, the display unit may play a role as a main display unit of the mobile terminal despite being a component included in a portable device. The display unit may display a notification of a submenu as well as a main content. For example, a product inquiry menu 11, a detailed view menu 12 and an automatic payment menu 13 may be displayed on a left side, a right side and a bottom side, respectively. Or, if receiving a specific command from a user, the mobile terminal may display a submenu on the display unit. For example, the display unit can play a main content without displaying a submenu. The mobile terminal can receive an input of a notification display command from a user. In response to the inputted command, the mobile terminal can display a submenu on the display unit (or, the display unit of the portable device). The user can recognize the submenu responding to a direction change by viewing the displayed menu.

Figure 6:
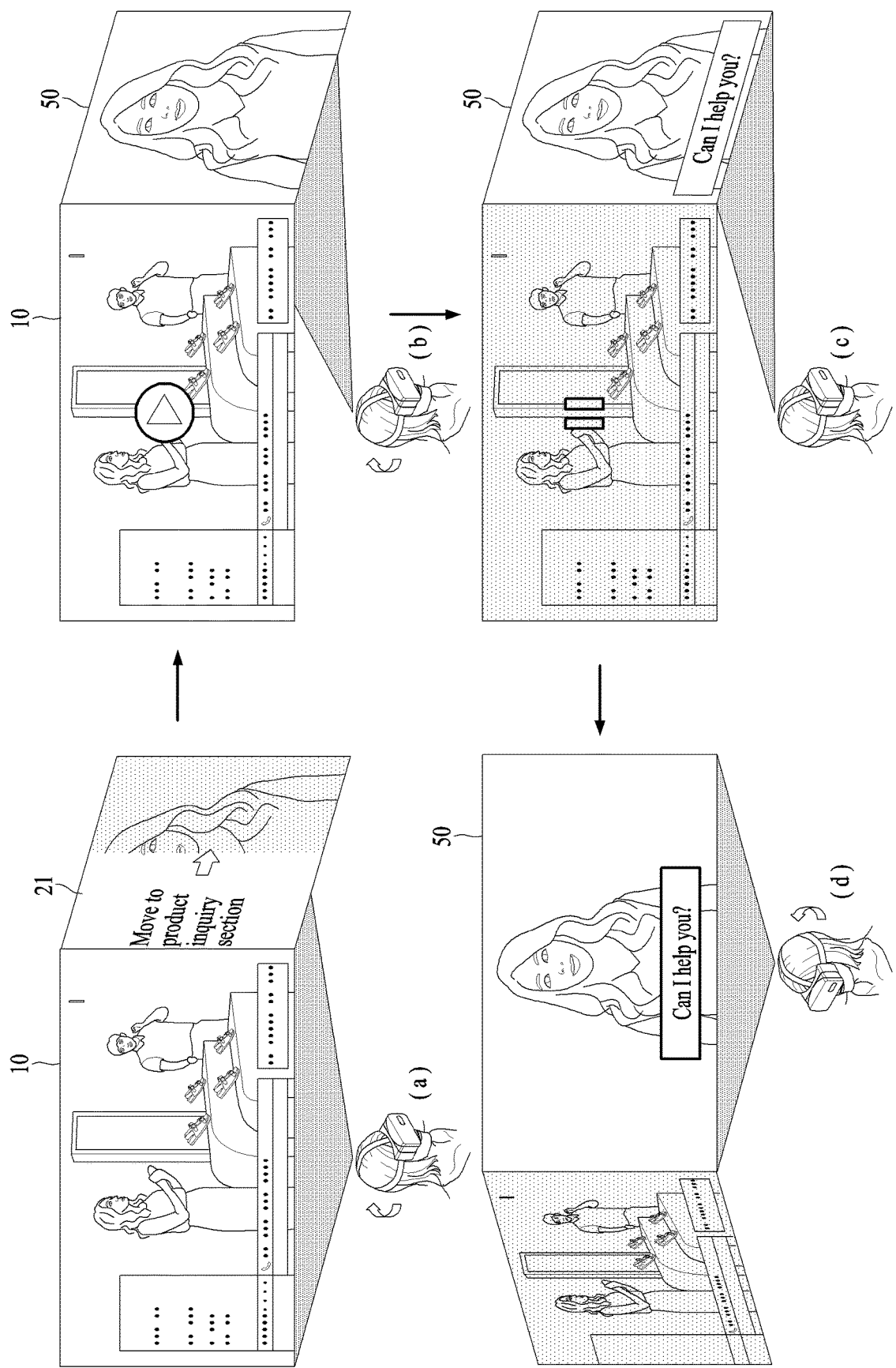
FIG. 6 is a diagram describing one embodiment of switching to a first direction.

FIG. 6 is a diagram describing one embodiment of switching to a first direction.

Referring to FIG. 6 (*a*), illustrated is a mobile terminal having rotated over a first angle. A display unit can display an online shopping content screen 10. A user can turn a user's head over the first angle in the first direction. For example, the first direction can include a right direction and the first angle can be set to 10 degrees. The direction and angle can be set variously depending on specific situations.

If detecting that the direction is changed over the first angle in the first direction, the mobile terminal can display a notification 21 of a submenu responding to the first direction on a prescribed region of the display unit corresponding to the first direction. For one embodiment, a direction of the mobile terminal can be changed over 10 degrees in a right direction. If detecting a direction change, the mobile terminal can display a notification 21 of a submenu on a right prescribed region of the display unit. For example, the submenu responding to the first direction may include a product Q&A (question and answer) menu.

Or, if a direction is changed over the first angle in the first direction and the direction change is maintained over a first time, the mobile terminal can display a notification 21 of a submenu responding to the first direction on a prescribed region of the display unit corresponding to the first direction. A user can easily recognize the submenu responding to the changed direction through the displayed notification information.

Referring to FIG. 6 (*b*), illustrated is the mobile terminal having rotated over a second angle in the first direction. The second angle is greater than the first angle. If detecting that a direction is changed over the second angle in the first direction, the mobile terminal can launch a submenu responding to the first direction. Additionally, the mobile terminal may pause a play of a main content. The display unit can display a screen 50 for the launched submenu on a prescribed region of the display unit corresponding to the first direction. For one embodiment, the direction of the mobile terminal may be changed over 20 degrees in the right direction. If detecting the direction change, the mobile terminal can display a submenu running screen 50 on a right prescribed region of the display unit. Namely, the display unit may display a screen 10 of the paused main content on a wide region and also display the screen 50 of the currently launched submenu on a right prescribed region.

Referring to FIG. 6 (*c*), illustrated is the mobile terminal that switches the submenu running screen 50 to a full screen of the display unit. If a preset time expires, the mobile terminal can dim the screen 10 of the main content. In the present invention, 'dimming' means an effect of lowering definition of a content, making a content transparent, or making a content disappear gradually. The mobile terminal can dim the paused main content and switch the submenu screen 50 displayed on the prescribed region to a full screen. Namely, the display unit can display the Q&A (question and answer) menu in full screen. Although the screen displayed on the display unit is switched to the submenu displayed screen 50, the mobile terminal is located by rotating in the right direction over about 20 degrees from an initial location. Namely, the user turns a user's head at 20 degrees in the right direction.

Referring to FIG. 6 (*d*), illustrated is the terminal that rotates in a direction opposite to the first direction. Although the display unit displays the product Q&A menu, the user turns the user's head in the right direction. It may be inconvenient for the user to watch the submenu for a long time while turning the user's head in the right direction. If the main content is dimmed and the product Q&A menu is displayed in full screen, the user can turn the user's head in the direction opposite to the first direction. Namely, the user can turn the user's head in a front direction. In response to the user's direction change, the mobile terminal can rotate in the direction opposite to the first direction. Yet, after the submenu has been switched to the full screen, although the direction is changed into the opposite direction within a preset time, the mobile terminal may ignore the direction change into the opposite direction. The user can watch the screen switched to the submenu conveniently and comfortably. After the product Q&A menu has been displayed in full screen, if the mobile terminal is switched to the direction opposite to the first direction within a preset time, the mobile terminal can ignore the change of the direction. Namely, if the direction is changed after expiration of the preset time, the mobile terminal can switch to the content play screen again.

And, the Q&A menu screen 50 may include a Q&A menu related to data contained in a current content play screen. For example, if shoes are contained in the current content play screen, the Q&A menu screen 50 may contain Q&A for the shoes. Or, if white shoes are contained in the current content plays screen, the Q&A menu screen 50 may contain Q&A for the white shoes. The Q&A menu screen 50 may further include a submenu. And, the submenu can be also created based on data contained in the current content play screen.

Figure 7:
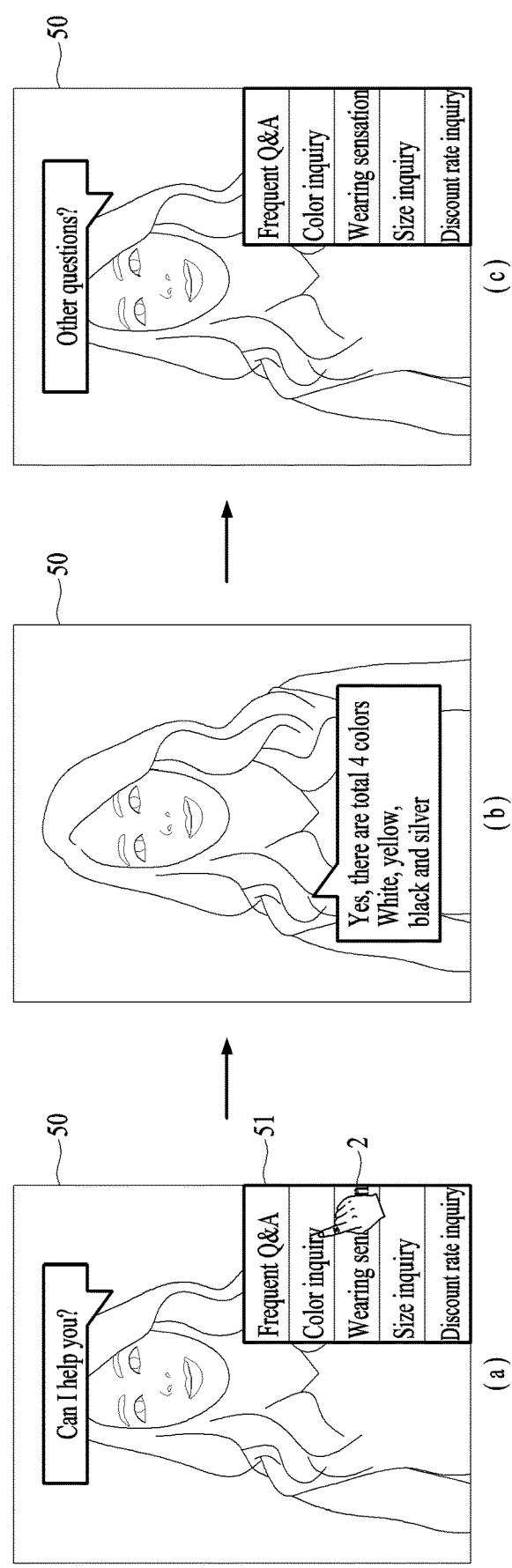
FIG. 7 is a diagram describing one embodiment of a submenu responding to a first direction.

FIG. 7 is a diagram describing one embodiment of a submenu responding to a first direction.

Referring to FIG. 7 (*a*), illustrated is a display unit that displays a Q&A (question and answer) menu screen 50. As describe above, for one embodiment, a first direction can be set to a right direction, and a submenu responding to the first direction may include a Q&A (question and answer) menu. The display unit may display a Q&A menu screen as the submenu responding to the first direction. The Q&A menu screen may include a second submenu. For one embodiment, the second submenu may include a frequently asked question (FAQ) menu 51.

Meanwhile, a mobile terminal may include a camera. Or, a portable device mounted in the mobile terminal may include a camera. The mobile terminal can control the camera of its own or the camera of the mounted portable device. In some cases, the portable device mounted in the mobile terminal may control the camera of its own. The camera can capture an external object. The external object may include a user object. For example, the user object may include a user's hand or finger. If a user moves a hand (or finger) in front of the camera, the camera can capture the user's hand. The controller recognizes the user's hand in the captured image and is able to create a virtual object image 2 corresponding to the user's hand. And, the controller can move the created virtual object image 2 based on a movement trajectory of the user's hand. The display unit can display the virtual object image 2 and the movement of the virtual object image 2.

The user can select a prescribed item from the FAQ menu 51 displayed on the display unit using the virtual object image 2.

Referring to FIG. 7 (*b*), illustrated is the mobile terminal that outputs an answer to the selected item. If a prescribed item is selected from the FAQ menu 51 by the virtual object image 2, the mobile terminal can output an answer to the selected item. The answer to the selected item may be displayed as text on the display unit or outputted as audio.

If a submenu is displayed in response to a change of direction, the mobile terminal may stop playing a main content. Yet, in some cases, the mobile terminal may continue to play the main content. For example, if a main content is a broadcast content, the mobile terminal may keep the sound of the main content despite switching to the submenu. As described above, the answer to the selected item may be outputted as audio. In case of outputting the answer to the selected item by keeping the sound of the main content, the mobile terminal may lower a sound volume of the main content. Hence, a user can listen to the answer to the selected item comfortably.

Referring to FIG. 7 (*c*), illustrated is the Q&A (question and answer) menu screen 50 in standby state. Once the output of the answer is ended, the mobile terminal may display the Q&A menu screen 50 and maintain the standby state. If another item is selected in response to a user's command, the mobile terminal can output an answer to the selected item again.

FIG. 8 is a diagram describing one embodiment of performing a function related to a user's question.

Referring to FIG. 8 (*a*), illustrated is a mobile terminal that receives an input of questions. A Q&A menu may include an FAQ menu. If a prescribed item is selected from the FAQ menu, the mobile terminal can output an answer to the selected item. Yet, a user may not find a desired question from the FAQ menu. The user can input a question failing to be included in FAQ to the mobile terminal. The user can ask a question by voice.

Referring to FIG. 8 (*b*), illustrated is the mobile terminal that outputs an answer. While a Q&A menu screen 50 is displayed, if user's voice is inputted, the mobile terminal may analyze the user's voice and determine question contents. The mobile terminal can send question data to a server. Having received the question data, the server can search for answer data for the question. The server can send the found answer data to the mobile terminal. The mobile terminal can display the answer data received from the server on the display unit as text or output it in audio. In some cases, the server may fail in finding the answer data for the question data.

Figure 9:
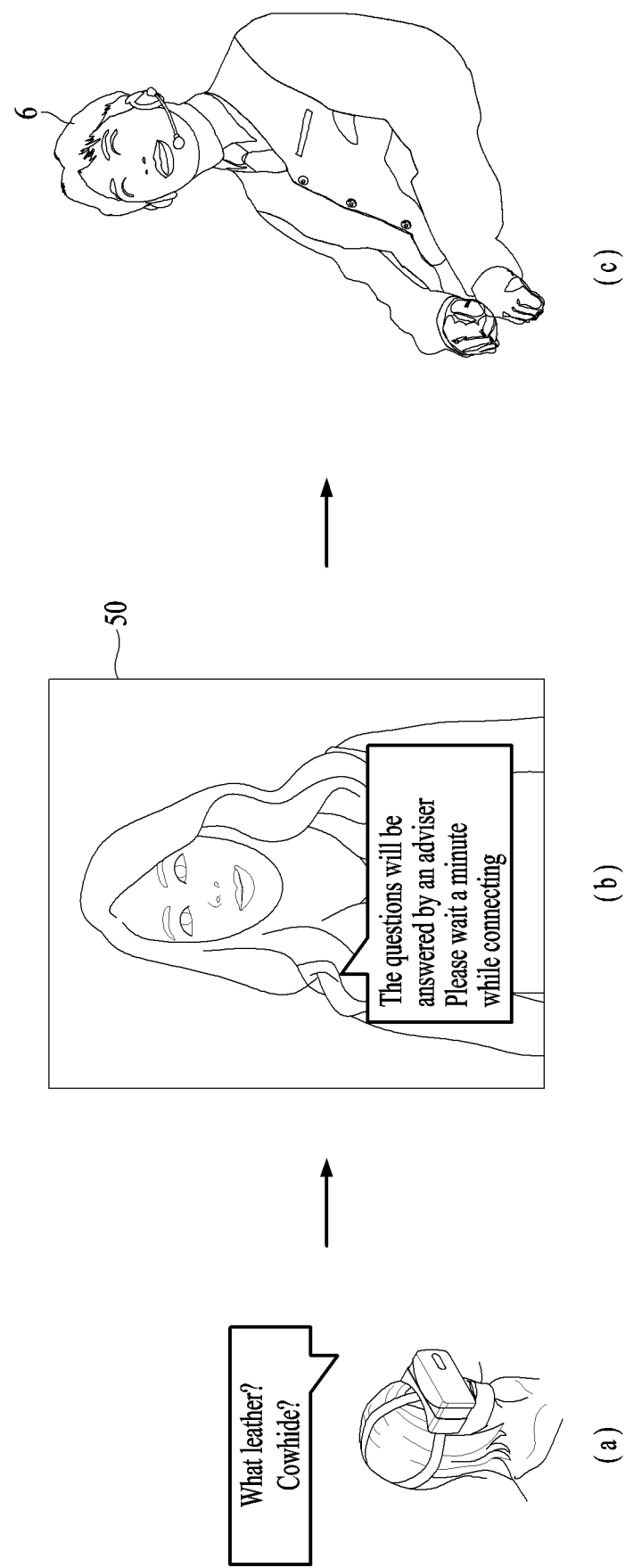
FIG. 9 is a diagram describing another embodiment of performing a function related to a user's question.

FIG. 9 is a diagram describing another embodiment of performing a function related to a user's question.

Referring to FIG. 9 (*a*), illustrated is a mobile terminal that receives an input of questions. In case of failing to find a desired question from an FAQ menu, a user can input a question to the mobile terminal by voice.

Referring to FIG. 9 (*b*), illustrated is a mobile terminal that connects to an adviser. While a Q&A menu screen 50 is displayed, if a user's question is inputted, the mobile terminal can determine question contents and then send question data to a server. The server can search for answer data for the question. Yet, the server may not find the answer data for the question. The server can send a signal, which indicates that the answer data is not found, to the mobile terminal. If receiving the non-finding signal from the server, the mobile terminal can connect to an adviser. While connecting to the adviser 6, the mobile terminal can output a notification message to a display unit. Or, the mobile terminal may output a notification message in audio.

For another embodiment, if failing to find the answer data, the server can send information on the mobile terminal and question data to the adviser 6. And, the server may send a signal, which indicates that connection to the adviser 6 is in progress, to the mobile terminal. The mobile terminal may display a notification message, which indicates that connection to the adviser 6 is in progress, on the display unit or output the notification message in audio. Once connected to the adviser 6, the server can switch the connection to the mobile terminal. Or, the adviser 6 may connect to the mobile terminal based on the received information.

Referring to FIG. 9 (*c*), the adviser 6 is illustrated. If the mobile terminal is connected to the adviser 6, the user can ask a question to the adviser 6. In some cases, the mobile terminal may make a request for user authentication before connecting to the adviser 6. The adviser 6 can connect to the mobile terminal with more information before connecting to the mobile terminal. The user can ask a question and hear an answer through phone conversation with the adviser 6.

Figure 10:
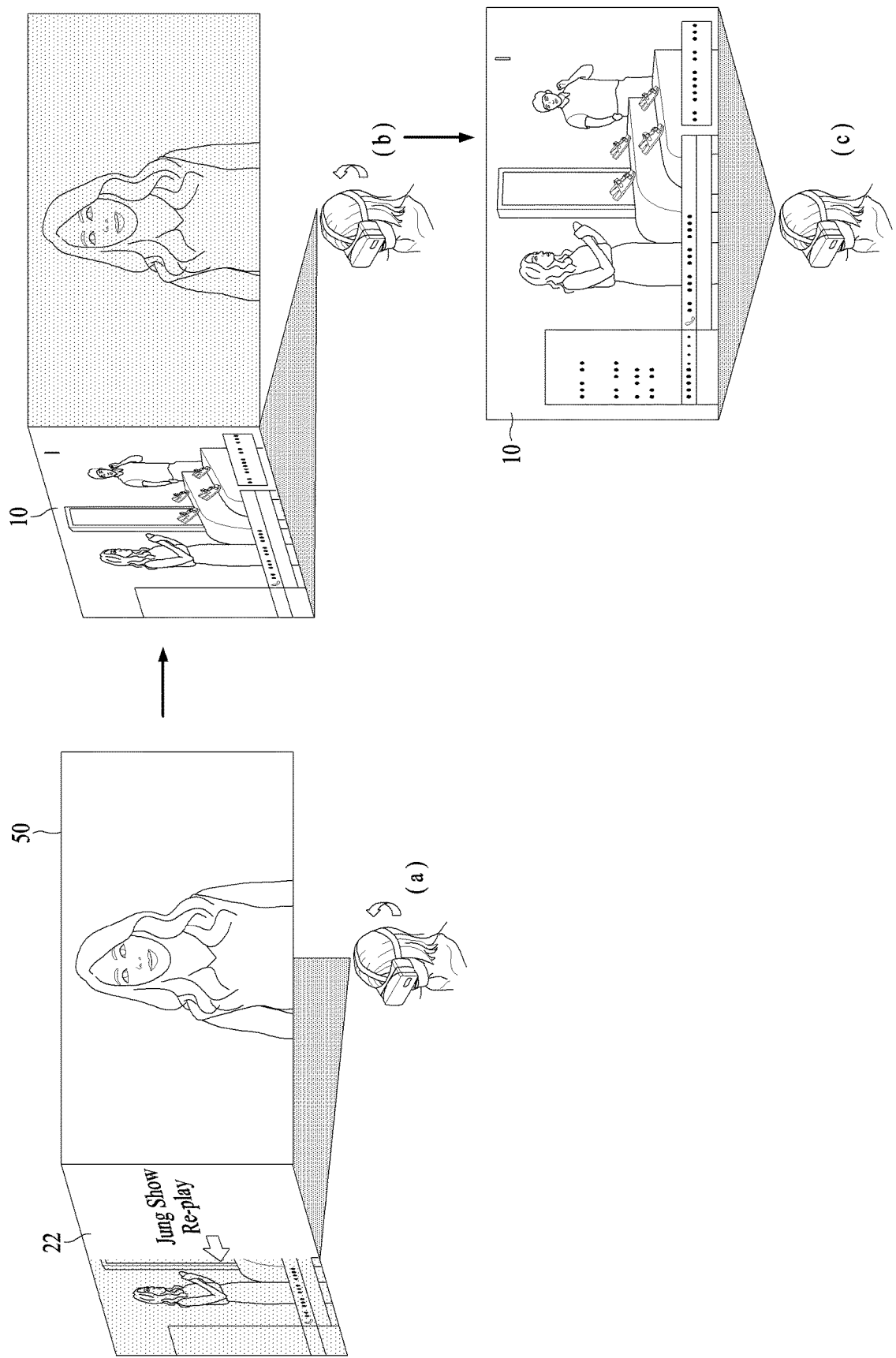
FIG. 10 is a diagram describing one embodiment of switching to a second direction.

FIG. 10 is a diagram describing one embodiment of switching to a second direction.

Referring to FIG. 10 (*a*), illustrated is a mobile terminal that is rotated in a second direction. The second direction may be set to a left direction. As describe above, a user can launch a Q&A menu by turning a head in a right direction. After the Q&A menu has been displayed in full screen, although the user turns the user's head in the right direction, the mobile terminal can ignore the rotation. Hence, as the mobile terminal launches the Q&A menu and the user faces a front direction, the user can watch a Q&A men screen 50 comfortably. Hence, the mobile terminal currently displays the Q&A menu screen 50. And, the mobile terminal can be situated in a front direction of the user. The user may turn the user's head in the left direction. In response to the user's direction change, the mobile terminal can display a notification 22 for a content play on a prescribed region of a display unit. For one embodiment, if rotated over a first angle in a second direction, the mobile terminal may display the notification 22 for the content play. For example, the first angle may be set to 10 degrees.

If detecting that the mobile terminal is rotated over a second angle greater than the first angle, the mobile terminal can display a content play screen on a left prescribed region of the display unit. For example, the second angle can be set to 20 degrees. The direction and angle may be set variously depending on specific situations.

Referring to FIG. 10 (*b*), illustrated is the mobile terminal that switches a paused content play screen 10 to a full screen of the display unit. If a preset time expires, the mobile terminal can dim the Q&A menu screen 50. Or, the mobile terminal can turn off the Q&A menu screen 50.

The mobile terminal dims the paused main content and is able to switch the content play screen 10 displayed on a prescribed region to a full screen. Although the screen displayed on the display unit is switched to the paused content play screen 10, the mobile terminal is located in a manner of being rotated over about 20 degrees from an initial location in a left direction. Namely, the user turns the user's head at 20 degrees in the left direction.

Referring to FIG. 10 (*c*), illustrated is the mobile terminal rotated in a direction opposite to the second direction. Although the display unit displays the content play screen 10, the user turns the user's head in the left direction. It may be inconvenient for the user to watch a screen for a long time while turning the user's head in the left direction. If the content play screen 10 is displayed in full screen, the user can turn the user's head in the direction opposite to the second direction. Namely, the user can turn the user's head in a front direction. In response to the direction change of the user, the mobile terminal can rotate in the direction opposite to the second direction. Yet, after the submenu is switched to the fill screen, if the mobile terminal is switched to the opposite direction within a preset time, the mobile terminal can ignore the switch to the opposite direction. The user can comfortably watch the content play screen 10 while maintaining the user's head in the front direction. When a content is paused, if the content play screen 10 is switched to the full screen, the mobile terminal can play the content. Or, after the content play screen 10 has been switched to the full screen, if the mobile terminal determines that the direction of the mobile terminal faces the original front direction, the mobile terminal can automatically play the content. If the content is not paused, the mobile terminal can continue to play the content irrespective of a direction.

Figure 11:
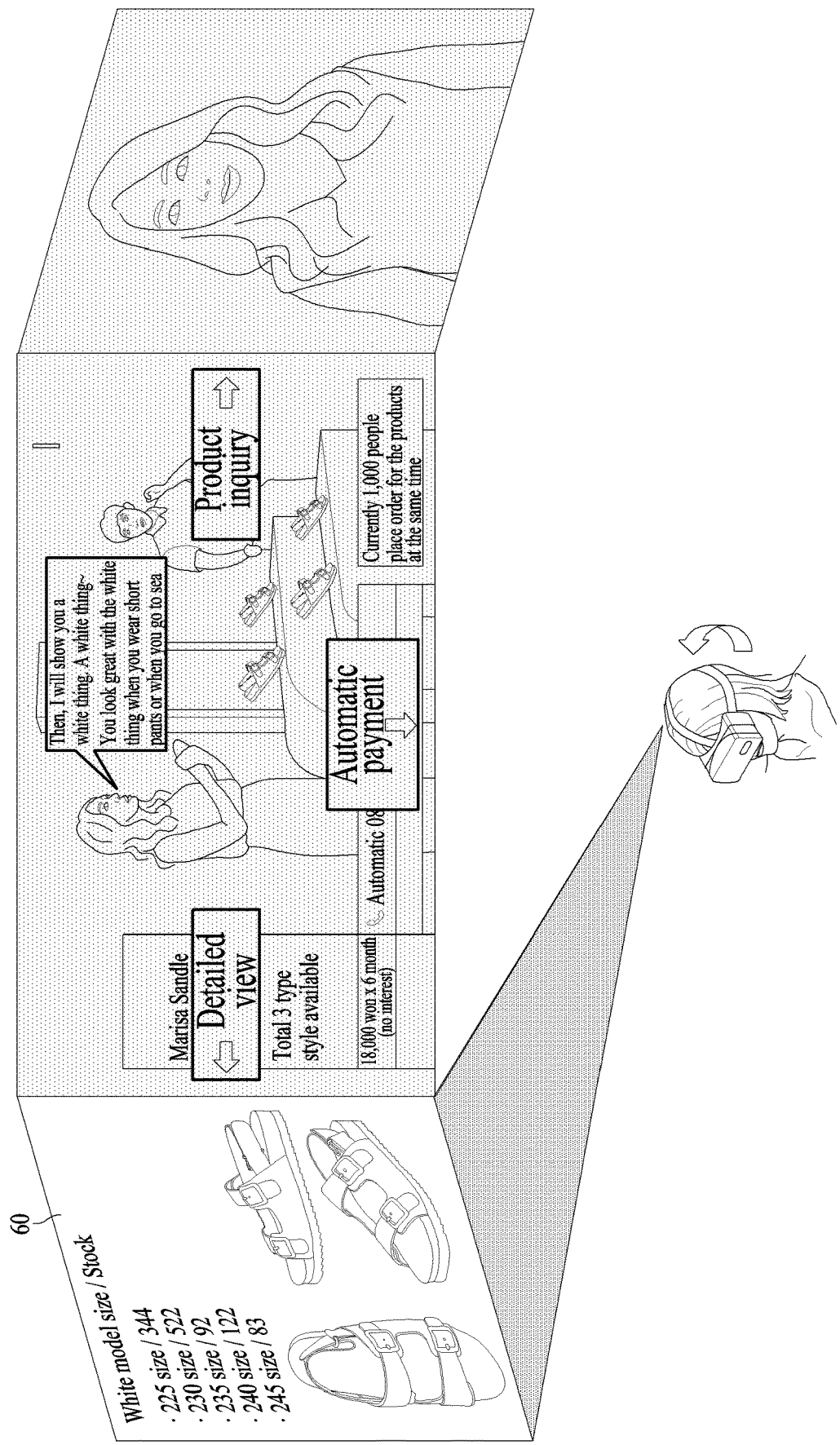
FIG. 11 is a diagram describing one embodiment of a submenu responding to a second direction.

FIG. 11 is a diagram describing one embodiment of a submenu responding to a second direction.

Referring to FIG. 11, illustrated is a mobile terminal that displays a search menu screen 60 related to a currently played data. As described above, the mobile terminal can play a content while located in a front direction of a user. The mobile terminal can rotate in a second direction while playing the content. The mobile terminal can launch a submenu responding to the second direction in response to the rotation in the second direction. For example, the second direction may be set to a left direction, and the submenu responding to the second direction may include a search menu. If the mobile terminal rotates over a first angle in the second direction, a notification of the submenu responding to the second direction can be displayed. If the mobile terminal rotates over a second angle greater than the first angle in the second direction, the submenu responding to the second direction can be displayed on a prescribed region of a display unit. As time passes, the mobile terminal can display the submenu responding to the second direction in full screen. After the submenu responding to the second direction has been displayed in full screen, although the user turns a user's head in a direction opposite to the second direction within a preset time, the mobile terminal can maintain the submenu responding to the second direction. Namely, a detailed embodiment for the mobile terminal to launch and display the submenu responding to the second direction is similar to the former process for launching the submenu responding to the first direction. Hence, relevant details shall be omitted herein.

The submenu responding to the second direction may include a search menu related to the currently played data. For example, if a current content play screen contains a white model of shoes, the search menu screen 60 may include a screen for searching detailed information related to the white model of shoes. For detailed example, the search menu screen 60 may contain size types of white model shoes and stock information according to the size types.

Figure 12:
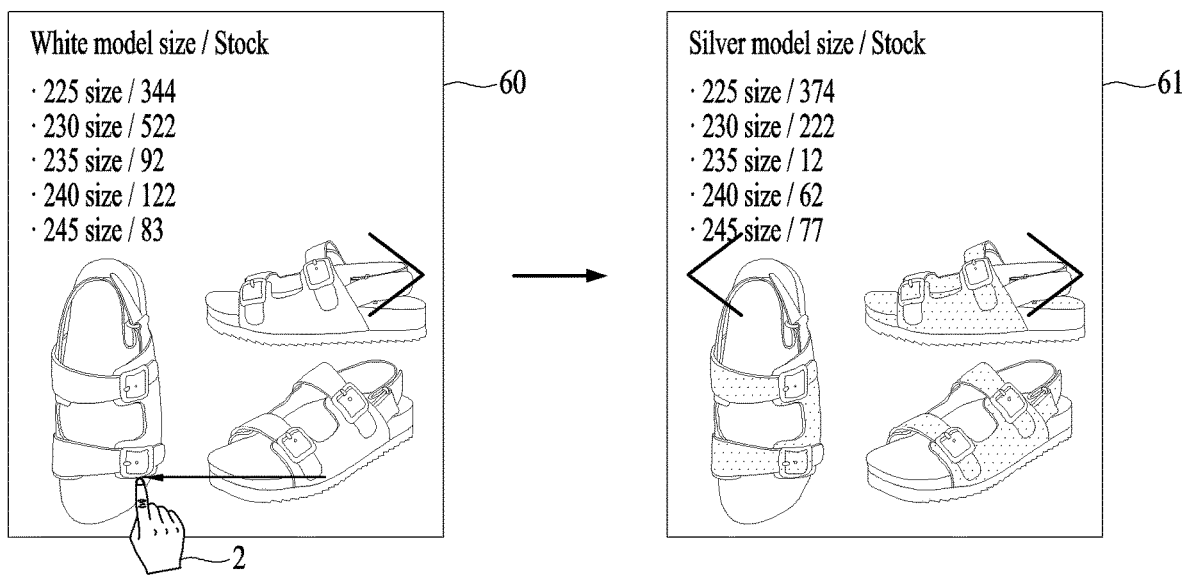
FIG. 12 is a diagram describing one embodiment of controlling a submenu responding to a second direction.

FIG. 12 is a diagram describing one embodiment of controlling a submenu responding to a second direction.

Referring to FIG. 12 (a), illustrated is a search menu screen 60 related to data contained in a play content. As described above, the search menu screen 60 may contain a menu related to data displayed on a content play screen when switched to a search menu. For one embodiment, when a content is an online shopping content and white shoes are described, a user can turn a user's head in a second direction. In response to the user's direction change, a mobile terminal can launch a search menu related to white shoes. For example, the search menu screen 60 may contain size types of white shoes and stock information according to the size types. Yet, the mobile terminal may provide a search function for other information.

The user may input a gesture for switching a screen. As described above, the mobile terminal can capture an object (e.g., finger) of a user using a camera and then detect the user's object. The mobile terminal can display a virtual object image 2 corresponding to the user's detected object. The mobile terminal can move the virtual object image 2 in response to a movement of the user's object. If recognizing a gesture of selection, the mobile terminal can select a region at which the virtual object image 2 is located. The user can switch the screen using the virtual object image 2.

Referring to FIG. 12 (b), illustrated is a search menu screen 61 switched to a different screen. In response to a user's command, the mobile terminal can switch a screen. The switched screen may contain in formation corresponding to a previous screen. For example, the switched search menu screen 61 may contain size types of silver shoes and stock information according to the size types. Meanwhile, the mobile terminal can provide a function of enabling a user to perform a search by applying a direct input. The mobile terminal may receive an input of a search word through an input tool represented as virtual reality (VR) or an input of a search word by voice and then search for information related to the inputted search word. Moreover, the mobile terminal may connect to a search site or a price comparison site.

Figure 13:
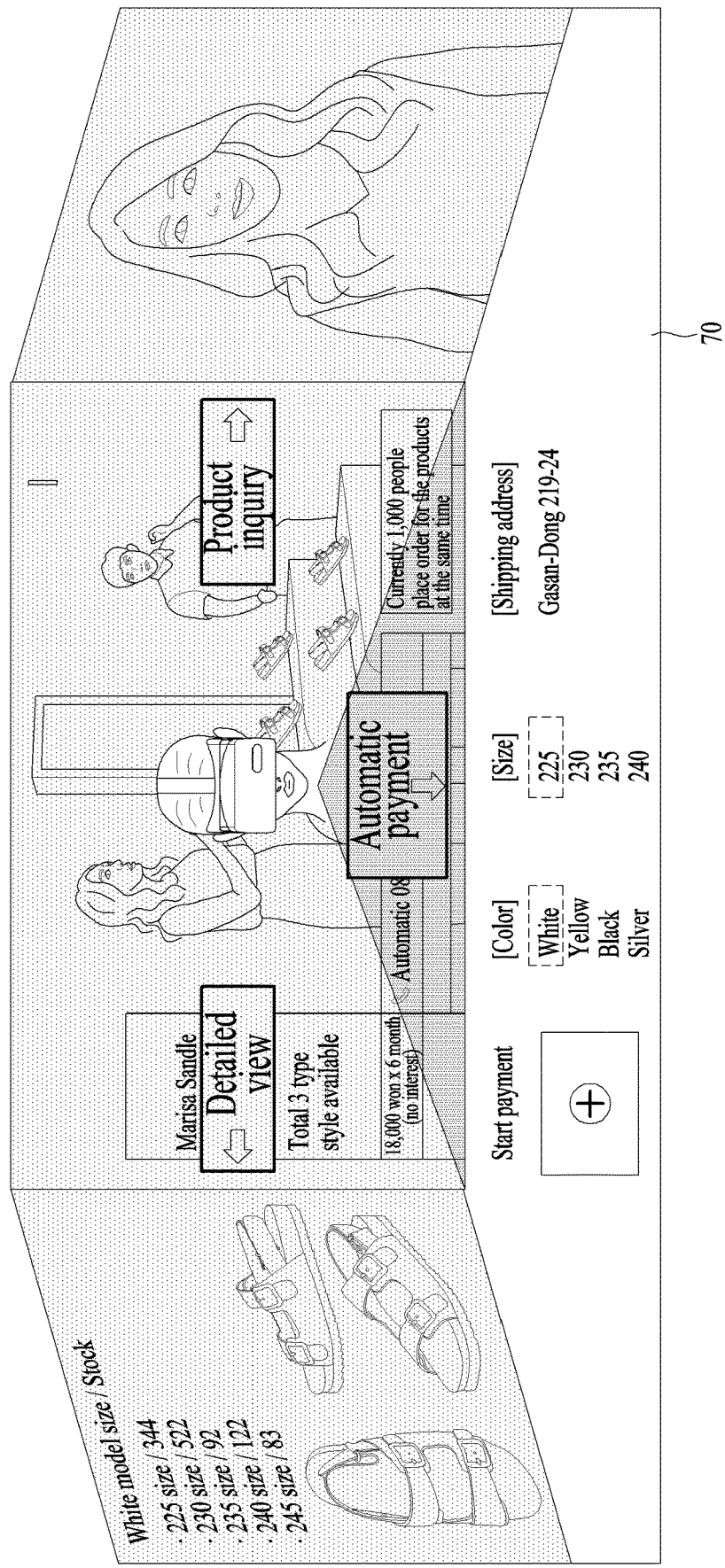
FIG. 13 is a diagram describing one embodiment of switching to a third direction.

FIG. 13 is a diagram describing one embodiment of switching to a third direction.

Referring to FIG. 13, illustrated is a mobile terminal that displays an input menu screen 70 related to a currently played data. As described above, the mobile terminal can play a content while located in a front direction of a user. The mobile terminal can rotate in a third direction while playing the content. The mobile terminal can launch a submenu responding to the third direction in response to the rotation in the third direction. For example, the second direction may be set to a bottom direction, and the submenu responding to the third direction may include an input menu. If the mobile terminal rotates over a first in the third direction, a notification of the submenu responding to the third direction can be displayed. If the mobile terminal rotates over a second angle greater than the first angle in the third direction, the submenu responding to the third direction can be displayed on a prescribed region of a display unit. As time passes, the mobile terminal can display the submenu responding to the third direction in full screen. After the submenu responding to the third direction has been displayed in full screen, although the user turns a user's head in a direction opposite to the third direction within a preset time, the mobile terminal can maintain the submenu responding to the third direction. Namely, a detailed embodiment for the mobile terminal to launch and display the submenu responding to the third direction is similar to the former process for launching the submenu responding to the first direction. Hence, relevant details shall be omitted herein. Meanwhile, when rotating in a top or bottom direction, although the mobile terminal rotates by the first angle only, the mobile terminal may launch the submenu.

The submenu responding to the third direction may include an input menu related to the currently played data. For example, if a current content play screen contains shoes of A-brand, the input menu screen 70 may include a purchase related screen of the shoes of the A-brand. The user should select a size or color for a purchase and input personal information for payment. A detailed input process shall be described as follows.

Figure 14:
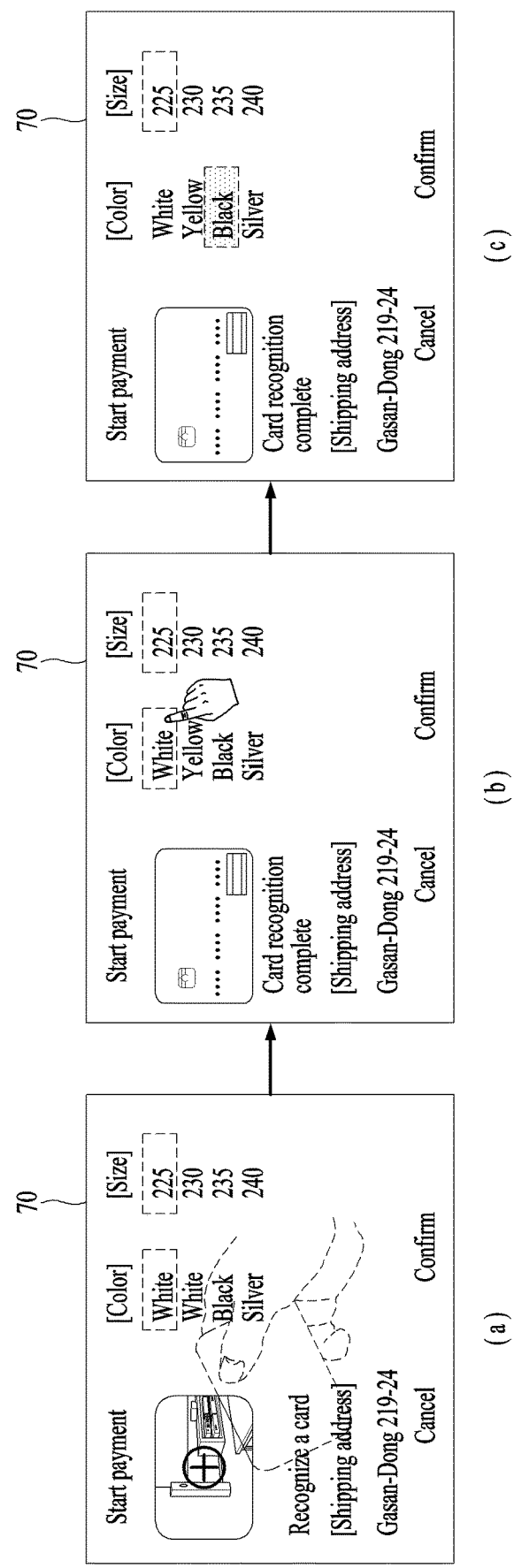
FIG. 14 is a diagram describing one embodiment of a submenu responding to a second direction.

FIG. 14 is a diagram describing one embodiment of a submenu responding to a second direction.

Referring to FIG. 14 (a), an input menu screen 70 for a purchase is illustrated. If a user turns a user's head in a third direction in the course of playing a content, a mobile terminal can display an input menu screen 70 for a purchase. The input menu screen 70 for the purchase may contain data included in a currently played screen of the content. For one embodiment, if the currently played screen of the content contains shoes, the input menu screen 70 for the purchase may contain data related to the shoes displayed on the screen. The input menu screen 70 for the purchase may contain color and size items of the shoes. If the mobile terminal receives and saves an input of information such as an address and the like in advance, the mobile terminal can display the saved information. Or, if the mobile terminal performs a user authentication process, it may display information inputted in the user authentication process. The input menu screen 70 for the purchase may display inputted user information such as an address and the like. The input menu screen 70 for the purchase may contain a card input window for recognizing a card to make a payment. The card input window may include a preview screen contained in the input menu screen 70 for the purchase. A user can situate a real card at the card input window to make a payment.

Referring to FIG. 14 (*b*), illustrated is the input menu screen 70 for the purchase, which can recognize a card to make a payment. If a real card is situated at the card input window, the mobile terminal can recognize information included in the real card. The mobile terminal can perform a payment process based on the recognized information. The mobile terminal may recognize a user object and then display a corresponding virtual object image. The mobile terminal may move the virtual object image in response to a movement of the user object. The mobile terminal can control a displayed menu and the like using the virtual object image. Hence, the user can select an item displayed on the input menu screen 70 for the purchase or control the screen, by moving a real object such as a hand or the like. Based on the user object movement, the mobile terminal can select a selection item. For example, the mobile terminal can select color, size and the like.

For another embodiment, on the input menu screen 70 for the purchase, a menu region including the selection item may be displayed semitransparently. Hence, the user can simultaneously watch the item displayed on the menu screen 70 and user's fingers. The user can situate the card for payment in the card input window region by checking a location of user's fingers easily. Meanwhile, the mobile terminal captures a user object (e.g., user's finger) and is then able to calculate information of coordinates on the input menu screen 70. The mobile terminal can be aware of coordinates information of an item displayed on the input menu screen 70. Hence, the mobile terminal can determine whether the item displayed on the input menu screen 70 and the user object are situated in the same region. When the displayed item and the user object are situated in the same region, if the user object inputs a gesture of a selection command, the mobile terminal can select the displayed item of the same region.

Referring to FIG. 14 (*c*), illustrated is the input menu screen 70 in which a payment is in progress. The mobile terminal recognizes card information for a payment and selects a selection item in response to a user's command. The mobile terminal can select a confirmed item by moving a virtual object image according to a movement of the user object. Once the confirmed item is selected, the mobile terminal can perform a payment process.

Figure 15:
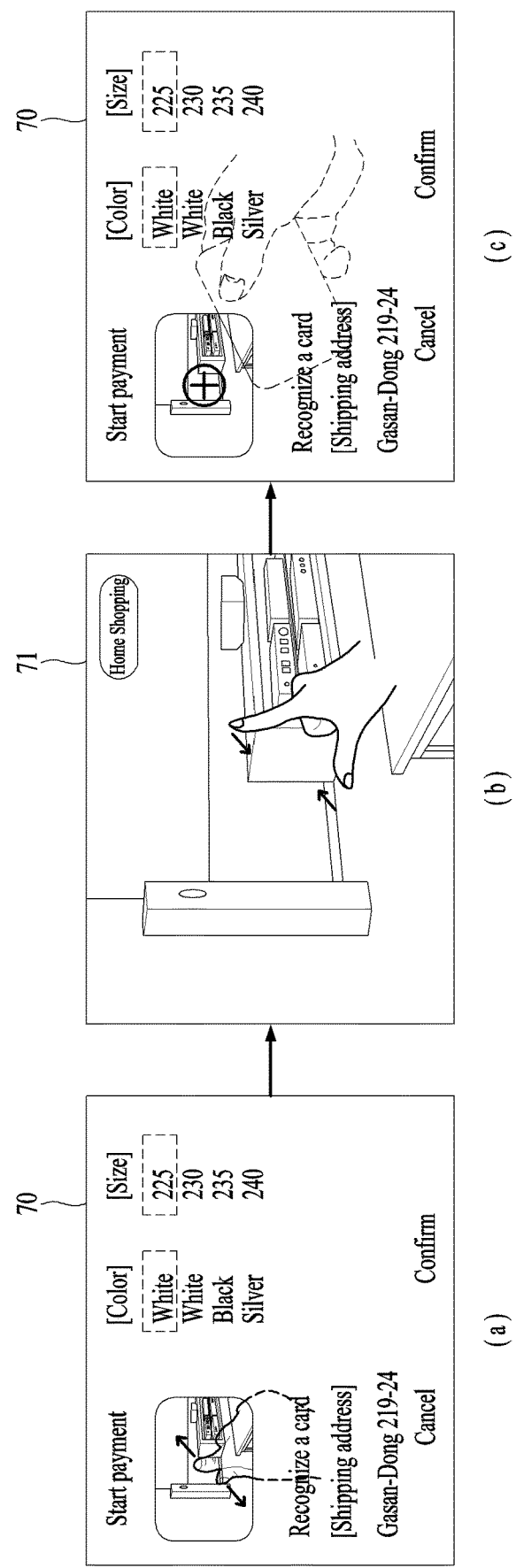
FIG. 15 is a diagram describing one embodiment of controlling a submenu responding to a third direction.

FIG. 15 is a diagram describing one embodiment of controlling a submenu responding to a third direction.

Referring to FIG. 15 (*a*), illustrated is an input menu screen 70 containing a card input window region. The rest region of the input menu screen 70 except the card input window region can be displayed non-transparently or semi-transparently. Namely, the rest region except the card input window region may have a non- or semi-transparent attribute. A user can input a gesture corresponding to a screen enlargement command to the card input window region. For example, the gesture corresponding to the screen enlargement command may include a pinch-out gesture.

Referring to FIG. 15 (*b*), illustrated is the input menu screen 70 having the enlarged card input window region. If the gesture corresponding to the screen enlargement command is inputted, the mobile terminal can enlarge the card input window region. Namely, the mobile terminal can display a preview screen 71 in full screen. The user can easily check locations of an ambient thing, a user's finger and the like. The user can input a gesture corresponding to a screen reduction command. For example, the gesture corresponding to the screen reduction command may include a pinch-in gesture.

Referring to FIG. 15 (*c*), illustrated is the input menu screen 70 in which the card input window region is reduced. If the gesture corresponding to the screen reduction command is inputted, the mobile terminal can reduce the card input window region. Namely, the mobile terminal can display the input menu screen 70 in a state equal to an initial state. If a card for payment is situated at the card input window region, the mobile terminal can recognize payment information. If the user selects a selection item and then selects a confirm button, the mobile terminal can perform a payment process.

Figure 16:
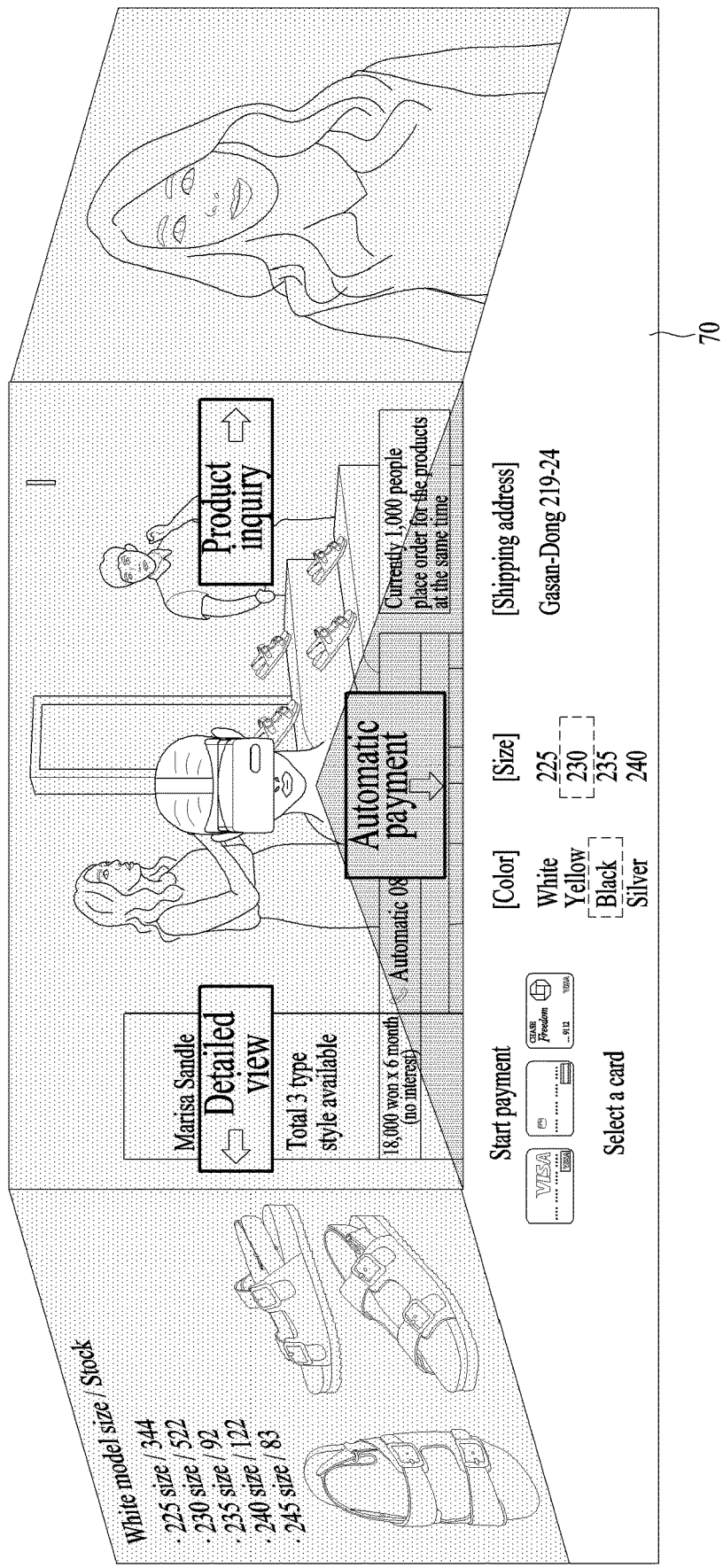
FIG. 16 is a diagram describing one embodiment of switching to a third direction with security authentication.

FIG. 16 is a diagram describing one embodiment of switching to a third direction with security authentication.

Referring to FIG. 16, illustrated is a mobile terminal that displays an input menu screen 70 related to a currently played data. The mobile terminal may launch a submenu responding to a third direction according to rotation in the third direction, and the submenu responding to the third direction may include an input menu. The submenu responding to the third direction may include an input menu related to the currently played data. For example, if a current content play screen contains shoes of B-style, the input menu screen 70 may include a purchase related screen of the shoes of the B-style.

Meanwhile, the mobile terminal may perform a user authentication process. The user authentication process may be already performed. Or, the user authentication process may be performed before the submenu responding to the third direction is displayed. For example, the mobile terminal may perform the user authentication process using a fingerprint recognition sensor of the mobile terminal (or, a portable device) or voice. If performing the user authentication process, the mobile terminal may display default user information on the input menu screen 70. For example, the mobile terminal may display a default payment card, a default address information and the like.

Figure 17:
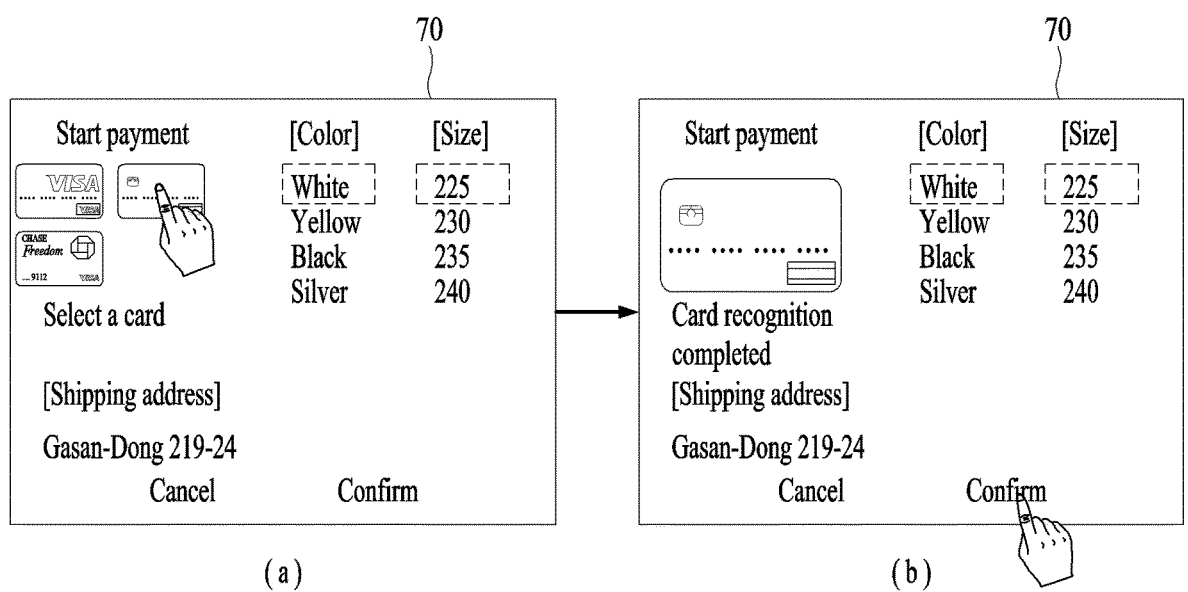
FIG. 17 is a diagram describing one embodiment of controlling a submenu responding to a third direction with security authentication.

FIG. 17 is a diagram describing one embodiment of controlling a submenu responding to a third direction with security authentication.

Referring to FIG. 17 (*a*), illustrated is an input menu screen 70 in which a user authentication process is completed. As described above, if the user authentication process is completed, the mobile terminal can include a default payment card, a default address information and the like. Hence, the mobile terminal may not display a card input window region. The input menu screen 70 may be displayed semitransparently. If the input menu screen 70 is displayed semitransparently, a user can view both an item and a user's finger (or, a user object) displayed on the input menu screen 70. The user can control an item displayed on the input menu screen 70 by moving the user's finger. Namely, the mobile terminal captures the user's finger and is then able to control the item displayed on the input menu screen 70 using location information of the user's captured finger.

For another embodiment, the input menu screen 70 may be displayed non-transparently. If the input menu screen 70 is displayed non-transparently, the user can view the item displayed on the input menu screen 70 only but cannot view the user's finger. The mobile terminal captures and recognizes the user's finger and is then able to display a virtual object image corresponding to the recognized user finger. The user can indirectly control the item displayed on the input menu screen 70 using the virtual object image. Namely, the mobile terminal captures the user's finger and is then able to create a virtual object image corresponding to the user's captured finger. The mobile terminal can control the item displayed on the input menu screen 70 using the created virtual object image.

The mobile terminal may include information of a plurality of cards as well as a default payment card. The mobile terminal can change a card to make a payment in response to a user's command.

Referring to FIG. 17 (b), illustrated is the input menu screen 70 from which a confirm button is selected. If the confirm button is selected, the mobile terminal can progress a payment process based on the selected card information.

So far, when a play content is an online shopping content, a corresponding embodiment is described. In the following, when a play content is a video lecture content, a corresponding embodiment is described.

Figure 18:
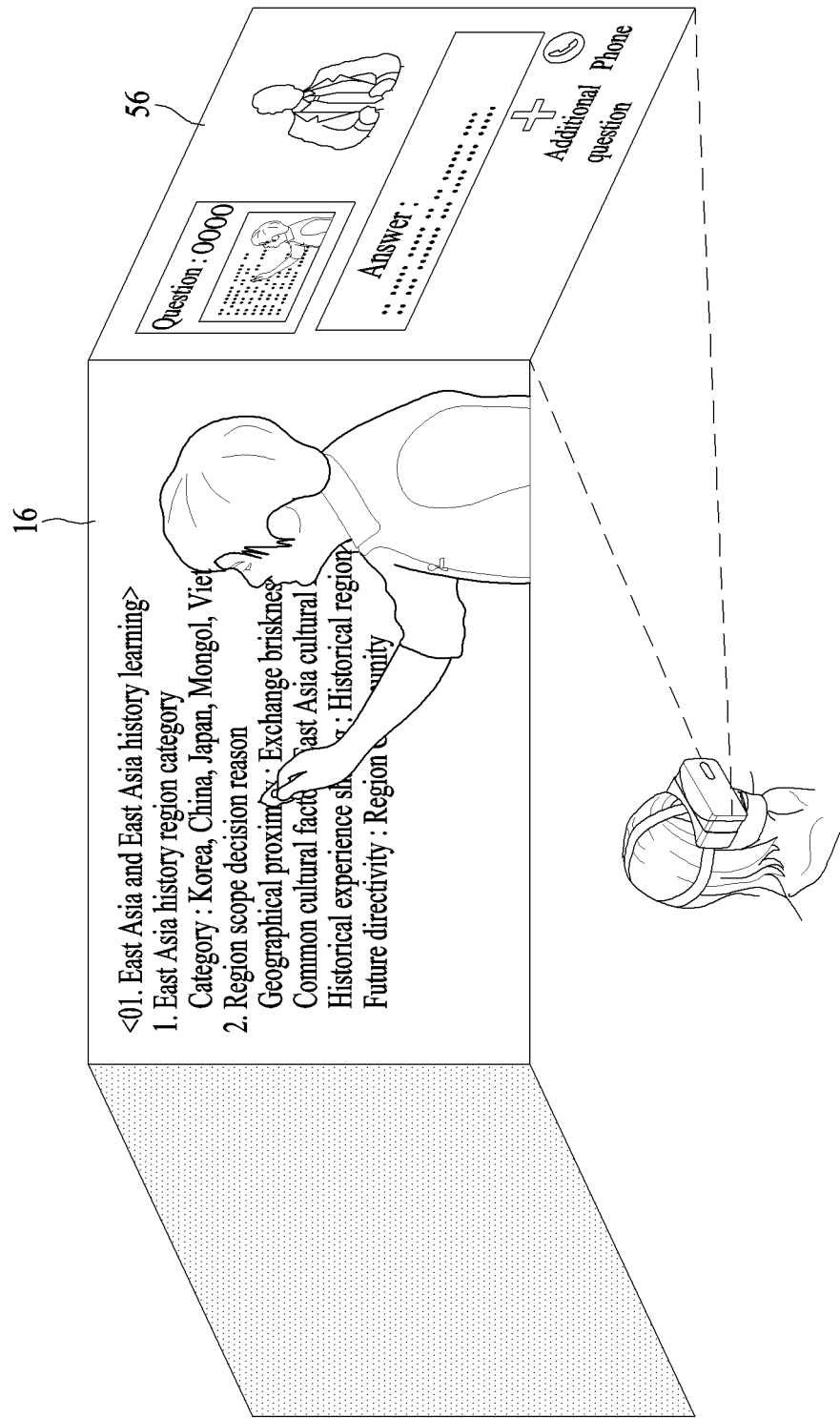
FIG. 18 is a diagram describing another embodiment of switching to a first direction.

FIG. 18 is a diagram describing another embodiment of switching to a first direction.

Referring to FIG. 18, illustrated is a mobile terminal having rotated over a first angle. A display unit can display a video lecture content screen 16. A user can turn a user's head over the first angle in the first direction. For example, the first direction can include a right direction and the first angle can be set to 10 degrees. The direction and angle can be set variously depending on specific situations.

If detecting that the direction is changed over the first angle in the first direction, the mobile terminal can display a notification of a submenu responding to the first direction on a prescribed region of the display unit corresponding to the first direction. For one embodiment, a direction of the mobile terminal can be changed over 10 degrees in a right direction. If detecting a direction change, the mobile terminal can display a notification 21 of a submenu on a right prescribed region of the display unit. For example, the submenu responding to the first direction may include a Q&A (question and answer) menu.

Or, if a direction is changed over the first angle in the first direction and the direction change is maintained over a first time, the mobile terminal can display a notification of a submenu responding to the first direction on a prescribed region of the display unit corresponding to the first direction. A user can easily recognize the submenu responding to the changed direction through the displayed notification information.

Illustrated is the mobile terminal having rotated over a second angle in the first direction. The second angle is greater than the first angle. If detecting that a direction is changed over the second angle in the first direction, the mobile terminal can launch a submenu responding to the first direction. Additionally, the mobile terminal may pause a play of a main content. The display unit can display a screen 56 for the launched submenu on a prescribed region of the display unit corresponding to the first direction. For one embodiment, the direction of the mobile terminal may be changed over 20 degrees in the right direction. If detecting the direction change, the mobile terminal can display a submenu running screen 56 on a right prescribed region of the display unit. Namely, the display unit may display a screen 16 of the paused main content on a wide region and also display the screen 56 of the currently launched submenu on the right prescribed region.

If a preset time expires, the mobile terminal can dim the screen 16 of the main content. Or, the mobile terminal may turn off the screen 16 of the main content. The mobile terminal can dim the paused main content and switch the submenu screen 56 displayed on the prescribed region to a full screen. Namely, the display unit can display the Q&A (question and answer) menu in screen. Although the screen displayed on the display unit is switched to the submenu displayed screen 56, the mobile terminal is located by rotating in the right direction over about 20 degrees from an initial location. Namely, the user turns a user's head at 20 degrees in the right direction.

Although the display unit displays the Q&A menu, the user turns the user's head in the right direction. It may be inconvenient for the user to watch the submenu for a long time while turning the user's head in the right direction. If the main content is dimmed and the Q&A menu is displayed in full screen, the user can turn the user's head in the direction opposite to the first direction. Namely, the user can turn the user's head in a front direction. In response to the user's direction change, the mobile terminal can rotate in the direction opposite to the first direction. Yet, after the submenu has been switched to the full screen, although the direction is changed into the opposite direction within a preset time, the mobile terminal may ignore the direction change into the opposite direction. The user can watch the screen switched to the submenu conveniently and comfortably.

Meanwhile, the user can ask a question using a gesture. If the user turns the user's head in the first direction, the mobile terminal can detect the direction change into the first direction. The mobile terminal can display the Q&A menu screen 56. The Q&A menu screen 56 may contain a virtual lecturer image. The mobile terminal can receive an input of a question through voice or a virtual image input means. If the input of the question is ended, the user can nod the user's head up and down. If detecting an up-and-down movement after the question input, the mobile terminal can send the inputted question to a server (or a terminal device). The mobile terminal can capture a paused content play screen and then send the captured content play screen as well. The server can search for corresponding answer information using the received question. If finding the answer information, the server can send the found answer information to the mobile terminal. The mobile terminal can display the received answer information. If failing to search for the corresponding answer information, the mobile terminal can send question data to a lecturer. Moreover, the Q&A menu screen 56 may contain an additional question item and a phone item with the lecturer.

FIG. 19 is a diagram describing one embodiment of a mobile terminal operation according to an angle of switching to a first direction.

Referring to FIG. 19 (a), illustrated is a Q&A menu screen 56a that displays history data. If rotating in a first direction, a mobile terminal can launch a Q&A menu. For one embodiment, if an angle is equal to or smaller than a preset angle, the mobile terminal can display a question list related to data contained in a content play screen, which was displayed on rotation, by maintaining a play of a content. For example, the present angle can be set to 30 degrees. A user can select a single question from the question list. The mobile terminal sends the selected question to a server, and the server can send an answer corresponding to the received question to the mobile terminal.

Referring to FIG. 19 (*b*), illustrated is a Q&A menu screen 56*b* for inputting a question. If the mobile terminal rotates over the preset angle in a first direction, the mobile terminal may pause the play of the content and capture a currently displayed content play screen. For example, the preset angle can be set to 30 degrees. The mobile terminal can receive an input of a question by voice from a user. Or, the mobile terminal may display a virtual input means and receive an input of a question through a user's gesture. The mobile terminal can send the captured play screen and the inputted question to the server.

The server can search for an answer to the received question. The question sent by the mobile terminal may include a question contained in the question history (or list). Or, the question sent by the mobile terminal may include a frequently asked question. The server can quickly search for the answer to the received question. The mobile terminal can quickly receive the answer from the server while displaying the Q&A menu screen 56 before switching to the content play screen 16. The user may check the answer and then input an additional question. Or, the user can have a phone conversation with a lecturer using a phone menu.

Figure 20:
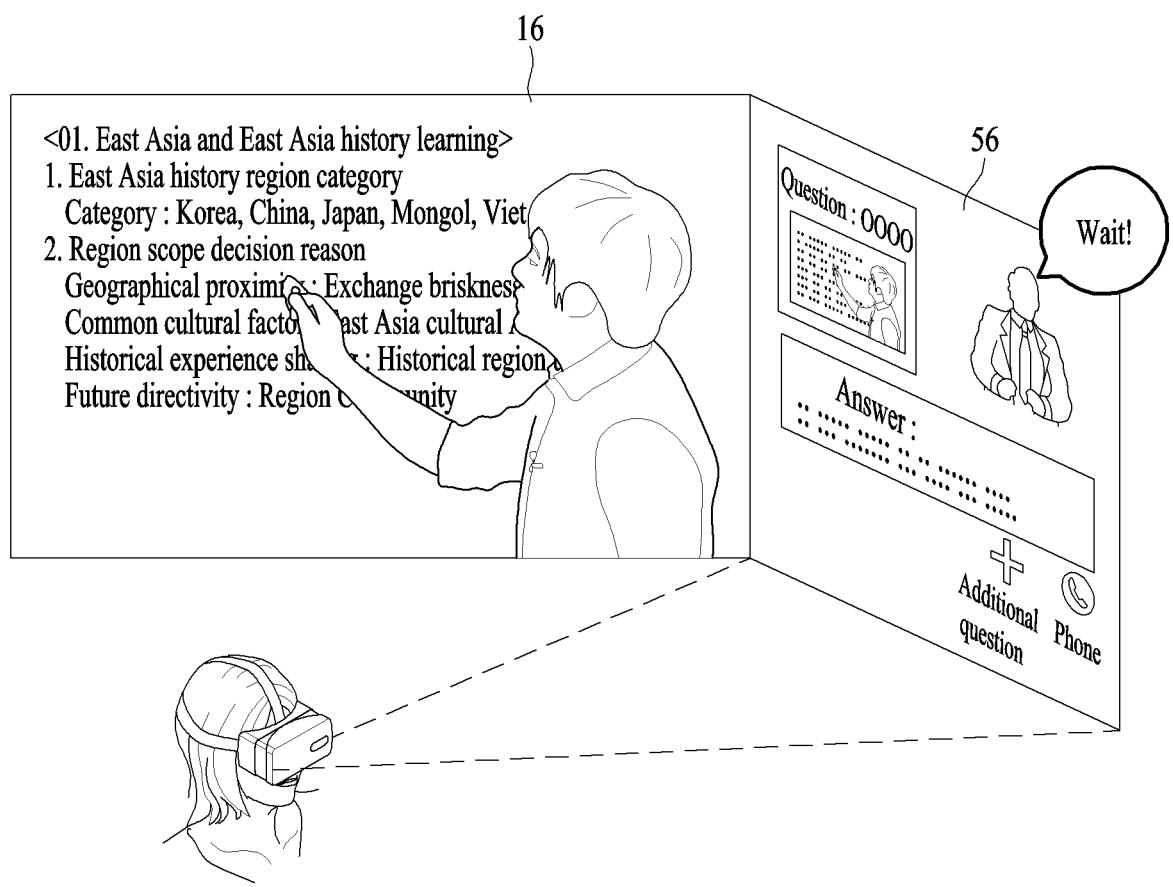
FIG. 20 is a diagram describing a first embodiment of processing an inputted question of a user.

FIG. 20 is a diagram describing a first embodiment of processing an inputted question of a user.

Referring to FIG. 20, illustrated is a mobile terminal that outputs a waiting message. A server can receive question data from the mobile terminal and search for answer data for a question. If requiring a time for the search for the answer data, the server can send a waiting signal to the mobile terminal. And, the mobile terminal can output a waiting message to a Q&A menu screen 56. A user may turn a user's head in a direction opposite to a first direction. The mobile terminal can display a content play screen 16. Namely, the mobile terminal can play a content.

Figure 21:
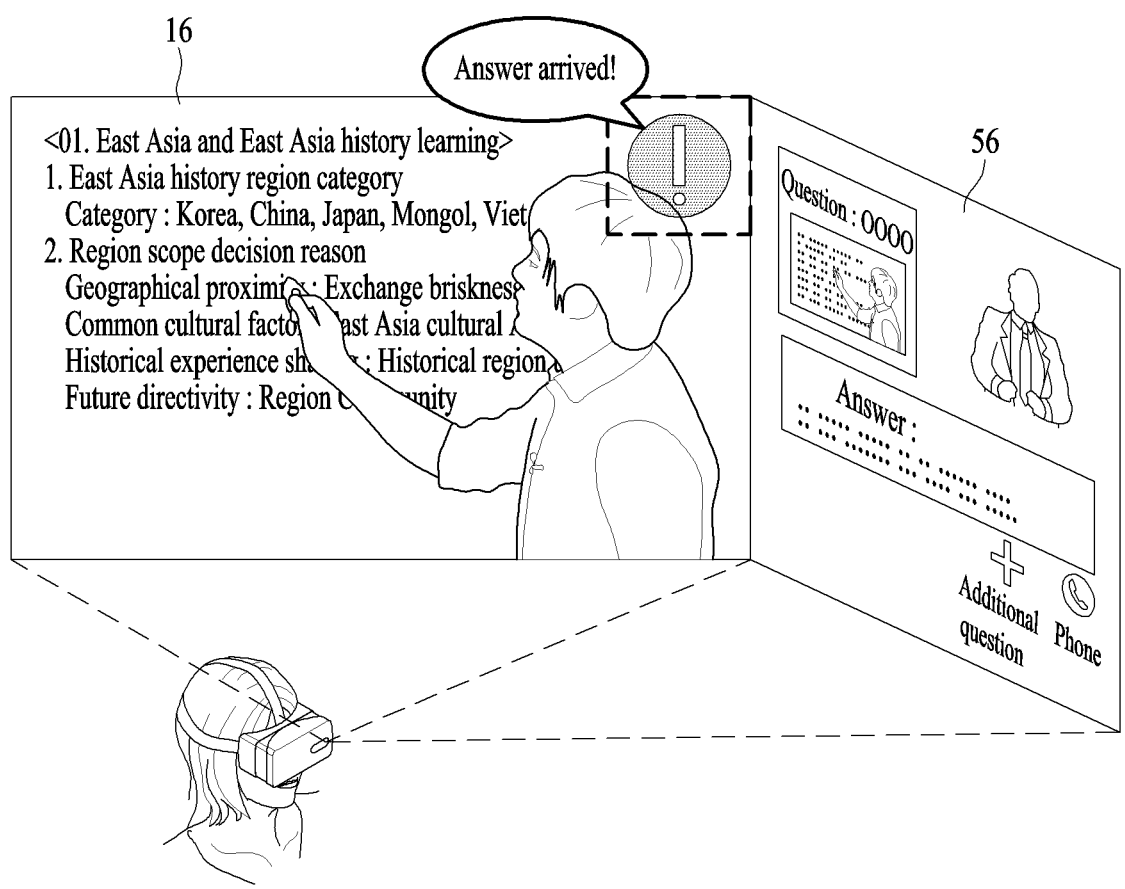
FIG. 21 is a diagram describing a second embodiment of processing an inputted question of a user.

FIG. 21 is a diagram describing a second embodiment of processing an inputted question of a user.

Referring to FIG. 21, illustrated is a mobile terminal that outputs an answer data received message. The mobile terminal can continue to play a content until receiving answer data. A user can watch a video lecture. If receiving answer data from a server, the mobile terminal can output a received message to a content play screen 16. The user can turn a user's head in a first direction. The mobile terminal may display a Q&A menu screen 56 and display the received answer data.

Meanwhile, the mobile terminal can set up an answer data display time. For example, the mobile terminal can select one of items 'View received answer data directly', 'View later if it takes a predetermined time or more until answer data reception', 'View after an end of a currently watched lecture' and the like. When the item 'View received answer data directly' is selected, if answer data is received in the course of a content playback, the mobile terminal can output an answer data received message. If switching to a first direction, the mobile terminal can display the answer data. Or, when the item 'View received answer data directly' is selected, if answer data is received in the course of a content playback, the mobile terminal may pause the currently played content automatically and display the answer data.

When the item 'View later if it takes a predetermined time or more until answer data reception' is selected, the mobile terminal can output a waiting message. When the item 'View after an end of a currently watched lecture' is selected, if the lecture is ended, the mobile terminal may output an answer data received message or switch to an answer data display screen automatically. If the item 'View later if it takes a predetermined time or more until answer data reception' or the item 'View after an end of a currently watched lecture' is selected, a plurality of answer data may be displayed at a time.

Figure 22:
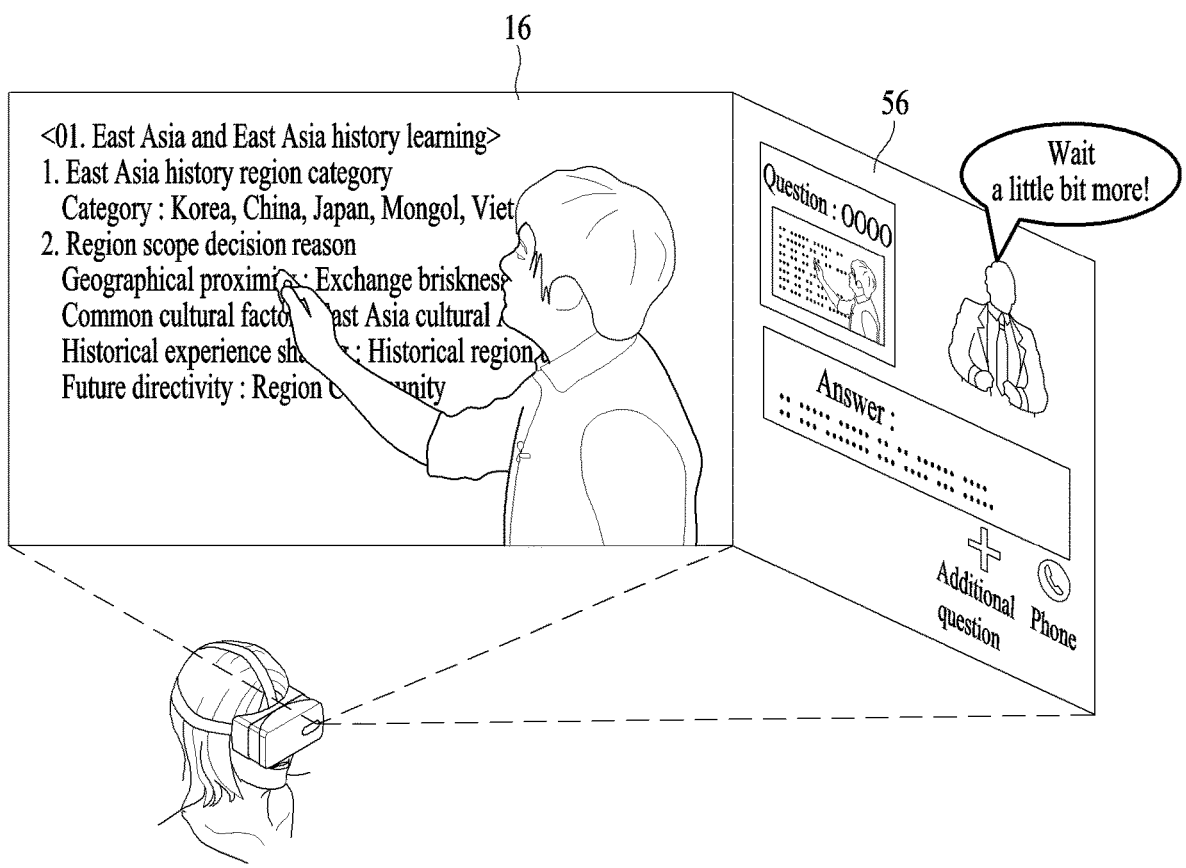
FIG. 22 is a diagram describing a third embodiment of processing an inputted question of a user.

FIG. 22 is a diagram describing a third embodiment of processing an inputted question of a user.

Referring to FIG. 22, illustrated is a mobile terminal that outputs a waiting message. The mobile terminal can play a content. A user can turn a user's head in a first direction. The mobile terminal can pause a content play in response to a user's direction change. And, the mobile terminal can switch a content play screen 16 to a Q&A screen 56. If failing to receive answer data from a server yet, the mobile terminal can output a waiting message. The user can turn the user's head in a direction opposite to the first direction. The mobile terminal can play the paused content continuously. The user can watch the content. Or, the user can input a new question data. If receiving the input of the new question data, the mobile terminal can send it to a server.

Figure 23:
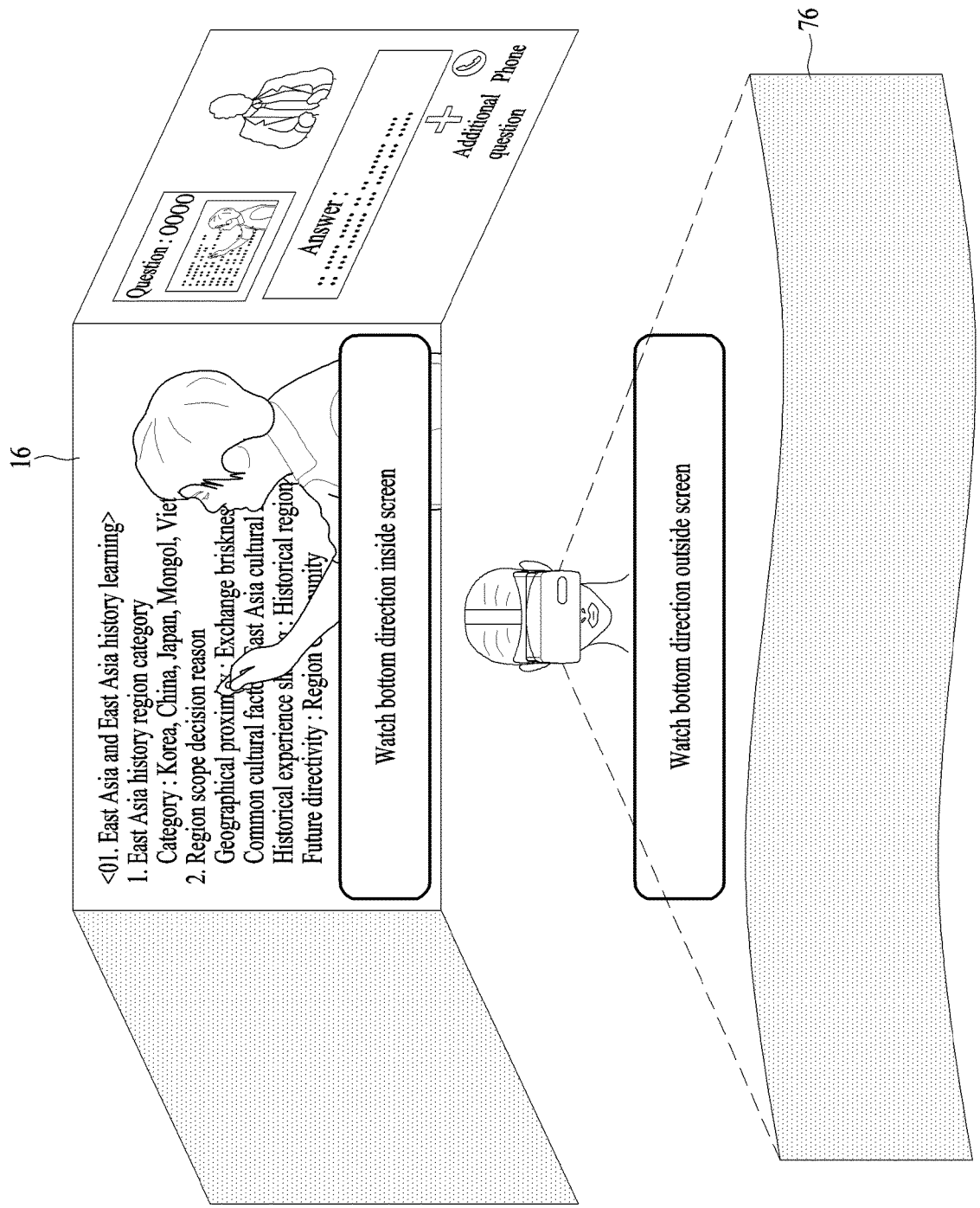
FIG. 23 is a diagram describing one embodiment of switching to a third direction.

FIG. 23 is a diagram describing one embodiment of switching to a third direction.

Referring to FIG. 23, illustrated is a mobile terminal that launches a submenu responding to a third direction. For example, the third direction may include a bottom direction and the submenu responding to the third direction may include an input menu related to data of a displayed content. For one embodiment, the mobile terminal 16 can display a content play screen 16. A user can turn a user's head in a bottom direction. If the user turns the user's head in the bottom direction within the screen, the mobile terminal can capture a currently displayed content screen. The mobile terminal may receive an input of a memo by displaying a virtual input means. The bottom direction within the screen may mean a bottom direction on a content played screen. If the user's memo is ended, the mobile terminal can save the captured screen and the inputted memo together.

Meanwhile, while a Q&A menu screen is displayed, if the user turns the user's head in a bottom direction outside the screen, the mobile terminal can display an input menu screen 76 related to data of the currently played content. The mobile terminal can store a content capture image on inputting a question, question data, answer data, user input memo and the like together. The input menu screen 76 may contain the aforementioned storage data. Audio data can be stored in the input menu screen 76 by being converted into text data, and the input menu screen may be configured in form of a note or pad. The bottom direction outside screen may mean a bottom direction on a screen (e.g., Q&A menu screen) other than a content play screen.

Figure 24:
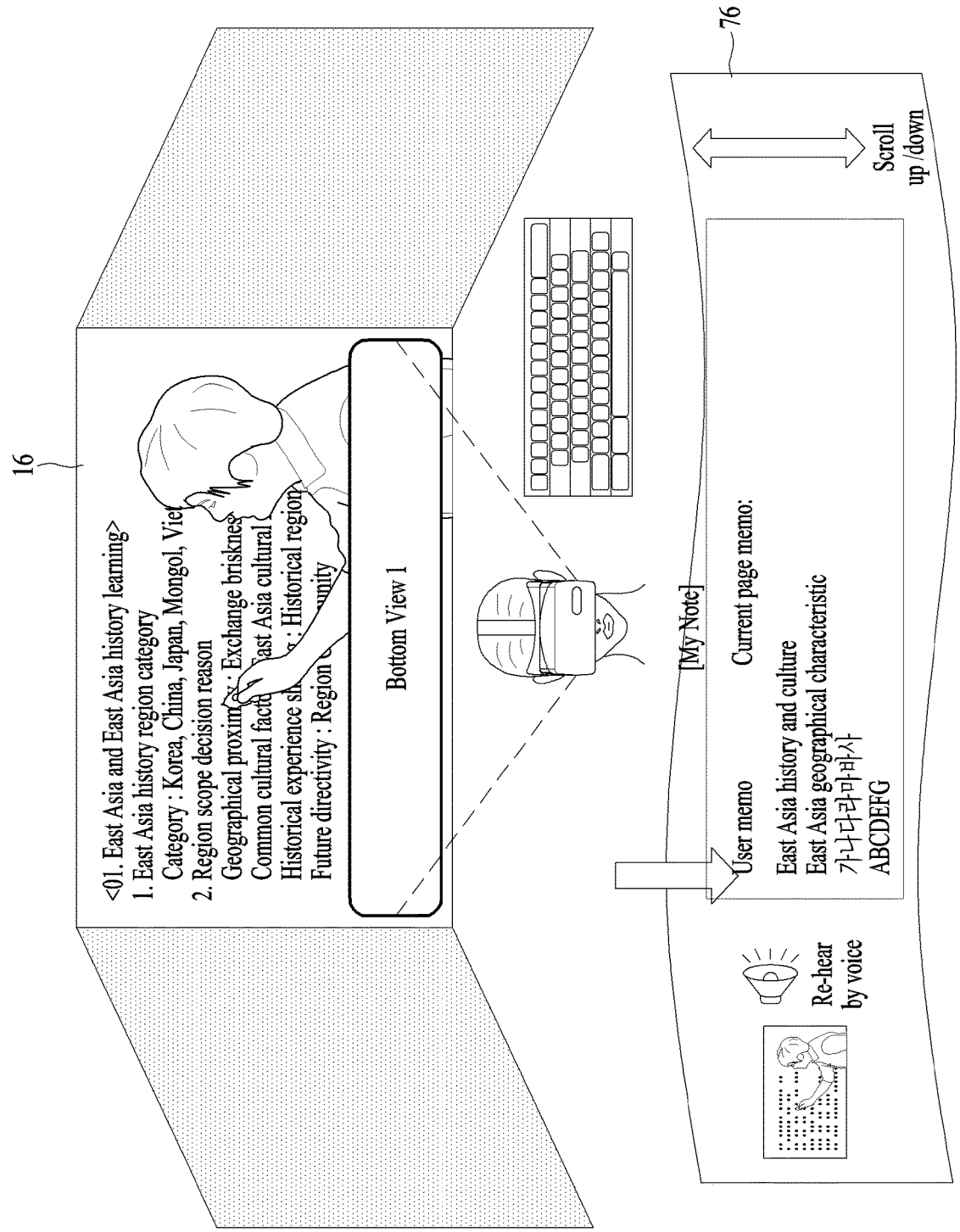
FIG. 24 is a diagram describing one embodiment of a submenu responding to a second direction.

FIG. 24 is a diagram describing one embodiment of a submenu responding to a second direction.

Referring to FIG. 24, illustrated is a mobile terminal that displays a submenu if a user turns a user's head in a bottom direction inside a screen. The user can watch a content. The content may include a lecture content. If the user gazes at a lower part of a content play screen 16 in the course of playing a content, the mobile terminal can display an input menu screen 76. The mobile terminal can display a virtual input means. For example, the virtual input means may include a virtual keyboard, a virtual keypad, a virtual mouse and the like. The user can input a memo using the virtual input means. As described above, a camera can create a virtual object image corresponding to a user object by capturing the user object. The mobile terminal can receive an input of a memo from the user based on the virtual object image and coordinates information of the virtual input means. The mobile terminal can play a content without stopping playing the content. Moreover, the mobile terminal captures a content play screen when the user turns the user's head in a bottom direction within a screen. And, the mobile terminal can save the captured screen together with the inputted memo. Hence, the user can input a memo related to a current content quickly in the course of a lecture.

Figure 25:
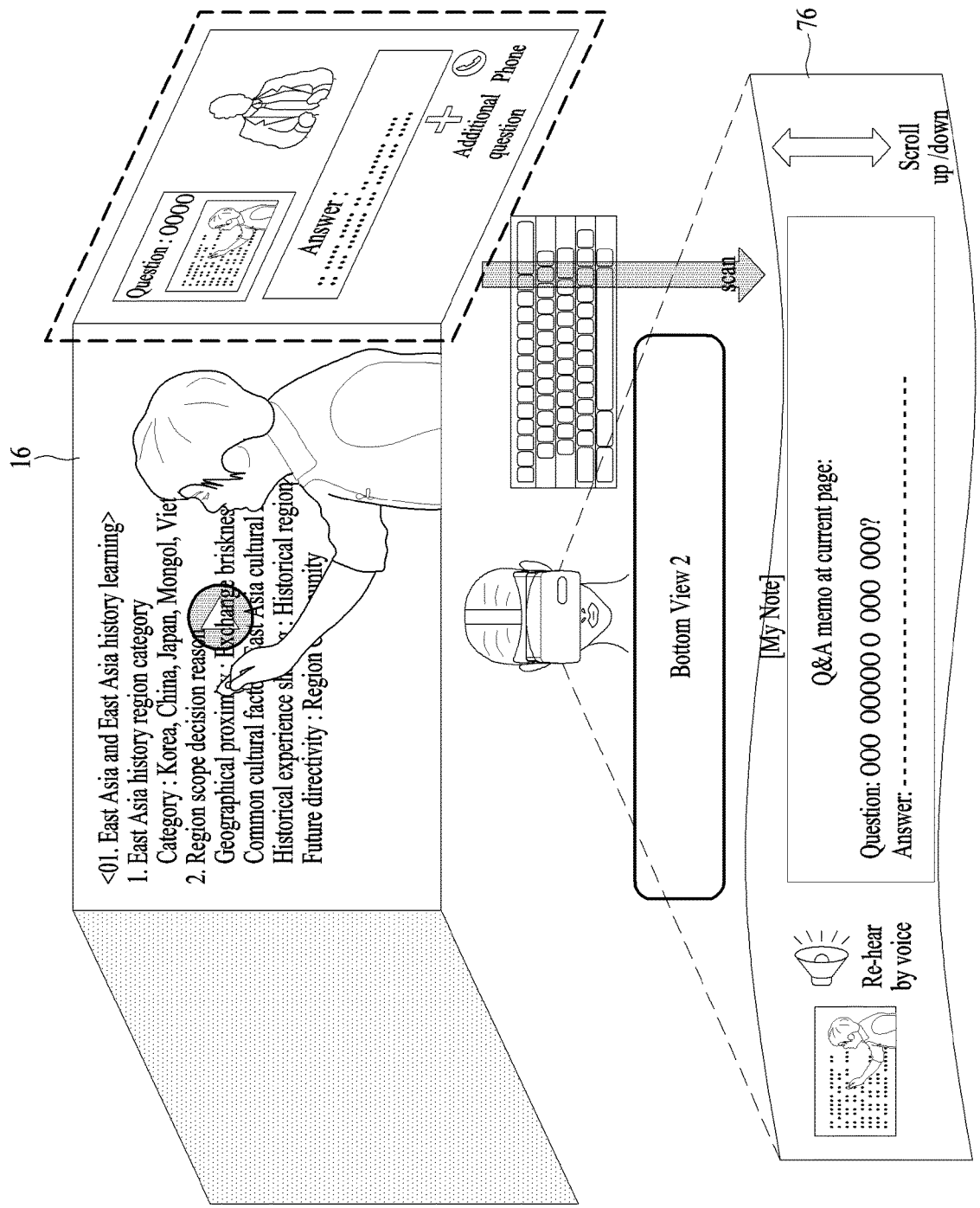
FIG. 25 is a diagram describing another embodiment of a submenu responding to a second direction.

FIG. 25 is a diagram describing another embodiment of a submenu responding to a second direction.

Referring to FIG. 25, illustrated is a mobile terminal that displays a submenu if a user turns a user's head in a bottom direction outside a screen. The user can turn the user's head in a first direction while watching a content. In response to the user's direction change, the mobile terminal can switch a content play screen 16 to a Q&A menu screen. While the Q&A menu screen is displayed, the user can turn the user's head in the bottom direction. In response to the user's direction change, the mobile terminal can display an input menu screen 76 related to data. The mobile terminal can pause a content play. The mobile terminal can display a virtual input means. The user can input a memo using the virtual input means. The input menu screen 76 may contain a captured content screen, question data and answer data. If switching to the bottom direction outside the screen, the mobile terminal can control the captured content screen, question data and answer data to be automatically contained in the input menu screen. The captured content screen may include a screen that is currently played when the user turns the user's head. The question data and the answer data may include data currently displayed on the Q&A menu screen. The user can add, delete and edit data contained in the input menu screen 76 using the virtual input means.

Figure 26:
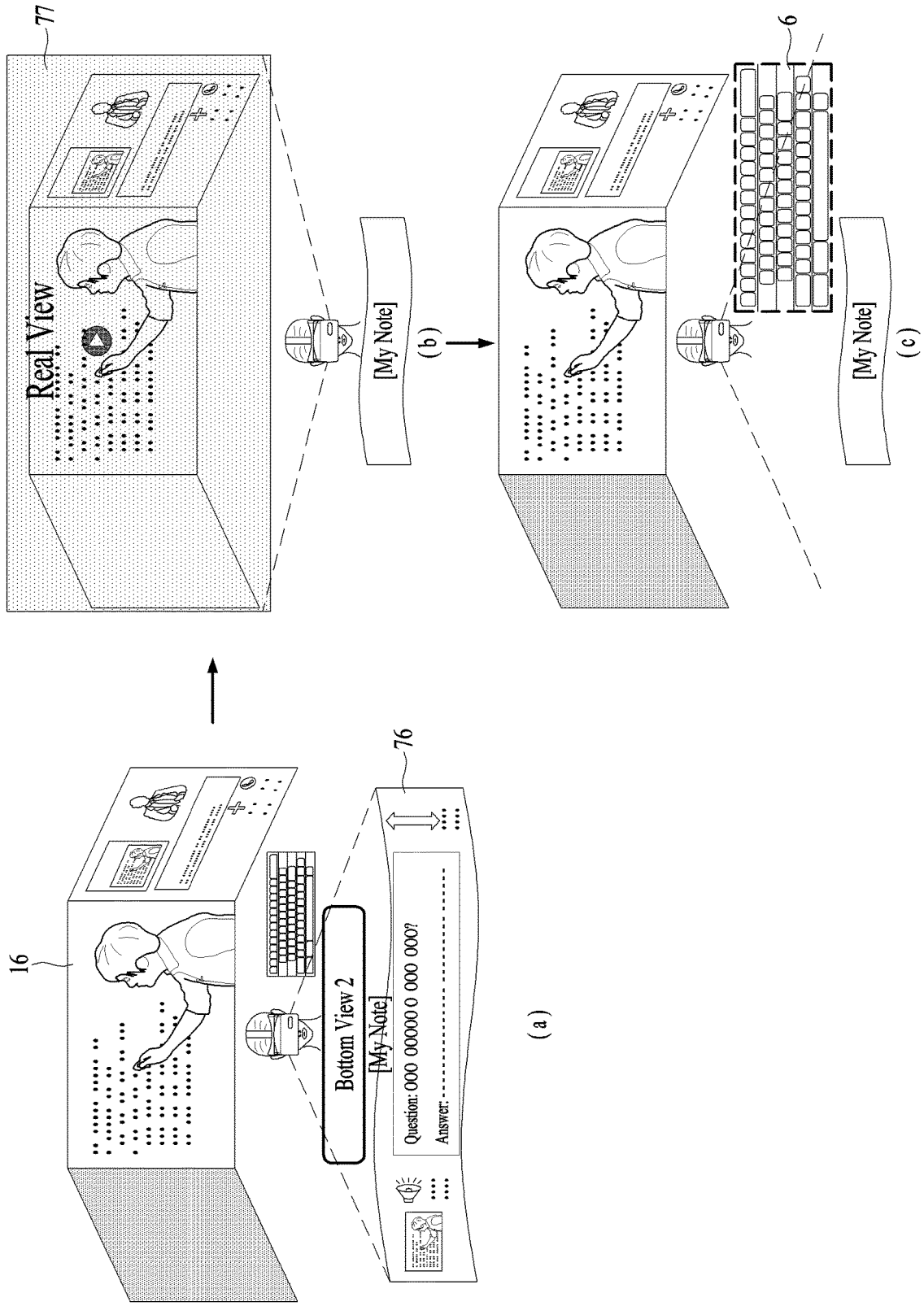
FIG. 26 is a diagram describing further embodiment of a submenu responding to a second direction.

FIG. 26 is a diagram describing further embodiment of a submenu responding to a second direction.

Referring to FIG. 26 (a), illustrated is a mobile terminal that displays a submenu if a user turns a user's head in a third direction. The mobile terminal can display a content play screen 16. If the user turns the user's head in a bottom direction inside the screen or a bottom direction outside the screen, the mobile terminal can display an input menu screen 76 related to data contained in a content. The mobile terminal may display a virtual input means and receive an input of memo. The user can turn the user's head in the right or left direction while looking down.

Referring to FIG. 26 (b), illustrated is the mobile terminal that displays a real view. If determining that the mobile terminal rotates right and left within a predetermined radius while facing downward, the mobile terminal can switch a currently display screen to a preview screen 77. The user can watch a real external image. Namely, the mobile terminal can switch to a real mode from a VR mode. The user can turn the user's head in the bottom direction again.

Referring to FIG. 26 (c), illustrated is the mobile terminal switched to the VR mode. If the user turns the user's head in the bottom direction, the mobile terminal can switch to the VR mode from the real mode. The mobile terminal can display the input menu screen 76 and a virtual input means 6.

Figure 27:
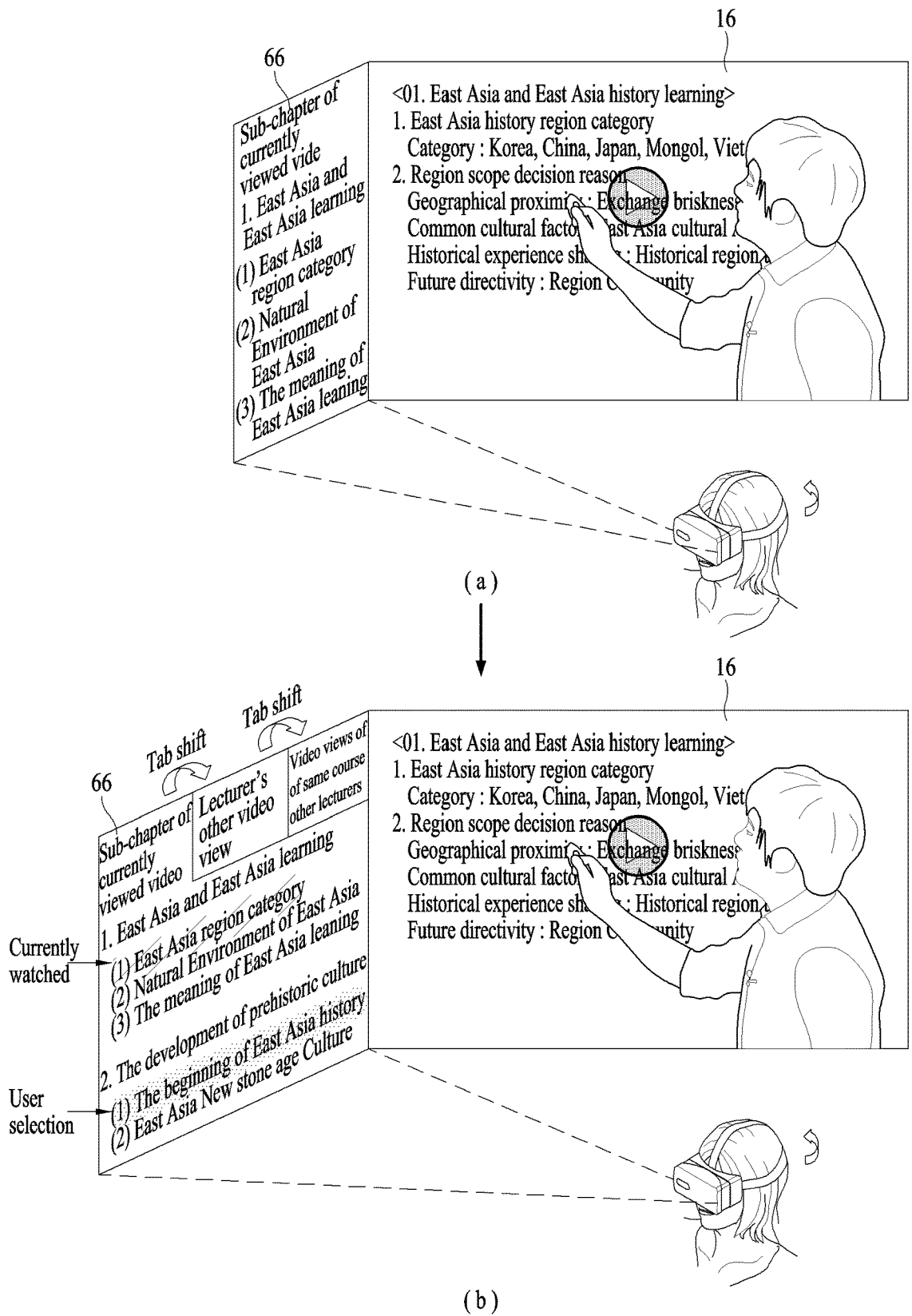
FIG. 27 is a diagram describing one embodiment of switching to a second direction.

FIG. 27 is a diagram describing one embodiment of switching to a second direction.

Referring to FIG. 27 (a), illustrated is a search menu screen 66 related to data of a currently played content. If rotating in a second direction, the mobile terminal can launch a search menu. For one embodiment, in case of an angle equal to or smaller than a preset angle, the mobile terminal can display a search menu related to data contained in a content play screen displayed on rotation. For example, the preset angle can be set to 30 degrees. And, the search menu may include a detailed content table menu related to the content play screen. A user can select a single content table from the detailed content table menu. The mobile terminal can display data related to the selected content table. Or, the mobile terminal may switch a current content to a content of the selected content table and then play the corresponding content.

Referring to FIG. 27 (b), an extended search menu screen 66 is illustrated. If the mobile terminal rotates over the preset angle in the second direction, the mobile terminal can display the extended search menu. For example, the preset angle can be set to 30 degrees. The mobile terminal can include a detailed content table item related to the content play screen, another content item of a lecturer, a content item of the same course by another lecturer, and the like. Each item can be shifted in response to a tab command. In response to a user's command, the mobile terminal can execute a selected content table or a selected content. Namely, the mobile terminal can display the selected content table or the selected content on the content play screen 16.

Figure 28:
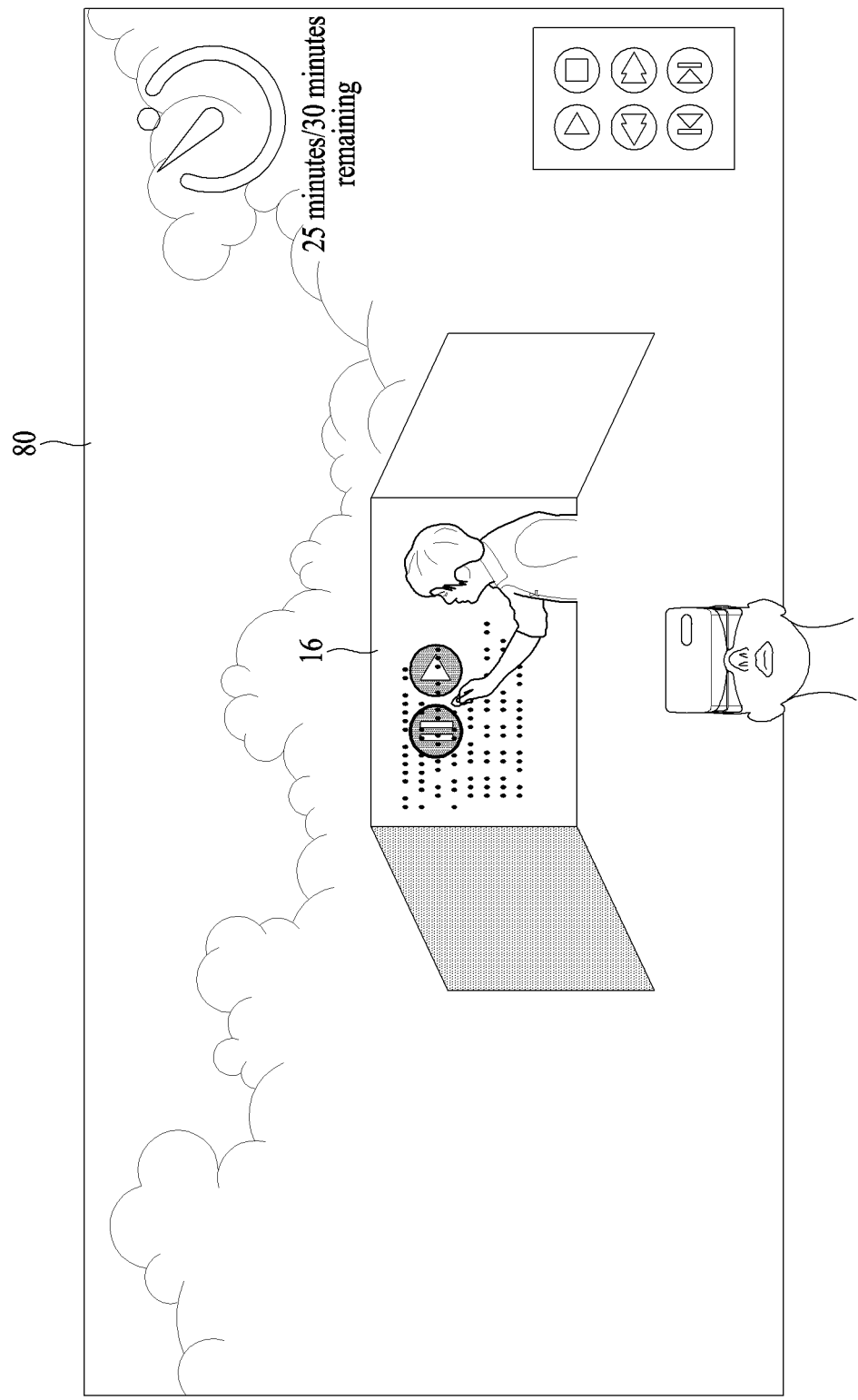
FIG. 28 is a diagram describing one embodiment of switching to a fourth direction.

FIG. 28 is a diagram describing one embodiment of switching to a fourth direction.

Referring to FIG. 28, illustrated is a mobile terminal that launches a submenu responding to a fourth direction. For example, the fourth direction may be set to a top direction. The submenu responding to the fourth direction may be a control menu of a currently played screen. For one embodiment, a user can turn a user's head in a top direction in the course of viewing a content. The mobile terminal may pause the currently played content and display a preset screen 80. The preset screen 80 may include an image of giving a user a comfortable feeling like sky, ranch, meadow, etc. Or, the preset image 80 may include an image set up by a user. The user can set up a time using a timer, and the mobile terminal can display a time-set timer. If the setup time expires, a continuous view button can be activated. If the continuous view button is selected, the mobile terminal can resume the paused content. Or, the mobile terminal may display a content control button. The mobile terminal may receive an input of a user's touch or action gesture and then resume the paused content. For example, if the user selects the play button displayed on the mobile terminal, the mobile terminal can resume the content. Or, if the user nods or shakes the user's head at a preset count or angle, the mobile terminal can resume the content.

So far, various embodiments are described. In the following, a mobile terminal controlling method is described.

Figure 29:
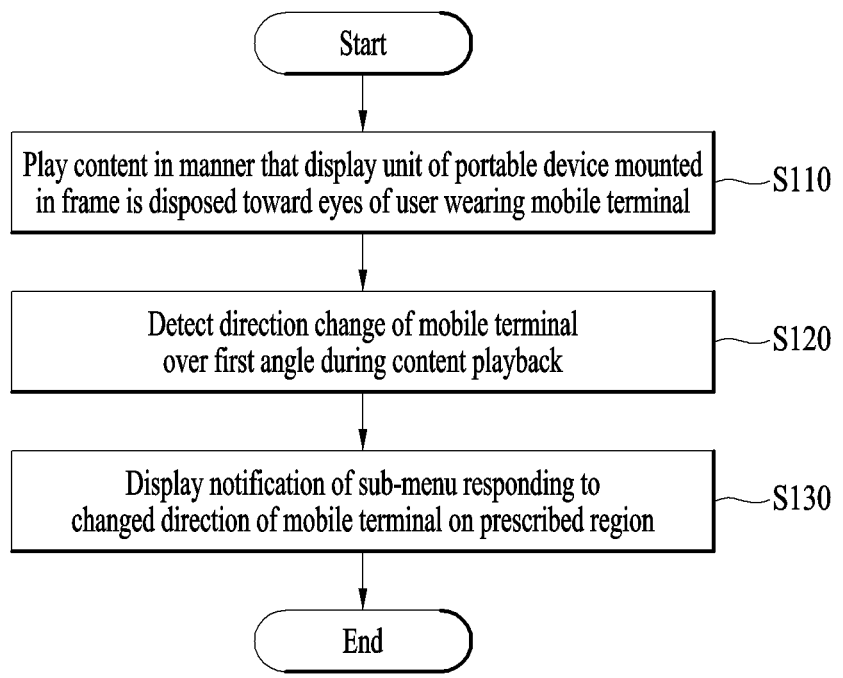
FIG. 29 is a flowchart for a method of controlling a mobile terminal according to one embodiment of the present invention.

FIG. 29 is a flowchart for a method of controlling a mobile terminal according to one embodiment of the present invention.

Referring to FIG. 29, a display unit of a portable device mounted in a frame of a mobile terminal is disposed toward eyes of a user wearing the mobile terminal, and the mobile terminal can play a content [S110]. The mobile terminal may include a display unit of its own. Or, the portable device may be mounted in the mobile terminal. And, the display unit of the portable device can play a role as a main display unit of the mobile terminal. Here, the mobile terminal can be referred to as a mobile terminal system. Hence, the mobile terminal in the present specification may mean a mobile terminal or a mobile terminal system.

The mobile terminal can sense a direction change over a first angle in the course of playing the content [S120]. The mobile terminal can display a notification of a submenu responding to the changed direction on a prescribed region [S130]. If a direction is changed over a second angle greater than the first angle, the mobile terminal pauses the play of the content and launches a submenu, thereby displaying a screen for the launched submenu on a first prescribed region. And, the first prescribed region may include a region responding to the changed direction of the mobile terminal. The mobile terminal can launch the submenu based on data contained in a play screen of the paused content. The mobile terminal can rotate in each direction and launch a submenu responding to each of the directions.

In the following, a method of virtually controlling an external device sensed through a camera provided to a mobile terminal based on AR (augmented reality) and a method of actually controlling an external device by sending a signal to the external device are described with reference to FIGS. 30 to 45.

For embodiments of FIGS. 30 to 45, operations performed in a mobile terminal can be controlled by the controller 180 of FIG. 1A. For clarity, such operations are generally shown and described as performed/controlled by the mobile terminal. Meanwhile, various embodiments described in the present invention can be implemented independently or in combination. And, a sensing unit described in the present invention may correspond to the user input unit or the sensing unit in FIG. 1A.

Figure 30:
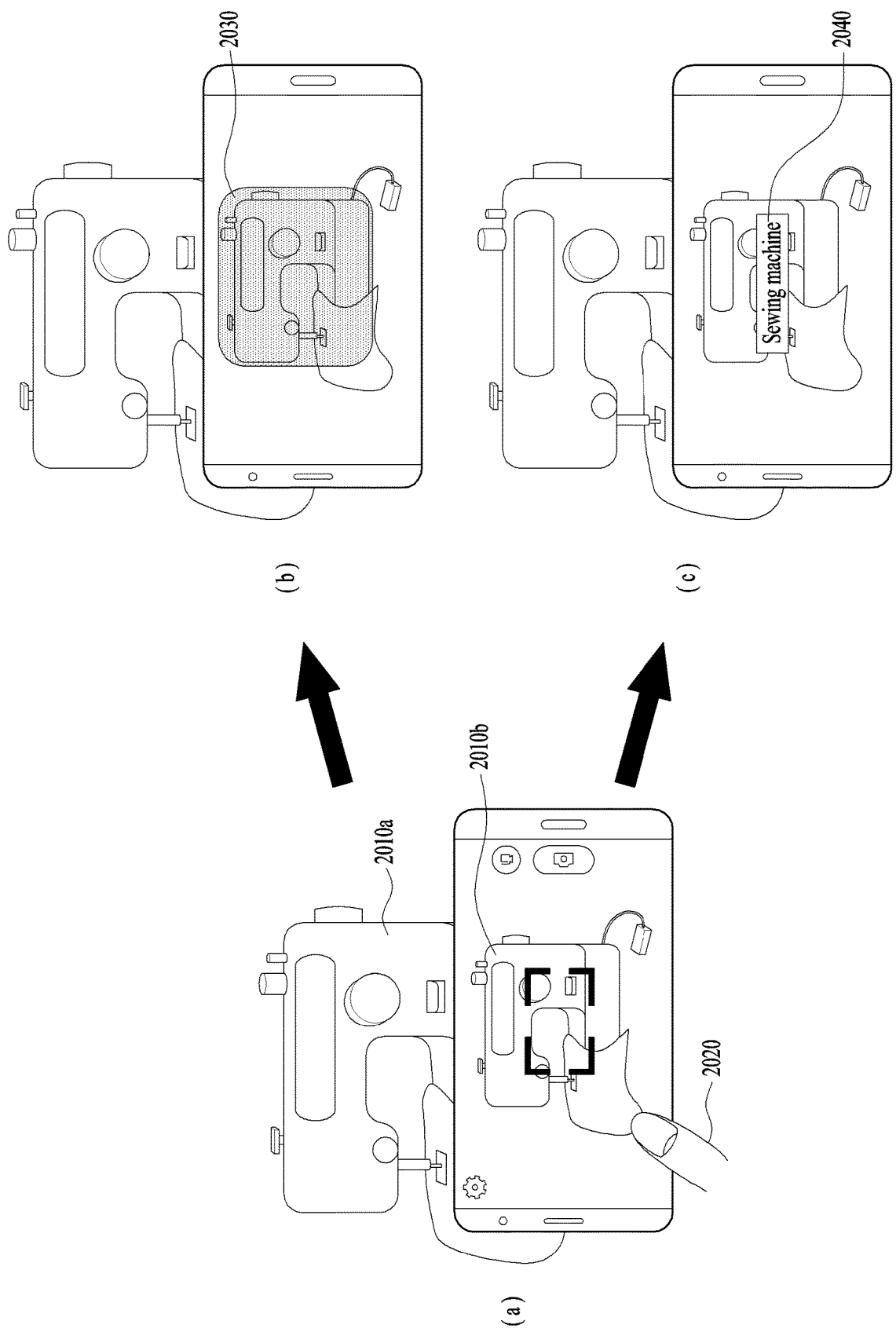
FIG. 30 is a diagram showing one example of entering an AR control mode for controlling an object sensed by a camera of a mobile terminal according to one embodiment of the present invention.

FIG. 30 is a diagram showing one example of entering an AR control mode for controlling an object sensed by a camera of a mobile terminal according to one embodiment of the present invention.

Referring to FIG. 30 (a), while a camera application is running, a mobile terminal can sense an external device 2010a located in a view angle area of a camera. Here, the view angle area indicates ranges of horizontal and vertical view angles that can be included in a predetermined screen by the camera on photographing. And, the view angle area may indicate an area within a predetermined angle in a front direction of the camera. For example, a view angle area of a camera can correspond to 60 degrees with reference to a center of a lens, by which the view angle area is non-limited. And, the mobile terminal can output an object 2010b corresponding to the external device sensed through the camera to a display unit.

In this case, the mobile terminal can determine whether the object 2010b corresponding to the external device correspond to an object controllable through an AR control mode. For example, if sensing an input signal 2020 to the display unit, the mobile terminal can determine whether the object 2010b is an AR controllable object. Here, the input signal may correspond to a long touch, a long press touch, a press touch, etc. For example, the press touch may correspond to a touch input of which pressure sensed by the display unit is greater than that of a general tap (short) touch or a touch input of which sensed size if wider than that of a general tap (short) touch. For another example, the mobile terminal adjusts a focus on the object 2010b corresponding to the device sensed within the view angle area of the camera, thereby determining whether it corresponds to an AR controllable object.

Here, the AR control mode may correspond to a mode for performing a simulation of controlling an external device through augmented reality beforehand before a mobile terminal actually manipulates the external device of if the mobile terminal is unable to actually manipulate the external device.

If the object 2010b corresponds to the AR controllable object, as shown in FIG. 30 (b), the mobile terminal can enter an AR control mode. For example, if entering the AR control mode, the mobile terminal can control the object 2010b by terminating the currently running camera application and launching an AR control application. Moreover, for example, if entering the AR control mode, the mobile terminal can display an AR object in a manner of overlaying the object 2010b with the AR object while the camera application is running. In the present invention, if the AR control mode is entered, it is assumed that an object is controlled as a separate AR control application is launched. Moreover, the mobile terminal can display an indicator 2030 indicating that the AR control mode is entered.

Meanwhile, as shown in FIG. 30 9c), if the object 2010b is not AR-controllable, the mobile terminal can enter an information mode. In this case, the mobile terminal can output an information indicator 2050, which indicates information on the external device 2010a sensed in the view angle area of the camera, to the display unit. For example, the information indicator may include a name, structure, size, etc. of the external device.

In the following, embodiments of FIGS. 31 to 34 show examples of controlling an AR controllable object by a simulation through an input signal sensed from a display unit.

Moreover, for an AR controllable object, embodiments of FIGS. 35 to 39 show examples of actually controlling an external device through an input signal sensed by a camera of a mobile terminal.

Figure 31:
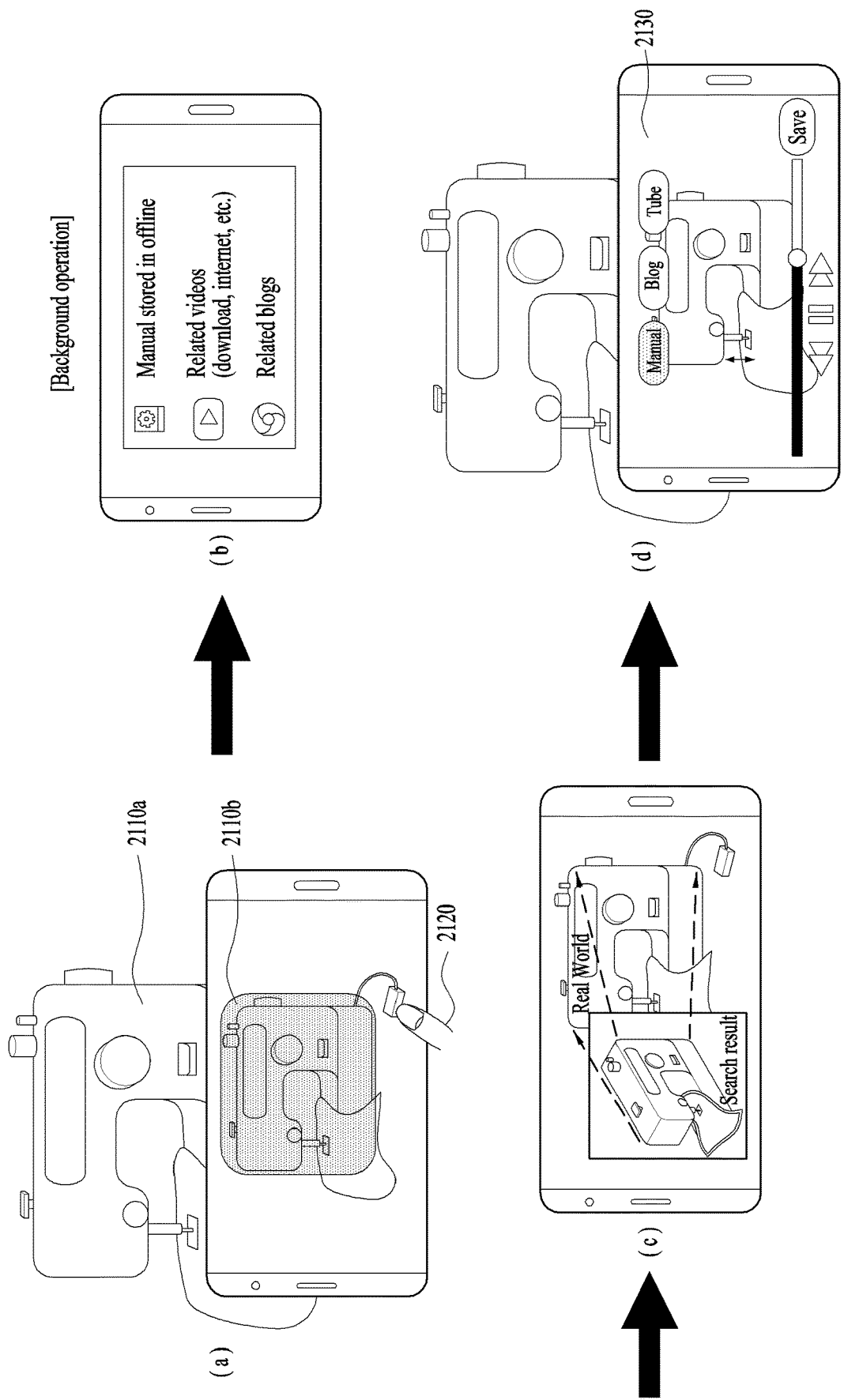
FIG. 31 is a diagram showing one example of controlling an object corresponding to an external device virtually through an AR control mode in a mobile terminal according to one embodiment of the present invention.

FIG. 31 is a diagram showing one example of controlling an object corresponding to an external device virtually through an AR control mode in a mobile terminal according to one embodiment of the present invention.

First of all, referring to FIG. 31 (a), a mobile terminal can sense an input signal 2120 in an AR control mode entered state. Particularly, while an object 2110b corresponding to an external device 2110a is displayed, the mobile terminal can sense the input signal 2120 for the object 2110b. Here, the input signal may include a short touch. Yet, the input signal 2120 is non-limited by the short touch.

In the embodiment of FIG. 31 (a), the input signal 2120 may correspond to a touch input to a location corresponding to a switch of a sewing machine.

In this case, as shown in FIG. 31 (b), the mobile terminal can search for data responding to the input signal for the object 2110b. For example, the step of FIG. 31 (b) is a background operation and may not be displayed on a display unit.

Particularly, the mobile terminal can search for an operation responding to the input signal for the object 2110b offline or online. For example, the mobile terminal can search a manual of an object stored in the mobile terminal offline. Moreover, for example, the mobile terminal can search manuals, videos, blogs, homepages, and the like for the control of the object online.

Referring to FIG. 31 (c), based on the online or offline search result, the mobile terminal can be switched to enable the object 2110b to perform an operation. For example, the step of FIG. 31 (c) is a background operation and may not be displayed on the display unit. Particularly, based on the search result, the mobile terminal can match the real object 2110b and the search result on the basis of information such as a size, color or location of an object.

For example, the operation responding to the input signal 2120 for the displayed object 2110b may correspond to an operation of backstitching with a sewing machine needle that moves up and down. Namely, in FIG. 31 (c), the mobile terminal can change a size, color, location and the like in order that the backstitching operation online or offline is suitable for the object 2110b displayed on the display unit.

Referring to FIG. 31 (d), based on the search result, the mobile terminal can output an operation 2130 responding to the input signal to the display unit in AR control mode. Namely, the step of FIG. 31 (*d*) may correspond to a simulation of the external device through the object 2110*b*. For example, the mobile terminal can output an operation of an object in AR form by overlaying the object 2110*b* outputted to the display unit. Namely, the mobile terminal displays a sewing machine outputted in AR form on a sewing machine object and is able to output a sewing machine operating video in response to a touch input to a switch of the sewing machine [not shown in FIG. 31 (*d*)].

Moreover, for example, the mobile terminal can control the object 2110*b* to perform the operation 2130 responding to the input signal while a separate AR application is running.

Meanwhile, as shown in FIG. 31 (*d*), the mobile terminal can display a source of the operation responding to the input signal on the display unit using an indicator. For example, a source of an operation may include a manual of an external device, a blog of a user related to an external device, a video site (e.g., YouTube), etc. in the embodiment of FIG. 31 (*d*), a source of an operation responding to an input signal may correspond to a manual of an external device.

Through the embodiment of FIG. 31, a user can virtually experience a control of a device through a touch input to a device sensed by a camera.

Figure 32:
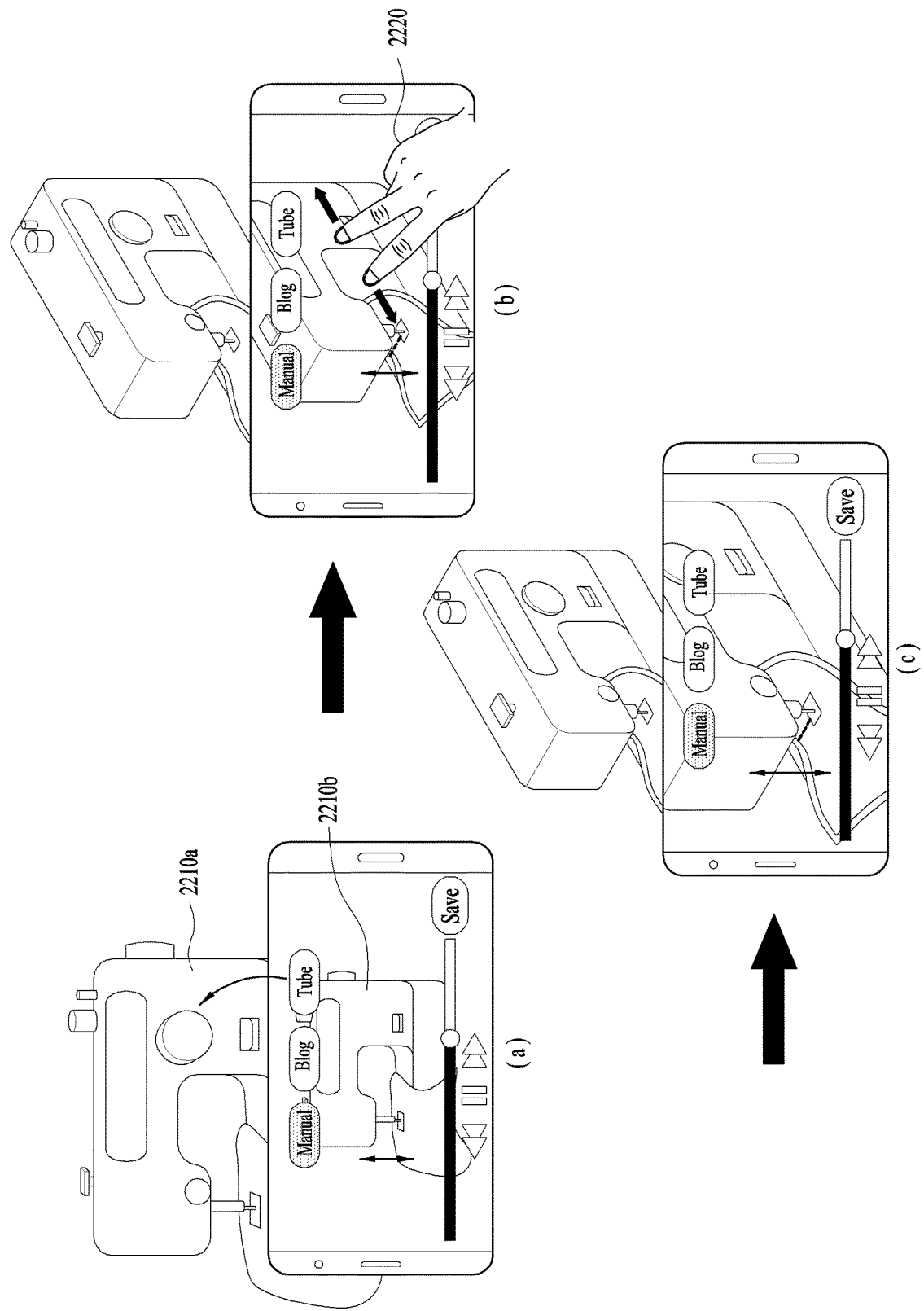
FIG. 32 is a diagram showing one example of switching a view of a mobile terminal in the course of executing an AR control mode in the mobile terminal according to one embodiment of the present invention.

FIG. 32 is a diagram showing one example of switching a view of a mobile terminal in the course of executing an AR control mode in the mobile terminal according to one embodiment of the present invention.

Particularly, FIG. 32 shows an embodiment in case of sensing a movement of a mobile terminal during a simulation of an operation performed by an object in AR control mode. For example, the embodiment of FIG. 32 may correspond to an operation subsequent to the embodiment of FIG. 31.

Referring to FIG. 32 (*a*), while playing an operation performed by an object 2210*b* in the AR control mode, the mobile terminal can sense that a distance between the mobile terminal and an external device 2210*a* is decreasing. For example, while a user grips the mobile terminal in a hand, in order to check the external device more closely, the user can move the mobile terminal toward the external device. Here, a case that the mobile terminal is moved to check another angle of the external device can be included as well.

In this case, the mobile terminal can display an image sensed in the view angle of a camera on a display unit.

In the embodiment of FIG. 32 (*b*), the mobile terminal can display a partially enlarged image of the object 2210*b* corresponding to the external device 2210*b*.

Moreover, as shown in FIG. 32 (*b*), based on the movement result, the mobile terminal can output the operation of the object described in FIG. 31 (*d*) to the display unit. Namely, the mobile terminal can play a backstitching video in a state that a needle portion of a sewing machine is enlarged. In doing so, the background operations of the search and change described in FIG. 31 (*b*) and FIG. 31 (*c*) can be performed identically.

Referring to FIG. 32 (*b*), the mobile terminal can sense an input signal 2220 for the display unit. Here, the input signal 2220 may correspond to a pinch-out touch input. In this case, as shown in FIG. 32 (*c*), the mobile terminal can display the operation of the object by further enlarging it. In doing so, the background operations of the search and change described in FIG. 31 (*b*) and FIG. 31 (*c*) can be performed identically. Namely, the mobile terminal searches for a backstitching operation in an enlarged state offline or online and is then able to output the found operation by changing it to fit the object.

Through the embodiment of FIG. 32, a user can variously predict a result from controlling a device virtually without controlling the device actually.

Figure 33:
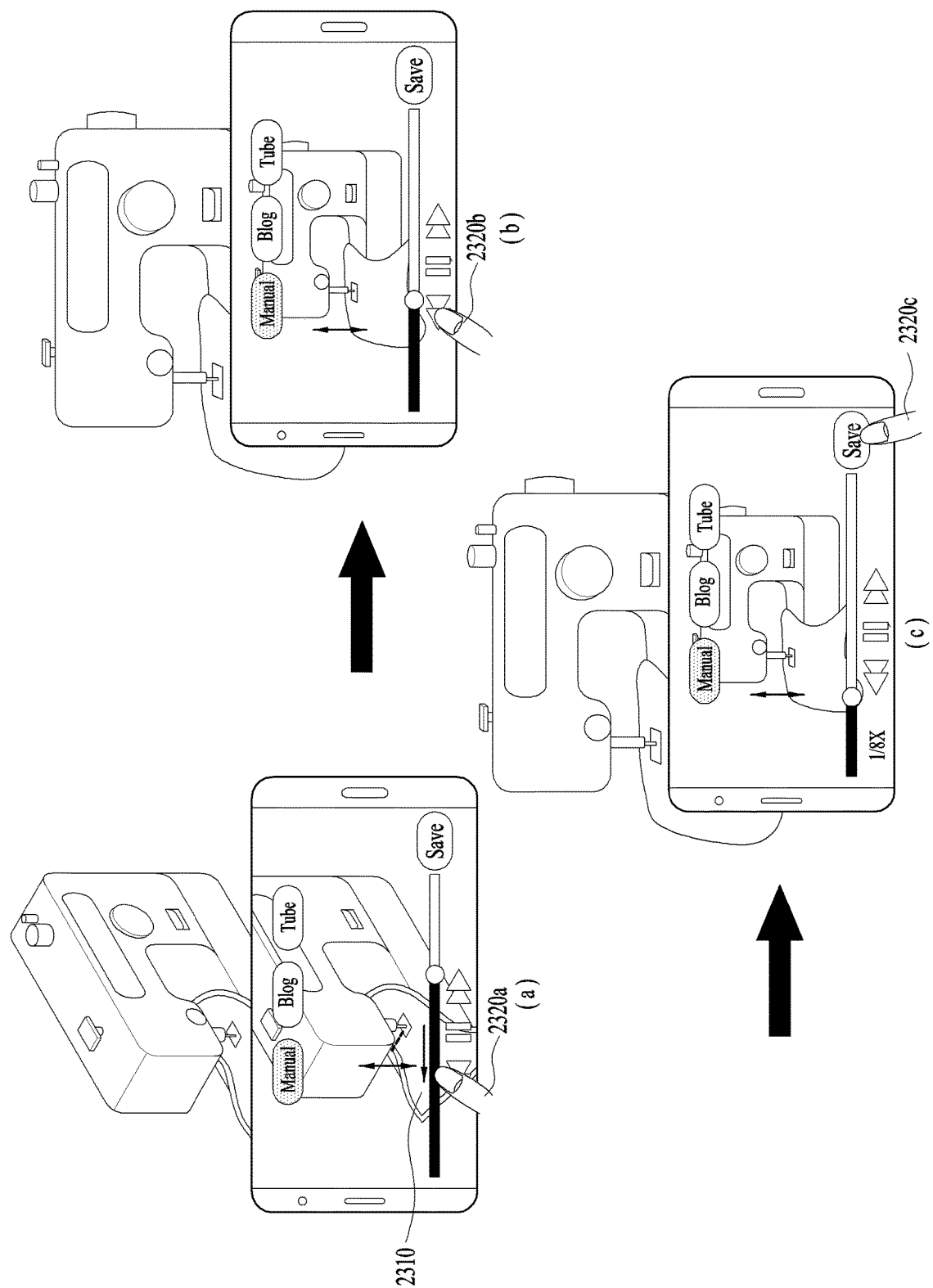
FIG. 33 is a diagram showing one example of playing or saving an operation of an object in the course of executing an AR control mode in the mobile terminal according to one embodiment of the present invention.

FIG. 33 is a diagram showing one example of playing or saving an operation of an object in the course of executing an AR control mode in the mobile terminal according to one embodiment of the present invention. For example, the embodiment of FIG. 33 may correspond to an operation subsequent to the embodiment of FIG. 31 or FIG. 32.

First of all, referring to FIG. 33 (*a*), a mobile terminal can sense a first input signal 2320*a* for a progress bar 2310 while playing an operation performed by an object in AR control mode.

In the embodiment of FIG. 33 (*a*), the mobile terminal plays an operation performed by being enlarged in a lateral side view of the object. For example, the first input signal 2320*a* may correspond to a drag touch input of moving an indicator indicating a play point to a left side on the progress bar 2310.

In this case, as shown in FIG. 33 (*b*), the mobile terminal can display an operation performed by the object at a play timing ahead of a play timing of FIG. 33 (*a*).

Meanwhile, referring to FIG. 33 (*b*), while playing the operation performed by the object in AR control mode, the mobile terminal can sense a second input signal 2320*b* for a rewind button.

For example, the second input signal 2320*b* may correspond to a short touch input. In this case, as shown in FIG. 33 (*c*), the mobile terminal can play the operation performed by the object in a manner of slowing down a play speed to ⅛×.

Moreover, referring to FIG. 33 (*c*), while playing the operation performed by the object in AR control mode, the mobile terminal can sense a third input signal 2320*c* for a store button.

For example, the third input signal 2320*c* may correspond to a short touch input. In this case, the mobile terminal can save the operation performed in AR mode by the object to itself [not shown in FIG. 33].

Figure 34:
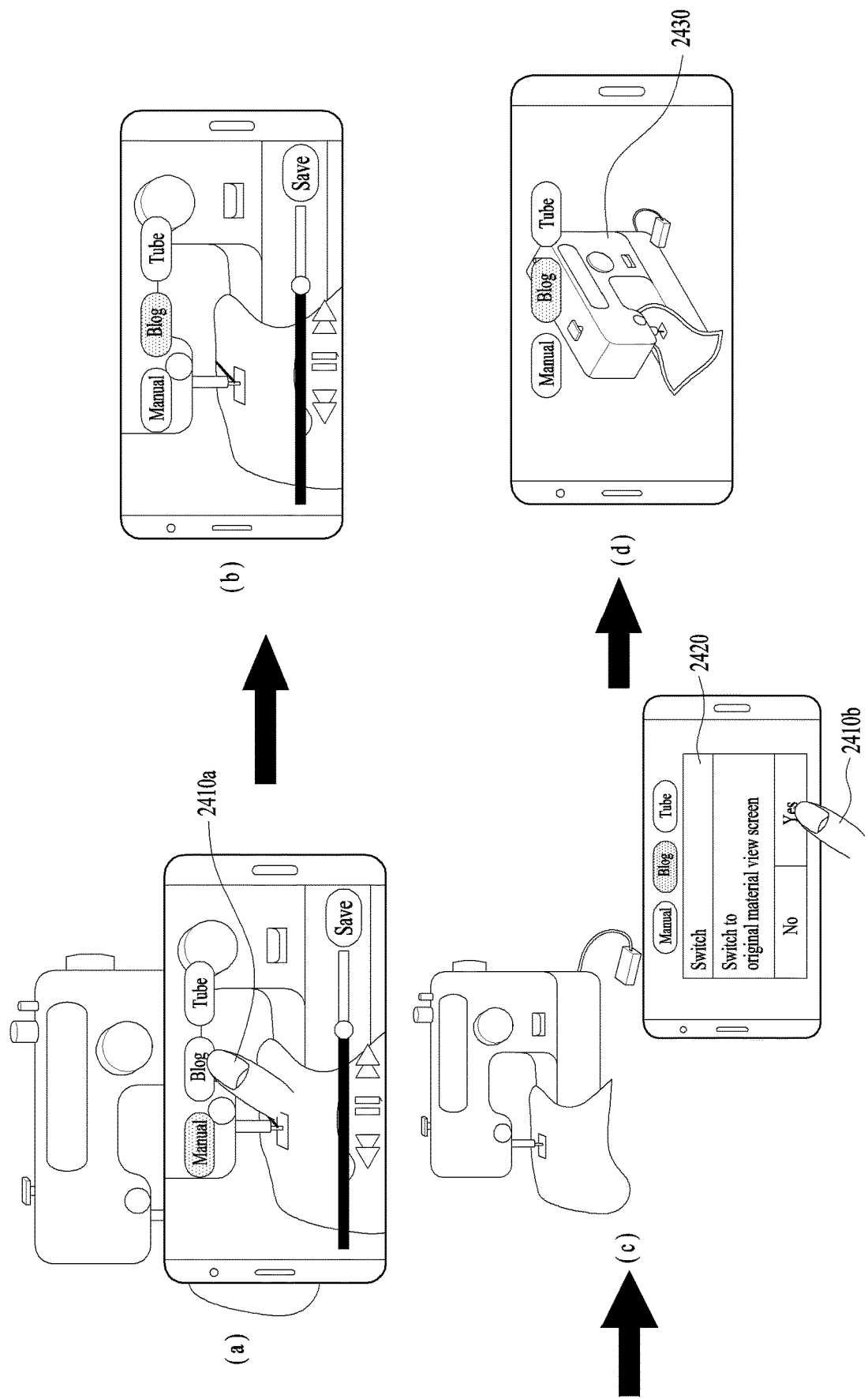
FIG. 34 is a diagram showing one example of checking a search result for an operation of an object in the course of executing an AR control mode in a mobile terminal according to one embodiment of the present invention.

FIG. 34 is a diagram showing one example of checking a search result for an operation of an object in the course of executing an AR control mode in a mobile terminal according to one embodiment of the present invention.

Particularly, if there are a plurality of search results for the operation information of the object described in FIG. 31 (*d*), FIG. 34 is a diagram showing a method of checking various search results. For example, the embodiment of FIG. 34 may correspond to an operation subsequent to the embodiment of FIG. 31 or FIG. 32.

First of all, referring to FIG. 34 (*a*), a mobile terminal can play an operation of an object, which is found from a manual of an external device, on a display unit. In doing so, a user may intend to check an operation of an object based on other users' real experiences instead of the manual of the external device.

In this case, as shown in FIG. 34 (*a*), the mobile terminal can sense a first input signal 2410*a* for a blog indicator. For example, the first input signal 2410*a* may correspond to a short touch input. In this case, as shown in FIG. 34 (*b*), the mobile terminal can play an operation of an object, which is found from other user's blog related to the external device, on the display unit.

Meanwhile, the mobile terminal can sense a movement. For example, as shown in FIG. 34 (*b*), the mobile terminal can sense a signal of moving to the left by a sensor provided to the mobile terminal. Moreover, as shown in FIG. 34 (c), the external device may not be sensed in a view angle area of the camera provided to the mobile terminal. In this case, the mobile terminal dismisses the AR mode and is able to display a popup 2420 for determining whether to provide an original copy of the search result.

Moreover, if sensing a second input signal 2410b for the popup 2420 providing the original copy of the search result, the mobile terminal can display the original copy 2430 of the search result on the display unit.

Referring to FIG. 34 (d), the original copy 2430 of the search result may correspond to an operation video of the external device found from other user's blog related to the external device.

Meanwhile, if an external device providing an AR mode previously through a movement is not sensed from a view angle of the camera, the mobile terminal can search for a new external device [not shown in FIG. 34]. Moreover, if the external device is found, the mobile terminal may provide an AR mode for the newly found external device.

Figure 35:
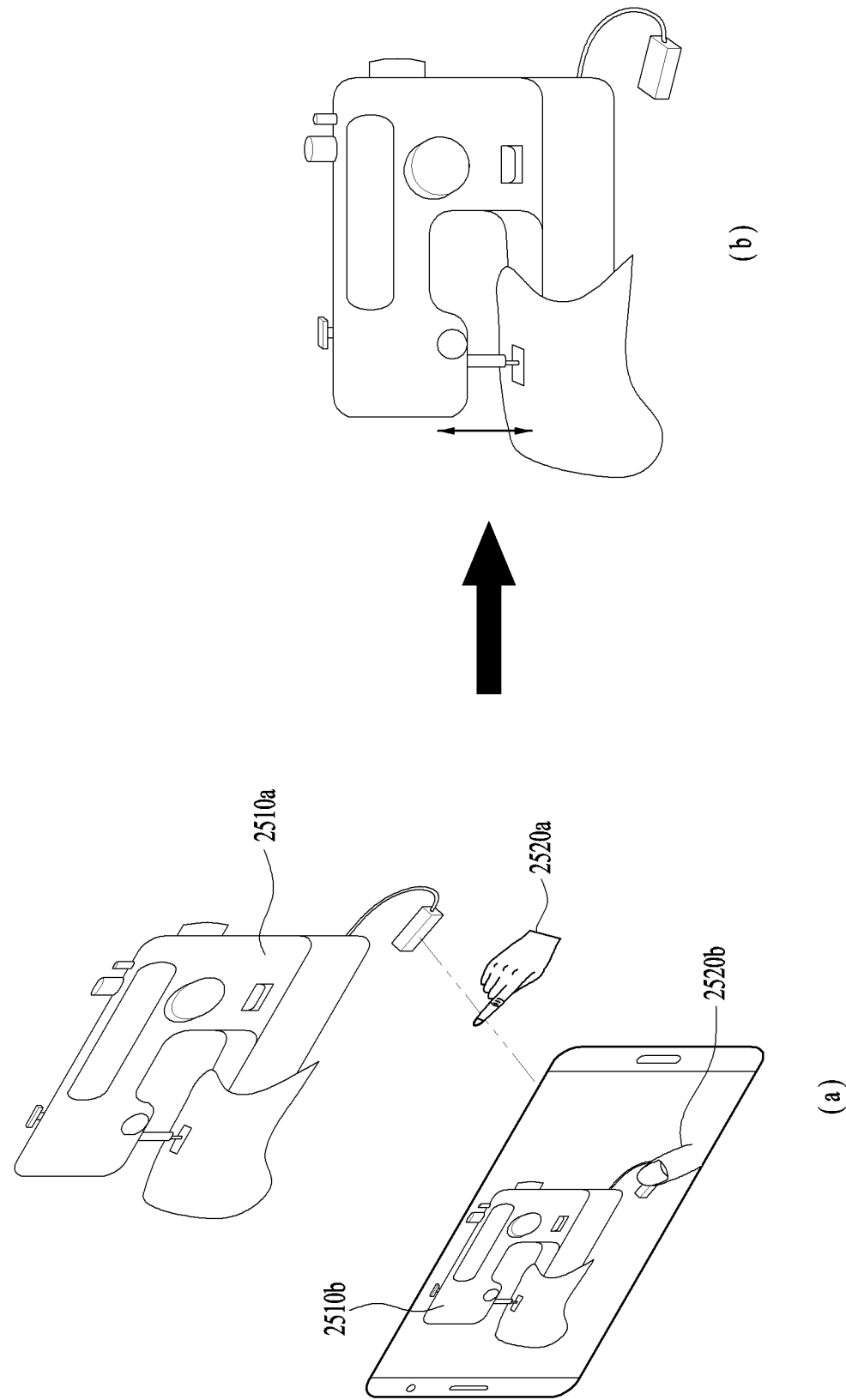
FIG. 35 is a diagram showing one example of actually controlling an external device in the course of executing an AR control mode in a mobile terminal according to one embodiment of the present invention.

FIG. 35 is a diagram showing one example of actually controlling an external device in the course of executing an AR control mode in a mobile terminal according to one embodiment of the present invention.

In the embodiment of FIG. 35, a mobile terminal may correspond to relation capable of transceiving signals with an external device. Moreover, the mobile terminal can transceive signals with the external device through the wireless communication unit 110 shown in FIG. 1A. For example, the mobile terminal may correspond to a paired state with the external device. In this case, the mobile terminal sends a control signal to the external device, thereby controlling the external device.

First of all, referring to FIG. 35 9a), the mobile terminal can sense an input signal 2520 while an AR control mode is entered. Particularly, the mobile terminal can sense an input signal 2520a from a view angle area of a camera provided to the mobile terminal.

For example, the input signal 2520a may correspond to a gesture of virtually touching a location corresponding to a switch of a real external device with a finger. Here, although the user's touch input fails to come in contact with the switch of the external device actually, the input signal 2520a may correspond to a case that a gesture input sensed by the mobile terminal is applied at a location corresponding to the location of the switch of the external device.

For example, the mobile terminal can recognize that a user's gesture signal 2520a sensed through the camera and a switch of a sewing machine are located on the same line. Hence, the mobile terminal can display that an object corresponding to the input signal 2520b is located on the switch of the object 2510b corresponding to the external device on the display unit. Moreover, a location of a user's hand may be located between the external device and the mobile terminal.

In this case, in response to the input signal 2520, the mobile terminal can send a control signal to the external device 2510a. Particularly, the mobile terminal can send a control signal of the external device 2510a created according to a relative location of the gesture input 2510b for the external device 2510a.

Moreover, as shown in FIG. 35 (b), the external device 2510a receives the control signal from the mobile terminal and is then able to perform a control operation in the external device in response to the received control signal.

In the embodiment of FIG. 35, the sewing machine, which is the external device, can actually backstitch in response to the control signal.

FIGS. 36 to 39 are diagrams showing one example of checking information of an external device in the course of executing an AR control mode in a mobile terminal according to one embodiment of the present invention.

Figure 36:
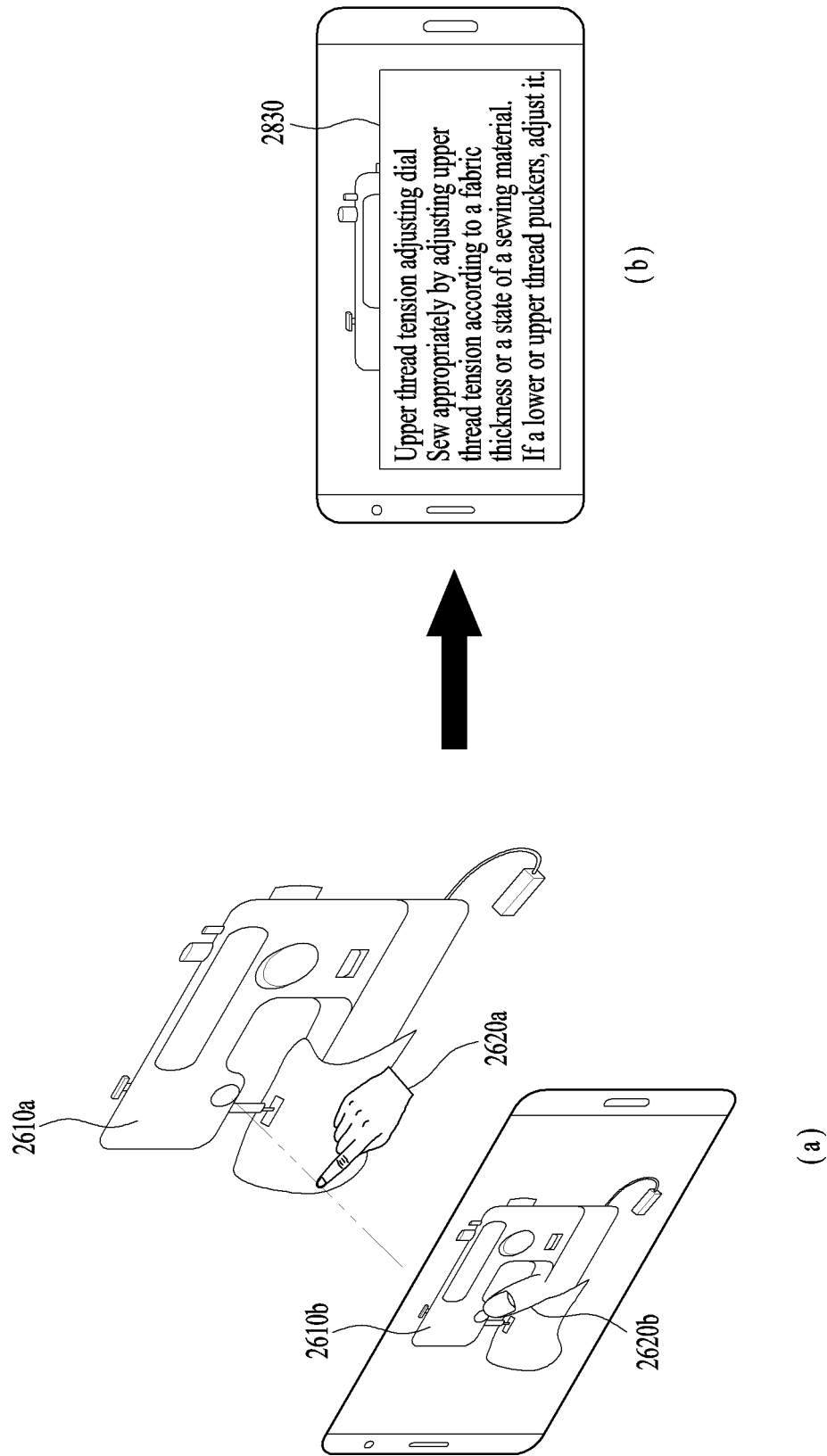
FIGS. 36 to 39 are diagrams showing one example of checking information of an external device in the course of executing an AR control mode in a mobile terminal according to one embodiment of the present invention.

For example, referring to FIG. 36 (a), a mobile terminal can sense an external device 2610a and a user's hand 2620a from a view angle area of the mobile terminal.

Unlike FIG. 35, the embodiment of FIG. 36 may correspond to a case that a location of the user's hand 2620a is sensed instead of a gesture input applied by a user's finger.

For example, the mobile terminal can recognize that the user's gesture signal 2620a sensed through a camera and a location of a dial of a sewing machine are located on the same line. Here, the same line may include the same height or the like if some of x-, y- and z-coordinates are identical. Hence, the mobile terminal can display it on a display unit in a manner that an object responding to an input signal 2620b is located on a dial of an object 2610b responding to the external device.

In this case, as shown in FIG. 36 (b), the mobile terminal can display information 2830 on an area proximate to a user's hand 2620 in the external device 2610a on the object 2610b.

For example, the information on the area proximate to the user's hand may contain a structure, a name, a function and the like in the external device.

Meanwhile, while the information 2830 is displayed, if a gesture input is sensed from a view angle area of the camera, the mobile terminal can send a control signal of the corresponding area to the external device [not shown in FIG. 36]. Moreover, while the information 2830 is displayed, if a user's touch input for the information 2830 is sensed, the mobile terminal can send a control signal of the corresponding area to the external device.

Figure 37:
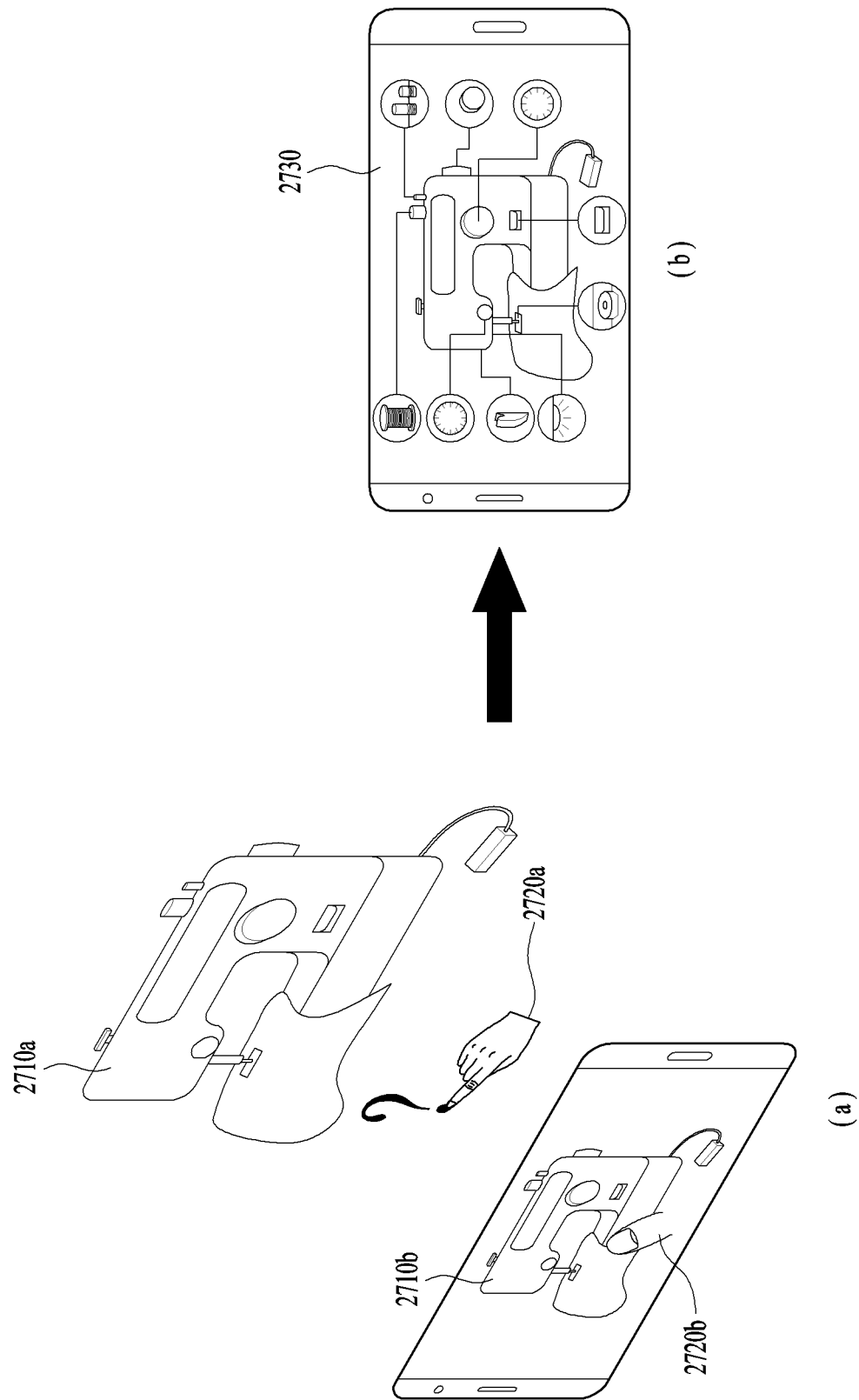

For another example, as shown in FIG. 37 (a), the mobile terminal can sense an external device 2710a and a gesture input 2720a from a view angle area of a camera.

Unlike the touch gesture of FIG. 35, the embodiment of FIG. 37 may correspond to a case of sensing a gesture of drawing a question mark. Moreover, the mobile terminal can display an object 2720b responding to an input signal on an object 2710b on a display unit.

In this case, as shown in FIG. 37 (b), the mobile terminal can display information 2730 on a name of a full area of the external device 2710a on the object 2710b of the display unit.

Figure 38:
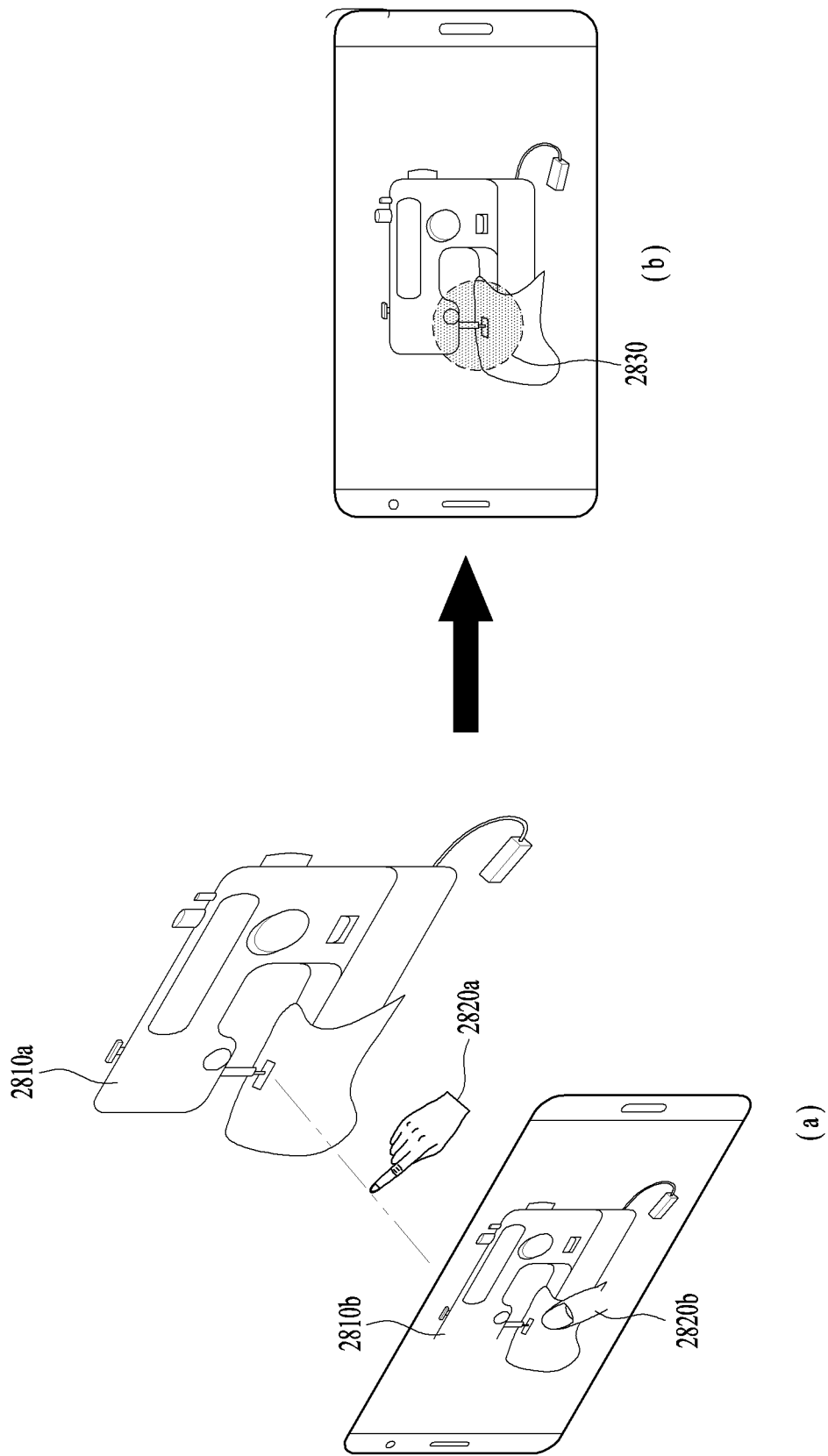

Moreover, for another example, as shown in FIG. 38 (a), a mobile terminal can sense an external device 2810a and a user's hand 2820 from a view angle area of a camera.

For example, the mobile terminal can recognize that a user's gesture signal 2820a sensed through the camera and a needle of a sewing machine are located on the same line. Hence, the mobile terminal can display it on the display unit in a manner that an object responding to an input signal 2820b is located on a switch of an object 2810b responding to the external device.

Unlike FIG. 36, the embodiment of FIG. 38 may correspond to a case that the user's hand 2820 is proximate to a danger area in the external device 2810a.

For example, the danger area may correspond to an area near a needle of a sewing machine. In this case, as shown in FIG. 38 (b), the mobile terminal can display an indicator 2830 for the danger area on the object 2810b displayed on the display unit.

Figure 39:
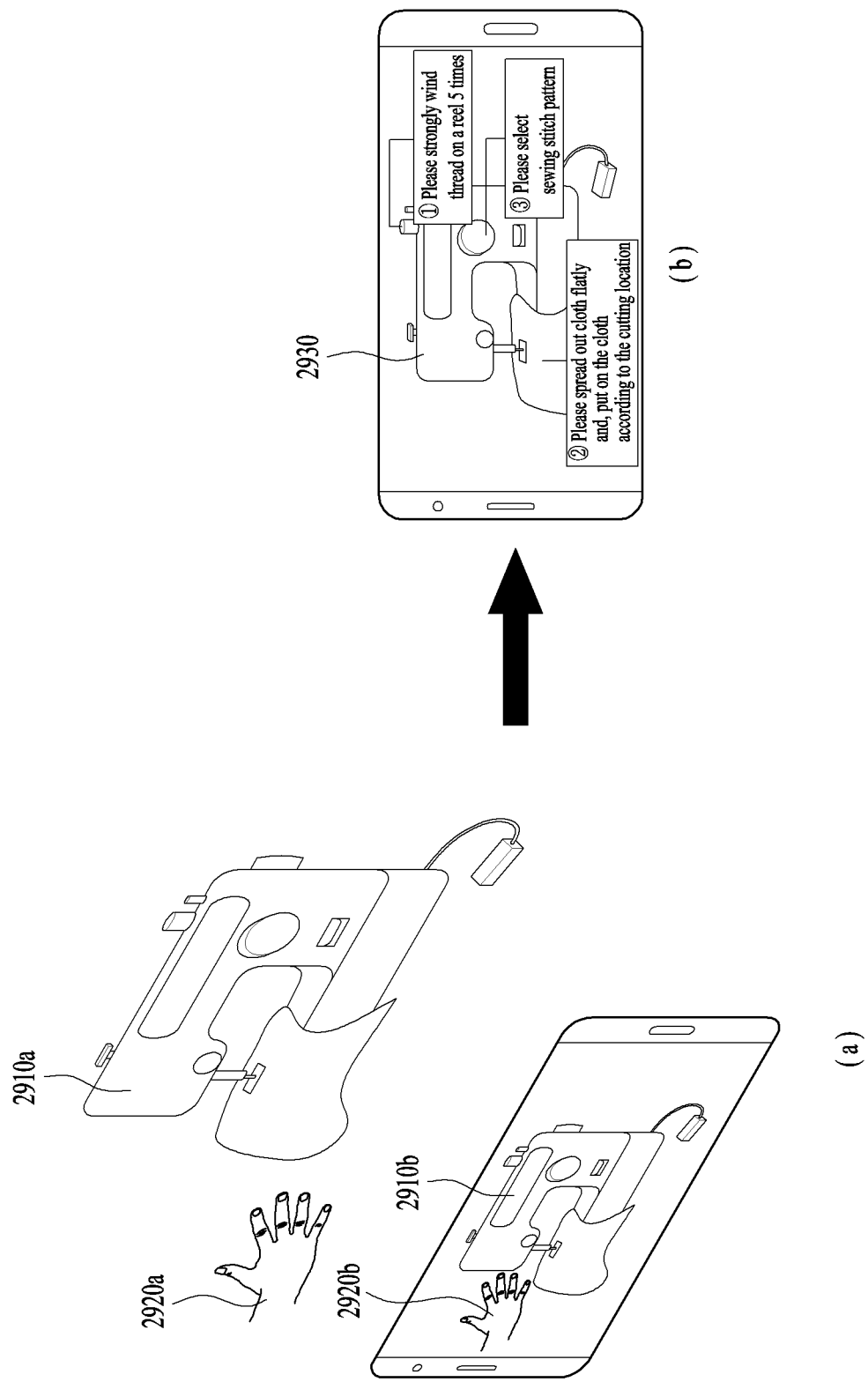

Moreover, for another example, as shown in FIG. 39 (a), a mobile terminal can sense an external device 2910a and a user's hand 2920a from a view angle area of a camera.

Unlike FIGS. 36 to 38, the embodiment of FIG. 39 may correspond to a case that a user's hand is not proximate to the external device 2910a despite being sensed from a view angle area of a camera. Here, the mobile terminal may display that the object 2910b and the object 2920b responding to the hand fail to overlap each other on a display unit.

Moreover, while the user's hand 2920a is not proximate to the external device 2910a, if a preset time expires, the mobile terminal can display a sequence information 2930 related to a use of the external device 2910a on the display unit.

For example, the preset time may correspond to 4 seconds, by which the present embodiment is non-limited. Moreover, as shown in FIG. 39 (b), about three use sequence informations 2930 can be simultaneously displayed at a time.

If the number of the sequence informations 2930 exceeds 3, the rest of informations may be displayed after the preset time [not shown in FIG. 39].

Through the embodiments of FIGS. 36 to 39, if a user's hand sensed from a view angle area of a camera is located proximate to an external device, information on an external device can be provided on a display unit.

Moreover, the embodiments of FIGS. 36 to 39 are non-limited by the above description, and information displayed according to an input signal can be implemented in various ways.

In the following, the embodiments of FIG. 40 and FIG. 41 relate to a method of if a mobile terminal is connected to a device disposed in an office, virtually controlling the device in an office environment.

Figure 40:
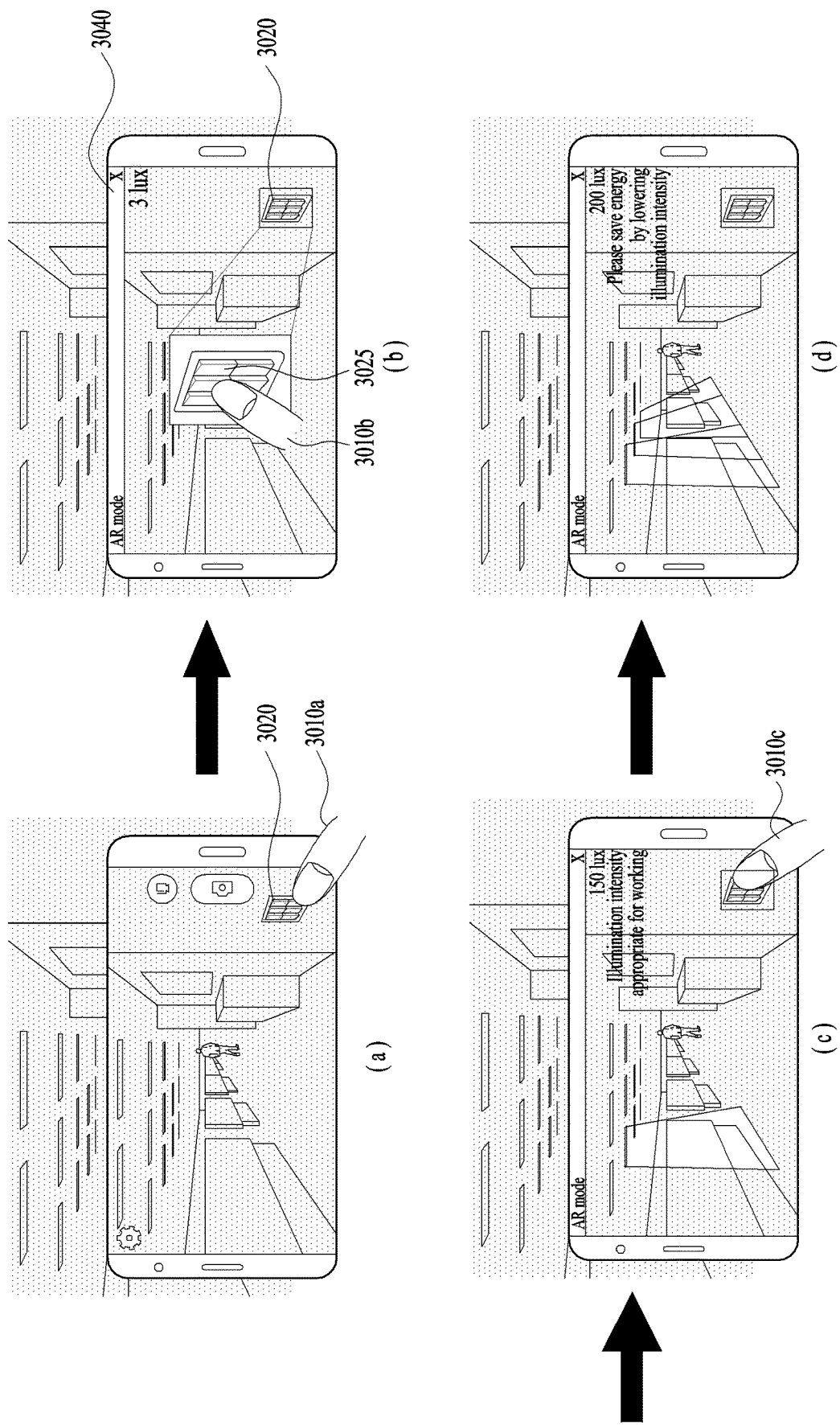
FIG. 40 is a diagram showing one example of a virtual control of a device disposed to an office in a mobile terminal according to one embodiment of the present invention.

FIG. 40 is a diagram showing one example of a virtual control of a device disposed to an office in a mobile terminal according to one embodiment of the present invention.

In the embodiment of FIG. 40, the description redundant with that of FIG. 30 and FIG. 30 shall be omitted.

First of all, as shown in FIG. 40 9a), while a camera application is running, a mobile terminal can sense an external device located within a view angle area of a camera.

In the embodiment of FIG. 40 (a), the external device may correspond to a lamp, a cabinet, a desk, a lamp switch, etc. moreover, the mobile terminal can output an object responding to the external device sensed through the camera to a display unit.

Here, as described in FIG. 40, the mobile terminal can determine whether the object responding to the external device is an object controllable through an AR control mode.

For example, in the embodiment of FIG. 40, the controllable object is assumed as corresponding to a lamp switch or a cabinet. In the embodiment of FIG. 40 (a), when sensing a first input signal 3010a for the display unit, the mobile terminal can enter the AR control mode if determining that an object 3020 is controllable.

For example, the first input signal 3010a may correspond to a long press touch to a lamp switch object. Here, the mobile terminal can announce that the AR control mode is entered through an audio indicator such as 'ding-dong' or 'tinkle-tinkle' [not shown in FIG. 40 (a)].

Referring to FIG. 40 (b), the mobile terminal can provide brightness of the view angle area currently sensed by the camera in AR control mode through an indicator. For example, the brightness currently sensed by the mobile terminal may correspond to 3 lux. In this case, the mobile terminal can display the lamp switch object 3020, which is determined as the controllable object in AR control mode, on the display unit by enlarging [3025] the object 3020. This is because a user may have difficulty in manipulation due to a small size of the lamp switch object 3020.

Meanwhile, while the AR control mode of FIG. 40 (b) is entered, if a user intends to end the AR control mode, the user may end the AR control mode by touching an indicator 3040 displayed on a right top end of the display unit.

Subsequently, while the AR control mode is entered, the mobile terminal can sense a second input signal 3010b for the lamp switch object 3025.

For example, the second input signal 3010b may correspond to a short touch input to one of lamp switch objects 3025. Moreover, if an input signal for the lamp switch object 3020/3025 is sensed, the mobile terminal provides a vibration feedback, thereby enabling a user to have sensation of an actual manipulation.

In this case, as shown in FIG. 40 (c), the mobile terminal can display, on the display unit, a state that a lamp responding to the lamp switch object, from which the second input signal 3010b is sensed, is controlled. In doing so, the background operations of the search and change described in FIG. 31 (b) and FIG. 31 (c) can be performed identically.

For example, in response to the second input signal 3010b, as the lamp is turned on [ON state], virtual brightness of an office can be changed into 150 lux. Moreover, for example, 150 lux may correspond to brightness appropriate for working.

Meanwhile, the mobile terminal can sense a third input signal 3010c for the lamp switch object 3020.

For example, the third input signal 3010c may correspond to a short touch input to the other one of the lamp switch objects 3020.

In this case, as shown in FIG. 40 (d), the mobile terminal can display, on the display unit, a state that the lamp responding to the lamp switch object, from which the third input signal 3010c is sensed, is controlled.

In doing so, the background operations of the search and change described in FIG. 31 (b) and FIG. 31 (c) can be performed identically.

For example, in response to the third input signal, as the lamp enters 'ON' state additionally, the virtual brightness of the office can be changed into 200 lux. Moreover, as 200 lux is a case brighter than appropriate illumination intensity, it is able to guide a user to re-adjust the virtual brightness through a message such as 'Save energy by lowering illumination intensity'.

Figure 41:
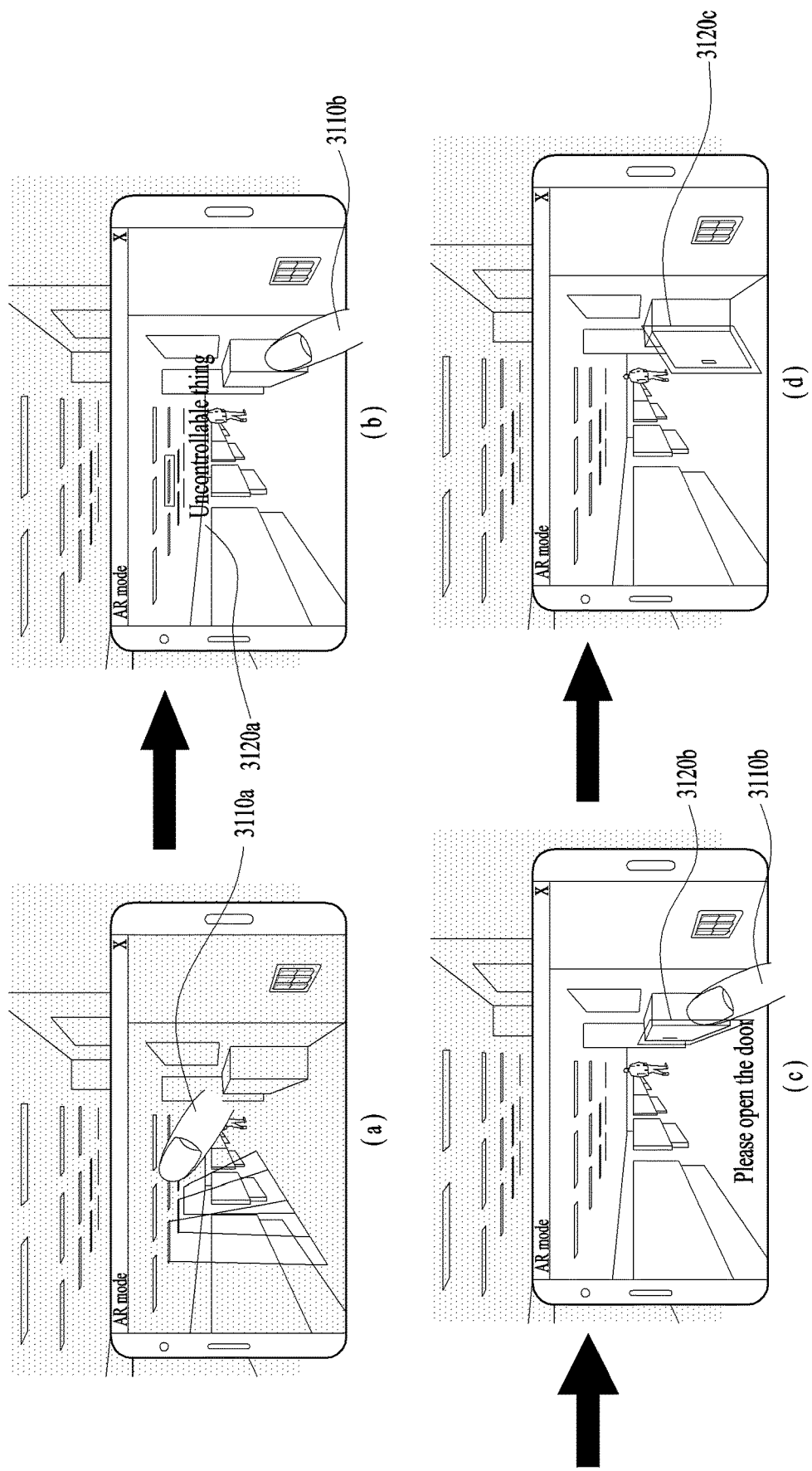
FIG. 41 is a diagram showing another example of a virtual control of a device disposed to an office in a mobile terminal according to one embodiment of the present invention.

FIG. 41 is a diagram showing another example of a virtual control of a device disposed to an office in a mobile terminal according to one embodiment of the present invention. Assume that the embodiments of FIG. 40 and FIG. 41 correspond to a connected operation.

First of all, referring to FIG. 41 (a), a mobile terminal can sense a first input signal 3110a for a lamp object responding to a lamp in AR control mode. In the embodiment of FIG. 41, assume that the lamp object correspond to an AR-uncontrollable object.

In this case, as shown in FIG. 41 (b), the mobile terminal can indicate that through an indicator 3120a, the lamp object is an uncontrollable object in AR control mode. Moreover, if the lamp object from which the first input signal 3110a is sensed corresponds to a non-controllable object, the mobile terminal can end the AR control mode [not shown in FIG. 41 (b)].

Meanwhile, referring to FIG. 41 (b), the mobile terminal can sense a second input signal 3110b for a cabinet object.

For example, the second input signal 3110 may correspond to a long press touch to the cabinet object. In the embodiment of FIG. 41, assume that the cabinet object is an AR-controllable object. In this case, as shown in FIG. 41 (c), the mobile terminal can re-enter the AR control mode. Moreover, the mobile terminal can induce a control of the cabinet object through an indicator 3120b.

Subsequently, the mobile terminal can sense a third input signal 3110c for the cabinet object. For example, the third input signal may correspond to a shot touch input unlike the second input signal 3110b. Here, the mobile terminal can search for an operation responding to the third input signal 3110c as a background operation.

Namely, the background operations of the search and change described in FIG. 31 (b) and FIG. 31 (c) can be performed identically. Moreover, as shown in FIG. 41 (d), the mobile terminal can output an operation of opening a door of the cabinet object on the display unit in AR form in response to the third input signal 3110c.

Figure 42:
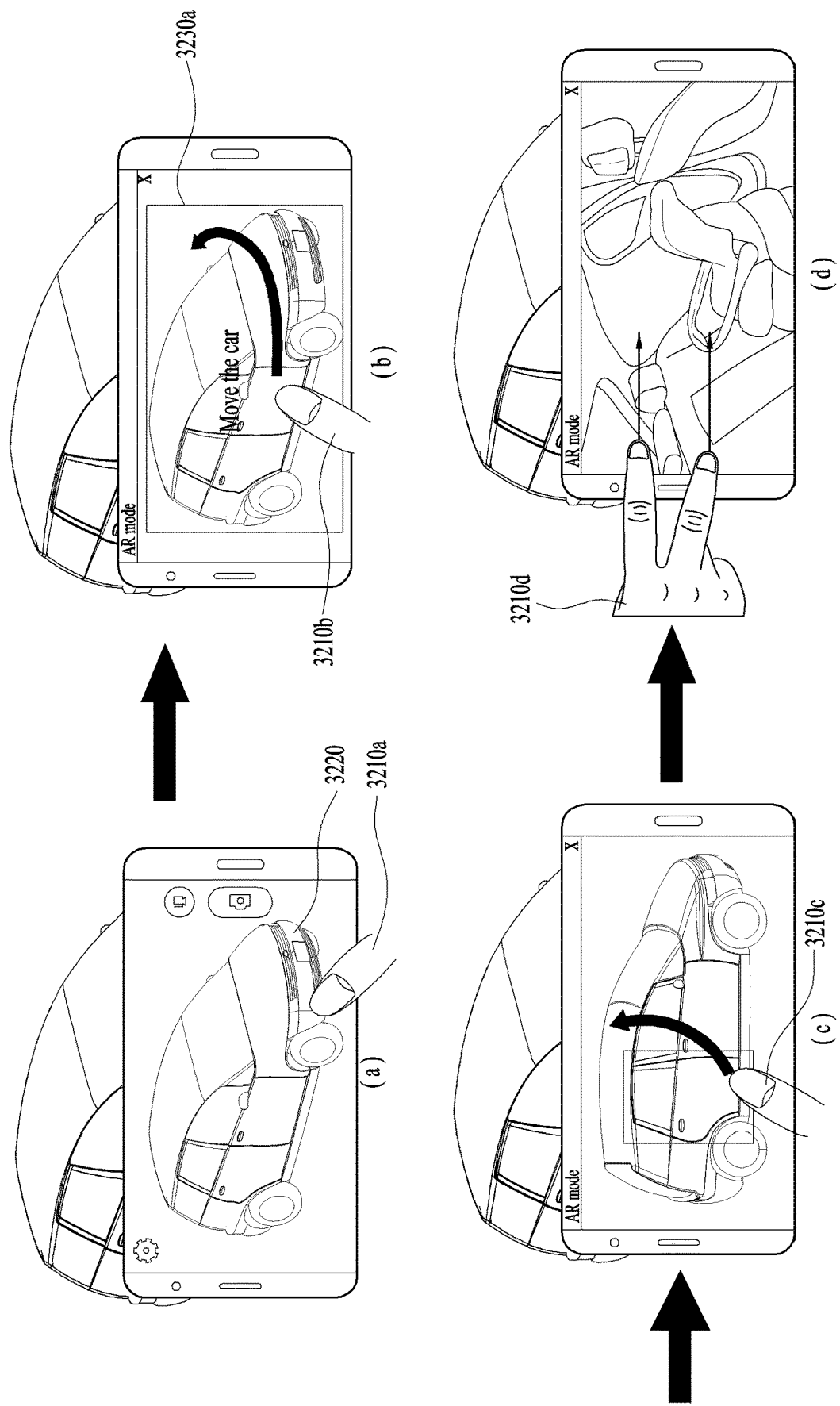
FIGS. 42 to 44 are diagrams showing one example of a virtual control of a car in a mobile terminal according to one embodiment of the present invention.
Figure 43:
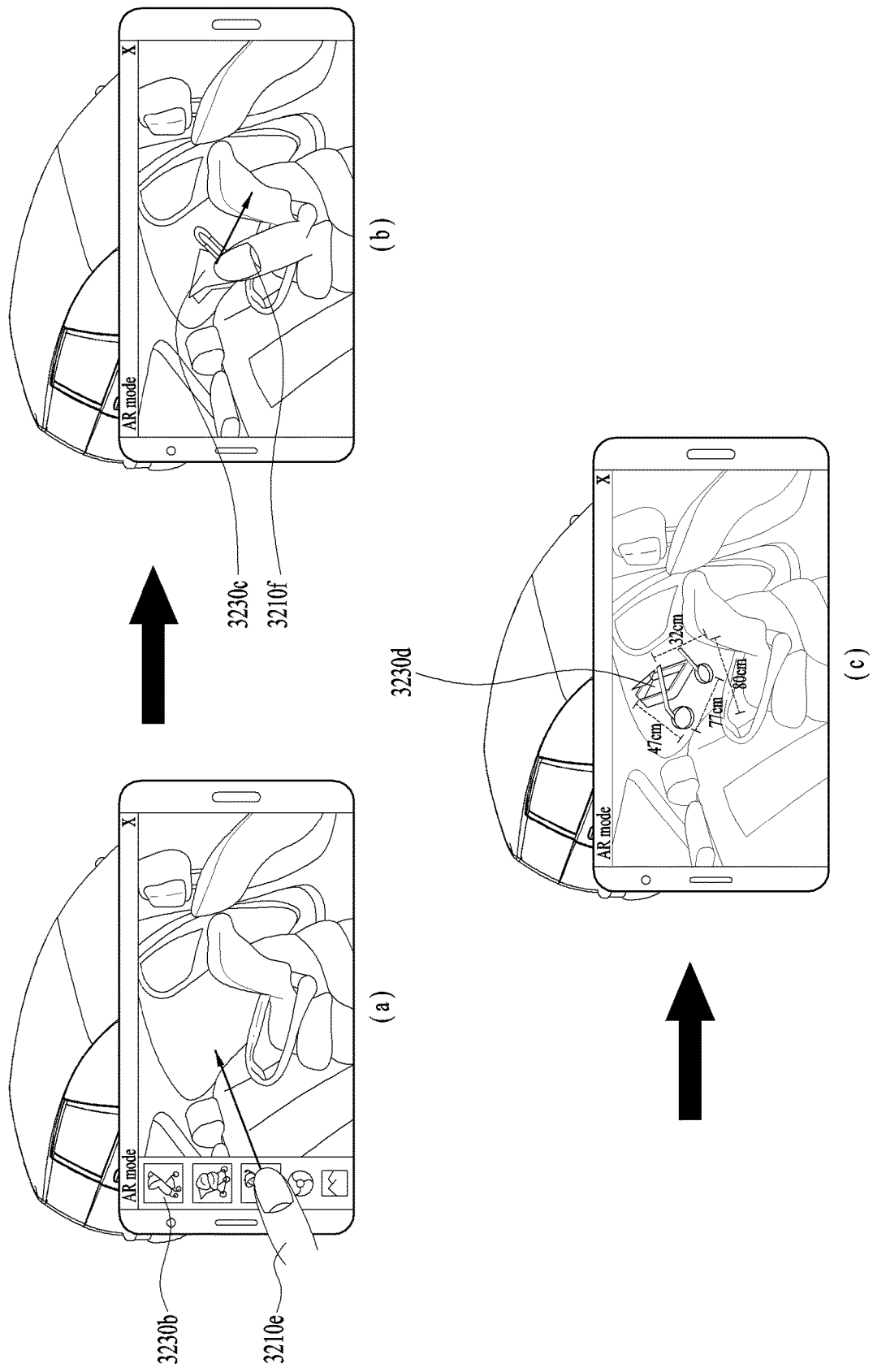
Figure 44:
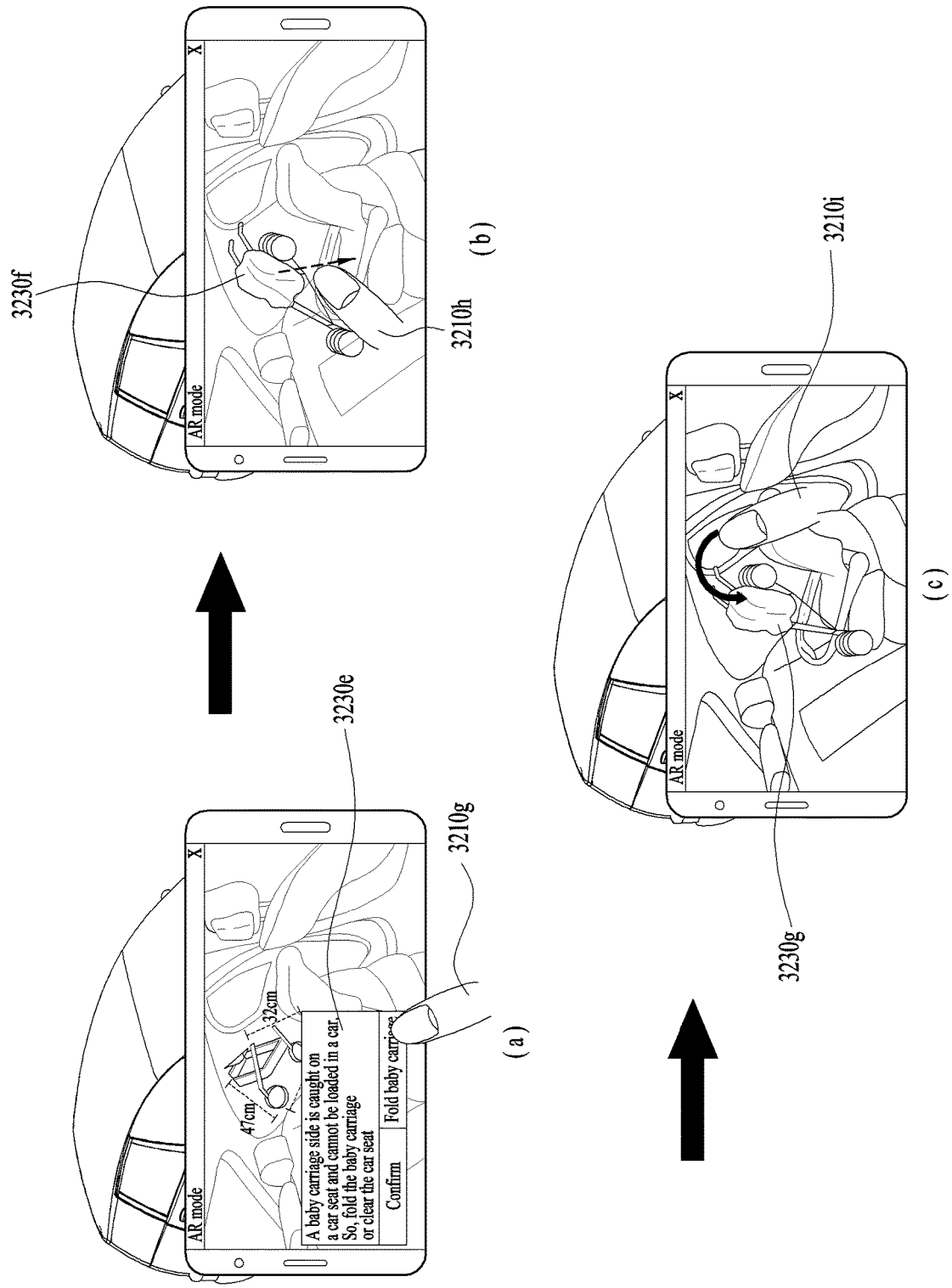

The following embodiments of FIGS. 42 to 44 relate to a method of if sensing a car from a view angle area of a camera, controlling the car and a baby carriage through an AR control mode virtually.

FIGS. 42 to 44 are diagrams showing one example of a virtual control of a car in a mobile terminal according to one embodiment of the present invention.

In the embodiments of FIGS. 42 to 44, the description redundant with that of FIG. 30 and FIG. 30 shall be omitted. Moreover, assume that FIGS. 42 to 44 correspond to a consecutive operation.

First of all, referring to FIG. 42 (a), while a camera application is running, a mobile terminal can sense a car located within a view angle area of the camera.

Moreover, FIG. 42 shows that a car object 3220 can be outputted to a display unit. In response to a first input signal for the car object 3220, the mobile terminal can determine whether the car object 3220 corresponds to a controllable object through an AR control mode. In the embodiment of FIG. 42, assume that a car object is an AR controllable object.

Referring to FIG. 42 (b), in response to the first input signal 3210a for the car object 3220, the mobile terminal can enter the AR control mode. And, the mobile terminal can display an audio indicator (e.g., ding-dong) or a visual indicator to indicate that the AR control mode is entered. In this case, the mobile terminal displays an indicator 3230a, thereby guiding a user to control the car object.

The mobile terminal can sense a second input signal 3210b for the car object 3220. For example, the second input signal 3210b may correspond to a drag touch input to rotate the car object.

In this case, referring to FIG. 42 (c), the mobile terminal can display a state that the car object 3220 is rotated in a right direction in AR form. In doing so, the background operations of the search and change described in FIG. 31 (b) and FIG. 31 (c) can be performed identically.

The mobile terminal can sense a third input signal 3210c for a back door of the car object 3220.

For example, the third input signal 3210c may correspond to a consecutive input consisting of a press touch and a drag touch. And, the third input signal 3210c may correspond to an input signal for opening the back door of the car object 3220 virtually.

In this case, as shown in FIG. 42 (d), the mobile terminal can display a state that the back door of the car object is open on a display unit in AR form. In doing so, the background operations of the search and change described in FIG. 31 (b) and FIG. 31 (c) can be performed identically.

For example, referring to FIG. 42 (d), a car seat may be mounted on a rear seat of the car object. And, the mobile terminal may sense a fourth input signal 3210d for the display unit.

For example, the fourth input signal 3210d may correspond to a flocking touch with two fingers.

Subsequently, referring to FIG. 43 (a), the mobile terminal can display a baby carriage option 3230b in response to the fourth input signal 3210d. In doing so, the background operations of the search and change described in FIG. 31 (b) and FIG. 31 (c) can be performed identically. Namely, a user can virtually select and load a baby carriage in order to load the baby carriage on a back seat of a car. The mobile terminal may sense a fifth input signal 3210e for the baby carriage option 3230b. Here, the fifth input signal 3210e may correspond to a drag touch.

Referring to FIG. 43 (b), in response to the fifth input signal 3210e, the mobile terminal can display the selected baby carriage object 3230c to be adjacent to the back door of the car object. In doing so, the background operations of the search and change described in FIG. 31 (b) and FIG. 31 (c) can be performed identically. The mobile terminal may sense a sixth input signal 3210f for the baby carriage object 3230c. For example, the sixth input signal 3210f is a drag touch input and may correspond to an input signal for loading the baby carriage object 3230c on the back seat of the car.

In this case, referring to FIG. 43 (c), in response to the sixth input signal 3210f, the mobile terminal can display a size of a baby carriage object, a size of a car door, a size of a car seat 3230d and the like. For example, the size of the baby carriage object is assumed as corresponding to 47 cm*77 cm and the size of the car door is assumed as corresponding to 80 cm*32 cm.

Subsequently, referring to FIG. 44 (a), the mobile terminal can provide a guide popup 3230e for loading the baby carriage object on the back seat. The mobile terminal may sense a seventh input signal 3210g for the guide popup 3230e.

In this case, as shown in FIG. 44 (b), the baby carriage object may be displayed in a folded state 3230f. In doing so, the background operations of the search and change described in FIG. 31 (b) and FIG. 31 (c) can be performed identically.

In a state 3230f that the baby carriage object is folded, the mobile terminal may sense an eighth input signal 3210h. For example, the eighth input signal 3210h may correspond to a drag touch for loading the folded baby carriage object 3230f into the car.

In this case, as shown in FIG. 44 (c), the mobile terminal can successfully load the baby carriage object on the back seat. In doing so, the background operations of the search and change described in FIG. 31 (b) and FIG. 31 (c) can be performed identically.

Subsequently, the mobile terminal may sense a ninth input signal 3210i for the back door 3230g of the car object. For example, the ninth input signal 3210i may correspond to a drag touch for closing the back door of the car object.

In this case, the mobile terminal can inform a user whether the door of the car object is closed in a baby carriage loaded state, whether the car seat is pressed and the like, through an indicator [not shown in FIG. 44].

Namely, through the embodiments of FIGS. 42 to 44, a user can have a virtual experience of loading a baby carriage despite that the baby carriage is not actually loaded on a back seat of a car.

Figure 45:
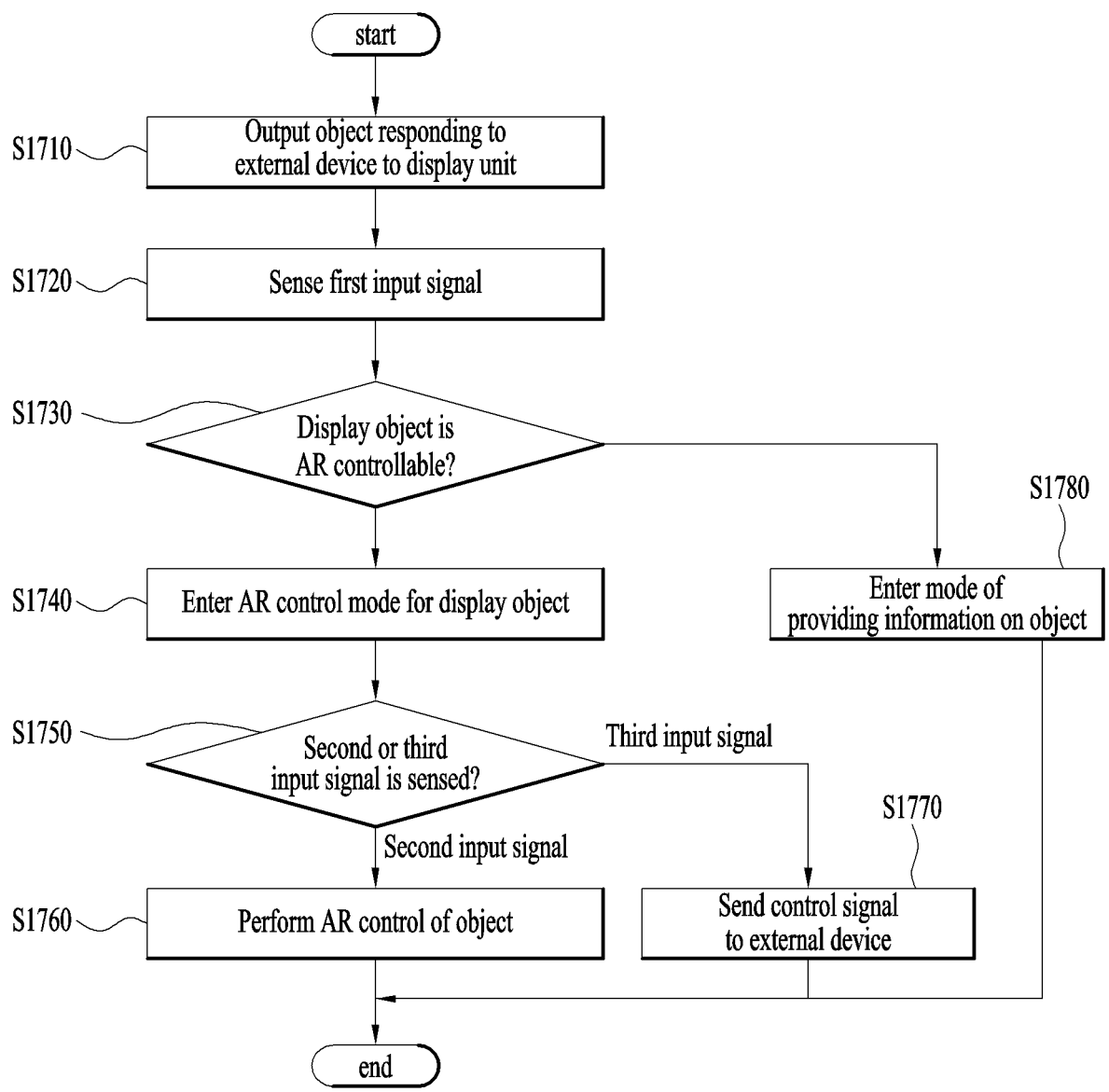
FIG. 45 is a flowchart for a method of controlling a mobile terminal according to one embodiment of the present invention.

FIG. 45 is a flowchart for a method of controlling a mobile terminal according to one embodiment of the present invention. The respective steps of FIG. 45 can be controlled by the controller of FIG. 1A.

First of all, a mobile terminal can output an object responding to an external device to a display unit [S1710]. As described in FIG. 30, the mobile terminal can output the object responding to the external device, which is sensed from a view angle area of a camera in a camera application running state, to the display unit.

The mobile terminal can sense a first input signal [S1720]. For example, the first input signal may correspond to a long press touch input to the display unit.

The mobile terminal can determine whether a display object is AR controllable [S1730]. If the display object is AR controllable in the step S1730, the mobile terminal can enter an AR control mode for the display object [S1740].

In this case, as described in FIG. 30, the mobile terminal can output a visual indicator or an audio indicator to indicate that the AR control mode is entered.

The mobile terminal can sense a second or third input signal [S1750]. If the second input signal is sensed in the step S1750, the mobile terminal can perform an AR control of the object [S1770]. Here, the second input signal may correspond to a touch input to the display unit. As described in FIG. 31, in response to the second input signal, the mobile terminal can online or offline extract information for controlling an object responding to an external device. And, the mobile terminal can display the extracted information by matching the extracted information to the object responding to the external device.

In the step S1750, if the third input signal is sensed, the mobile terminal can send a control signal to the external device [S1780]. Here, the third input signal may correspond to a gesture input sensed from the view angle area of the camera.

Moreover, as described in FIG. 35, the mobile terminal can send a control signal of the external device, which is generated according to a relative location of the third input signal for the external device, to the external device. In response to the received control signal, the external device can perform a control operation.

Meanwhile, if the display object is AR uncontrollable, the mobile terminal can enter a mode of providing information on the display object [S1790].

Figure 46:
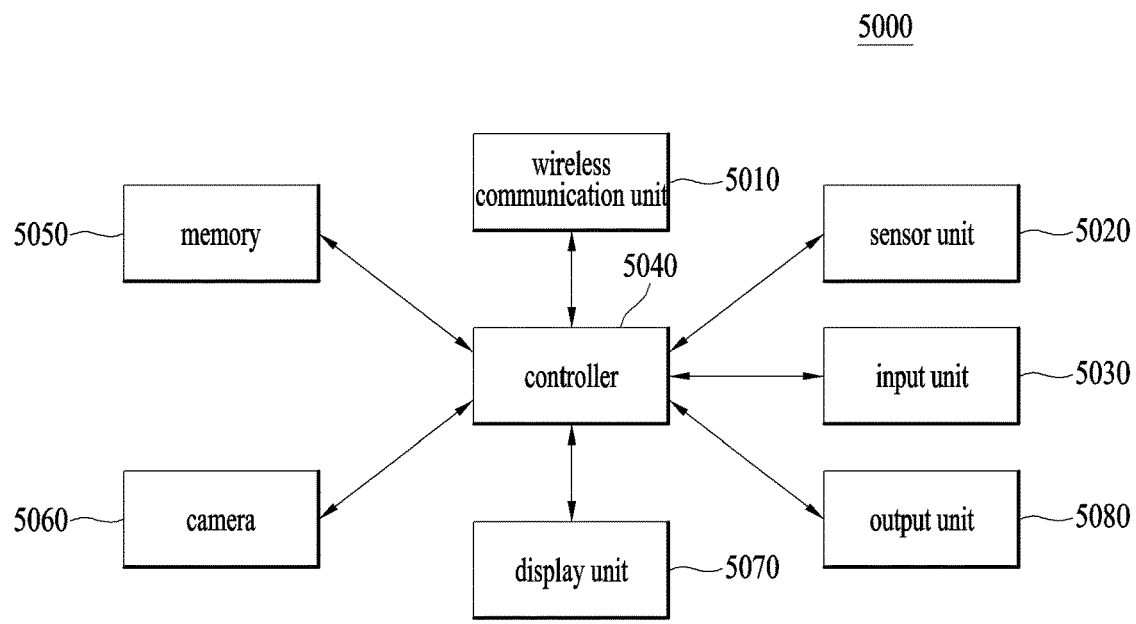
FIG. 46 is a diagram for a configuration of a wearable device according to one embodiment of the present invention.

FIG. 46 is a diagram for a configuration of a wearable device according to one embodiment of the present invention.

Referring to FIG. 46, a wearable device 5000 includes a wireless communication unit 5010, a sensor unit 5020, an input unit 5030, a controller 5040, a memory 5050, a camera 5060, a display unit 5070, and an output unit 5080.

The wireless communication unit 5010 transceives data with an external device.

The sensor unit 5020 detects at least one of a specific motion of a user wearing the wearable device, a location of the wearable device and a specific object.

The input unit 5030 receives a first specific input including at least one of a gesture, a touch input and a voice from a user.

The controller 5040 activates the camera based on the user's detected specific motion, photographs a specific object using the activated camera, receives a first specific input including at least one of a gesture and a voice from a user through the input unit, sends an image of the photographed specific object to the external device through the wireless communication unit, receives relevant information of the specific object, which responds to the image of the specific object, from the external device through the wireless communication unit, saves the image of the photographed specific object and the relevant information of the specific object received from an external server to the memory in response to the received first specific input, and displays at least one of the image of the specific object and the relevant information of the specific object on a screen if a confirmed distance between the user and the specific object is within a specific distance. Here, the relevant information of the specific object includes location information of the specific object.

The memory 5050 stores the relevant information of the specific object including the image of the photographed specific object and the location of the specific object.

The camera 5060 photographs the specific object.

The display unit 5070 displays at least one of the image of the specific object and the relevant information of the specific object in response to a control command from the controller 5040.

The output unit 5080 outputs a guide broadcast guiding a location of the specific object in response to a control command from the controller 5040.

Figure 47:
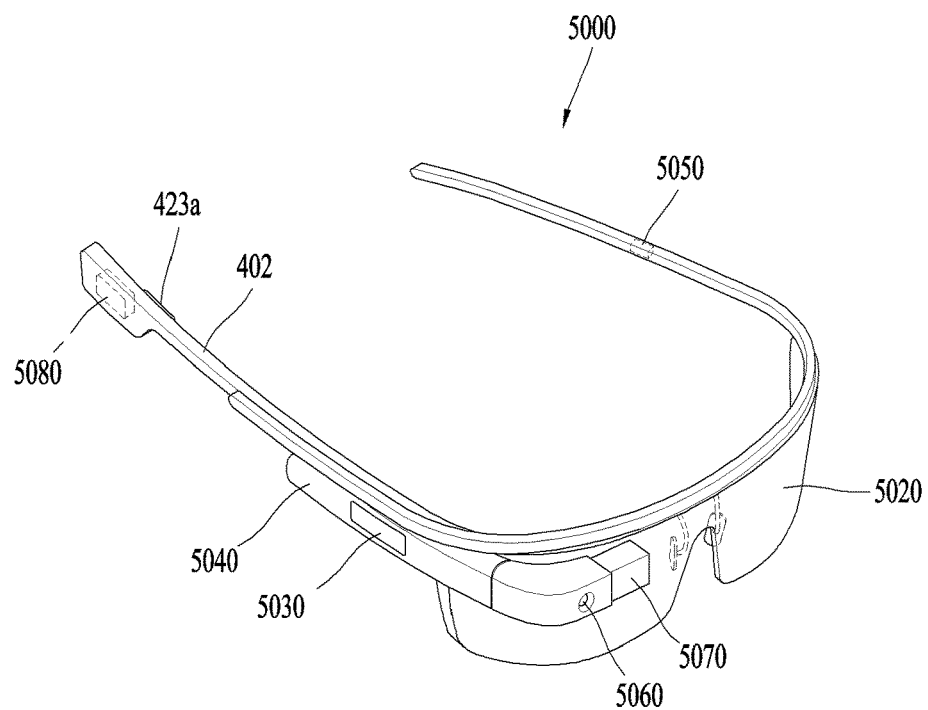
FIG. 47 is a perspective diagram a wearable device according to one embodiment of the present invention.

FIG. 47 is a perspective diagram a wearable device according to one embodiment of the present invention.

Referring to FIG. 47, illustrated is a perspective diagram of a wearable device 500 of a glass type. According to one embodiment of the present invention, like FIG. 47, a wireless communication unit 5010, a sensor unit 5020, an input unit 5030, a controller 5040, a memory 5050, a camera 5060, a display unit 5070, and an output unit 5080 can be disposed.

Figure 48:
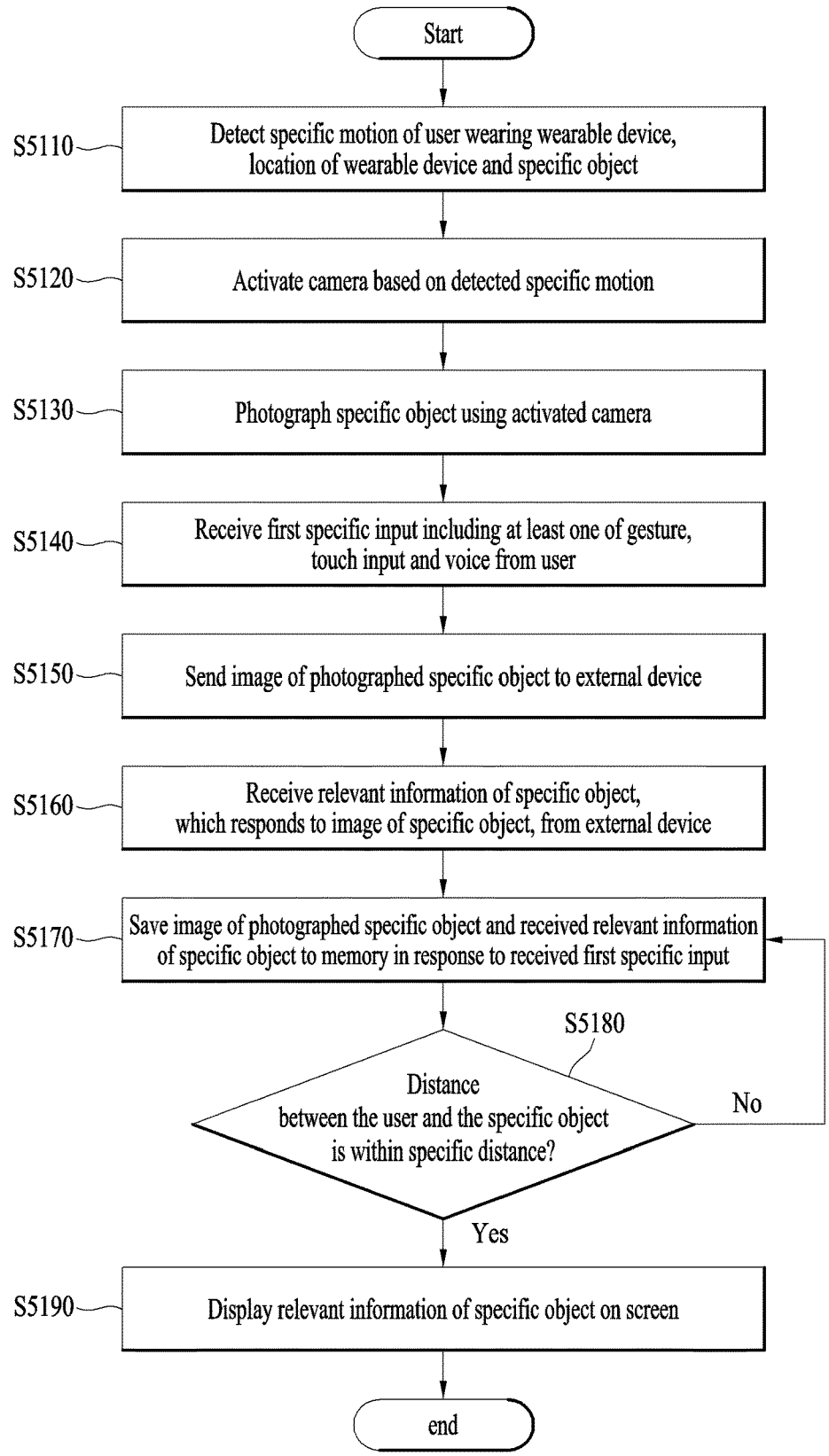
FIG. 48 is a flowchart for a method of controlling a wearable device according to one embodiment of the present invention.

FIG. 48 is a flowchart for a method of controlling a wearable device according to one embodiment of the present invention. The present invention is executed by the controller 5040.

Referring to FIG. 48, at least one of a specific motion of a user wearing the wearable device, a location of the wearable device and a specific object is detected [S5110].

The controller 5040 activates the camera based on the user's detected specific motion [S5120].

The controller 5040 photographs a specific object using the activated camera [S5130].

The controller 5040 receives a first specific input including at least one of a gesture, a touch input and a voice from the user [S5140].

The controller 5040 sends an image of the photographed specific object to the external device [S5150].

The controller 5040 receives relevant information of the specific object, which responds to the image of the specific object, from the external device [S5160].

The controller 5040 saves the image of the photographed specific object and the received relevant information of the specific object to the memory in response to the received first specific input [S5170].

If a distance between the user and the specific object is within a specific distance [S5180], the controller 5040 displays at least one of the image of the specific object and the relevant information of the specific object on a screen [S5190]. Here, the distance between the user and the specific object means a distance between the wearable device and the specific object.

If the distance between the user and the specific object is not within the specific distance [S5180], the controller saves the image of the photographed specific object and the received relevant information of the specific object to the memory [S5170].

Figure 49:
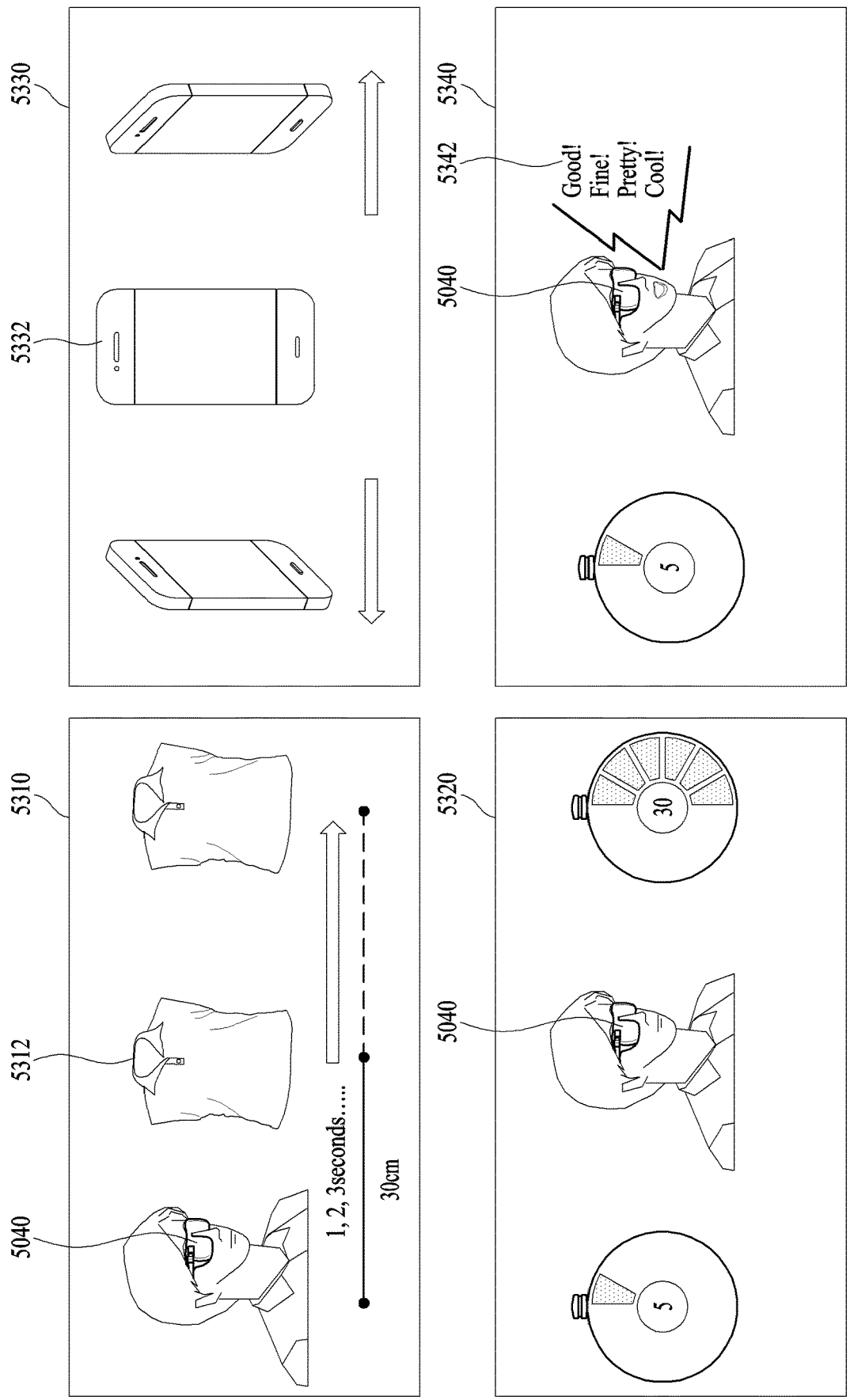
FIG. 49 is a diagram showing that a camera is activated by a user's specific motion according to one embodiment of the present invention.

FIG. 49 is a diagram showing that a camera is activated by a user's specific motion according to one embodiment of the present invention.

With reference to FIG. 49, described is whether a camera is activated in a prescribed situation. A user's normal walk is clearly different from a hesitant walk due to interest in a specific thing in a specific store. Namely, if the user gazes in a direction different from a moving direction or user's eyes stop at a specific thing for a long time despite the same moving direction, the user may be regarded as interested in the specific thing. In such a case, a camera is activated for a while. If the user takes a specific gesture on the specific thing, the camera captures an image of the specific thing.

Like an embodiment 5310, if a specific object 5312 sensed by the sensor unit 5020 is sensed in a prescribed distance over a prescribed time, the controller 5040 activates the camera 5060. The sensor unit 5020 includes an IR (infrared) laser sensor (not shown). The IR laser sensor measures a distance between a specific object and a wearable device.

For example, if a user examines a specific product 5312 in a distance within 30 cm over 3 seconds, maintains this state, and then keeps back from the specific product 5312, the camera 5060 is turned on. Namely, the user looks at the specific product closely and then puts it down.

Like an embodiment 5320, if a user's moving distance sensed by the sensor unit 5020 is within a prescribed distance within a prescribed time, the controller 5040 activates the camera 5060. The sensor unit 5020 senses the user's moving distance with reference to GPS coordinates change.

For example, if the user stays at a specific place over 2 minutes without movement or stays at a specific store over 10 minutes, the controller 5040 activates the camera 5060. Namely, the user stays at a store, in which the user is interested, for a long time.

Like an embodiment 5330, if a location of the specific object 5332 sensed by the sensor unit 5020 is changed by a prescribed distance within a prescribed time, the controller 5040 activates the camera 5060. The sensor unit 5020 includes an infrared (IR) laser sensor (not shown). The IR laser sensor measures a distance between a specific object and a wearable device.

For example, while a user holds the specific product 5332 in both hands by maintaining it at an eye height over 10 seconds, if the user looks at the specific product 5332 at various angles, the camera 5060 is turned on. Namely, if the user rotates and observes the specific product 5332 here and there, a location of the specific product 5332 is changed.

Like an embodiment 5340, if receiving a voice 5342 including specific words over a prescribed time at a specific location from a user through the input unit 5030, the controller 5040 activates the camera 5060.

For example, if a voice including specific words 5342 such as Good, Fine, Pretty, Cool and the like is received at a specific location over 1 minute consecutively, the camera 5060 is turned on. Namely, the user keeps talking using a specific word for a specific product in which the user is interested.

Figure 50:
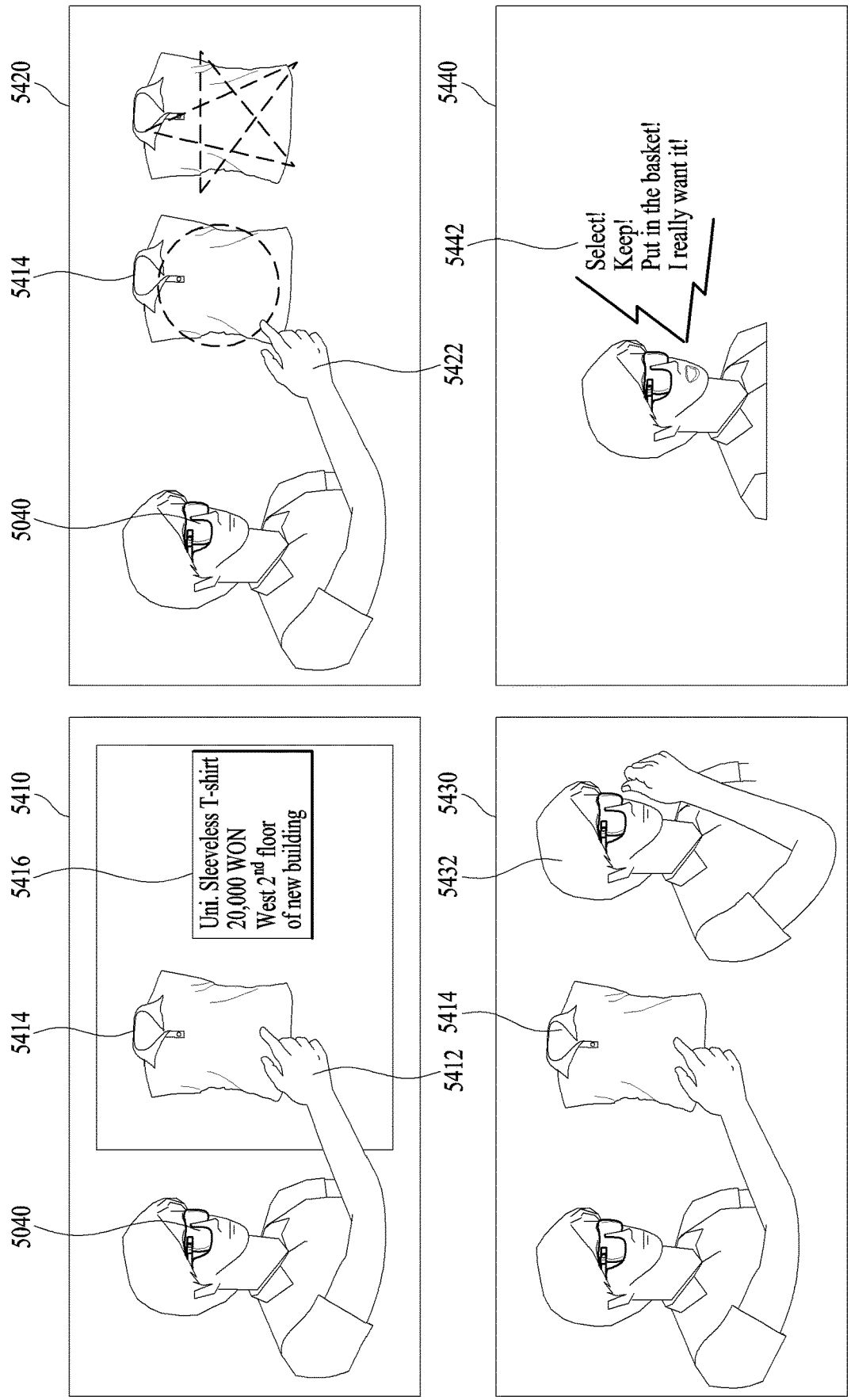
FIG. 50 is a diagram showing an operation of photographing a specific product with a user's specific gesture and voice and then saving an image of the specific product and relevant information of the specific product according to one embodiment of the present invention.

FIG. 50 is a diagram showing an operation of photographing a specific product with a user's specific gesture and voice and then saving an image of the specific product and relevant information of the specific product according to one embodiment of the present invention.

While the camera 5060 is activated, if a specific gesture is received from a user through the input unit 5030, the controller 5040 photographs a specific object and saves an image of the photographed specific object and relevant information of the specific object to the memory 5050. Here, the specific object responds to a specific product.

Like an embodiment 5410, while the camera 5060 is activated, if the sensor unit 5020 senses a gesture 5412 for the user to point at a specific product 5414 with a finger, the camera 5060 photographs the specific product 5414 and saves the image 5414 of the photographed specific product and relevant information 5416 of the specific product to the memory 5050.

Here, the relevant information 5416 of the specific product includes a product name containing a category, a store location, a price, a trademark name of the specific product and the like. For example, if the specific product includes clothes, the relevant information of the specific product includes Uni, Sleeveless T-shirt, 20,000 WON, and West $2^{nd}$ floor of new building.

Like an embodiment 5420, while the camera 5060 is activated, if the sensor unit 5020 senses a gesture 5422 for the user to draw a diagram such as a circle, a star or the like on the specific product 5414 with a finger, the camera 5060 photographs the specific product 5414 and saves the image 5414 of the photographed specific product and relevant information 5416 of the specific product to the memory 5050.

Like an embodiment 5430, while the camera 5060 is activated, if the sensor unit 5020 senses a gesture 5432 for the user to touch a specific product 5414 with a hand and put it into the wearable device worn by the user by bringing the hand closer to the wearable device, the camera 5060 photographs the specific product 5414 and saves the image 5414 of the photographed specific product and relevant information 5416 of the specific product to the memory 5050.

Like an embodiment 5440, while the camera 5060 is activated, if the input unit receives a voice 5442 including specific words from the user, the camera 5060 photographs the specific product 5414 and saves the image 5414 of the photographed specific product and relevant information 5416 of the specific product to the memory 5050.

Here, the specific words may include Select, Keep, Put in the basket, Want it, and the like.

Figure 51:
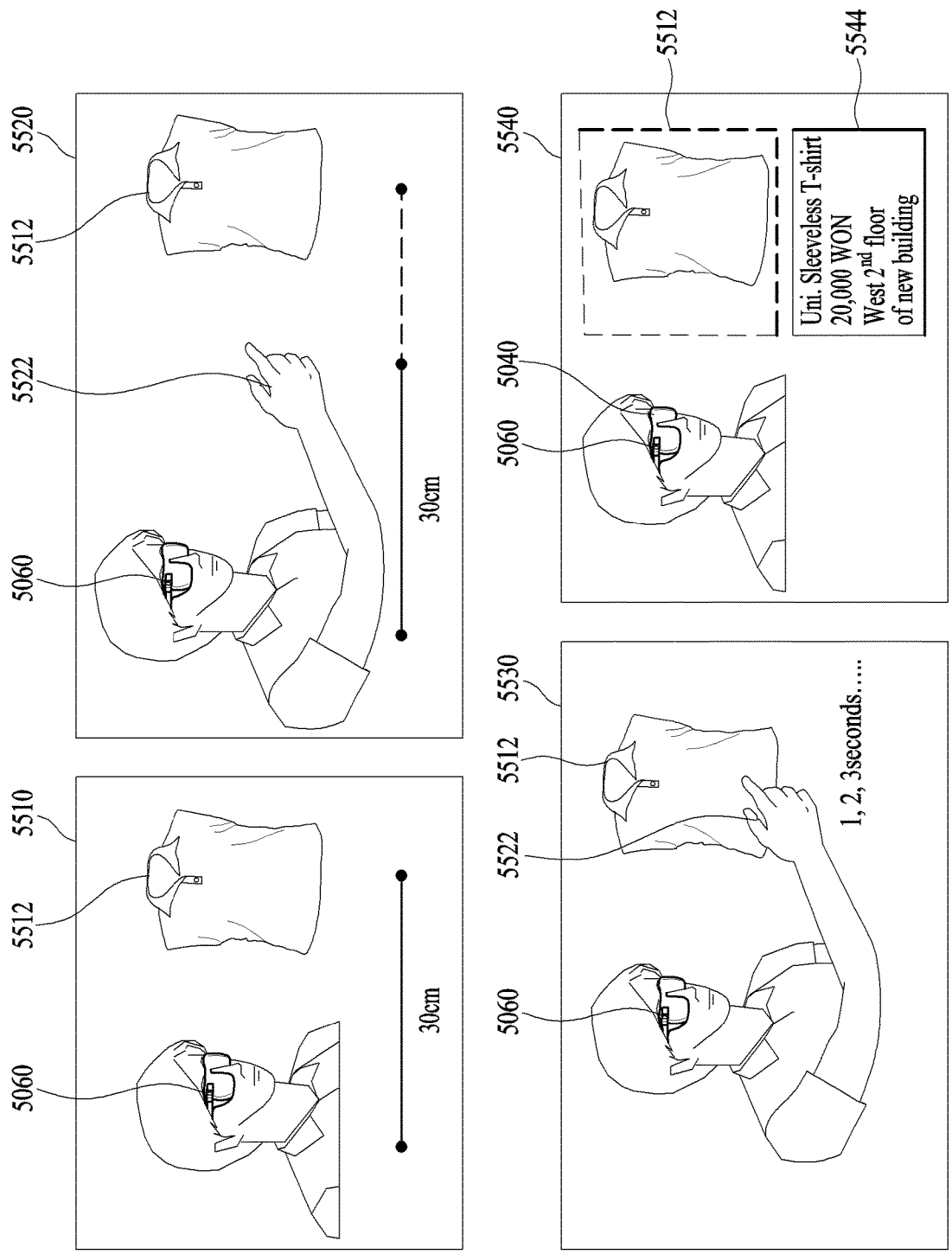
FIG. 51 is a diagram showing an operation of photographing a specific product using a user's specific gesture and then saving an image of the specific product and relevant information of the specific product according to one embodiment of the present invention.

FIG. 51 is a diagram showing an operation of photographing a specific product using a user's specific gesture and then saving an image of the specific product and relevant information of the specific product according to one embodiment of the present invention.

While the camera 5060 is activated, if the controller 5040 senses a specific object 5512 within a prescribed distance over a prescribed time through the sensor unit 5020 and receives a specific gesture from a user through the input unit 5030 according to an increasing distance from the specific object 5512, the controller 5040 photographs the specific object 5512 and saves an image of the photographed specific object and relevant information of the specific object to the memory 5050.

Like an embodiment 5510, a user gazes at a specific product 5512 over a prescribed time within a prescribed distance from the camera 5060. Here, the prescribed time may include 3 seconds and the prescribed distance may include 30 cm.

Like an embodiment 5520, the user puts some distance longer than the prescribed distance between the specific product 5512 and the camera 5060 and points at the specific product 5512 with a finger 5522. The camera 5060 is focused on the specific product 5512.

Like an embodiment 5530, after the embodiment 5510, the user points at the specific product 5512 with the finger over a prescribed time. The camera 5060 is focused on the specific product 5512. Here, the prescribed time may include 3 seconds.

Like an embodiment 5540, after the embodiment 5520 and the embodiment 5530, if the user removes the finger 5522, the camera 5060 photographs the specific object 5512 and the controller 5040 saves an image 5512 of the photographed specific object and relevant information 5544 of the specific object to the memory 5050.

The relevant information 5544 of the specific product includes a product name containing a category, a store location, a price, a trademark name of the specific product and the like. For example, if the specific product includes clothes, the relevant information of the specific product includes Uni, Sleeveless T-shirt, 20,000 WON, and West $2^{nd}$ floor of new building.

Figure 52:
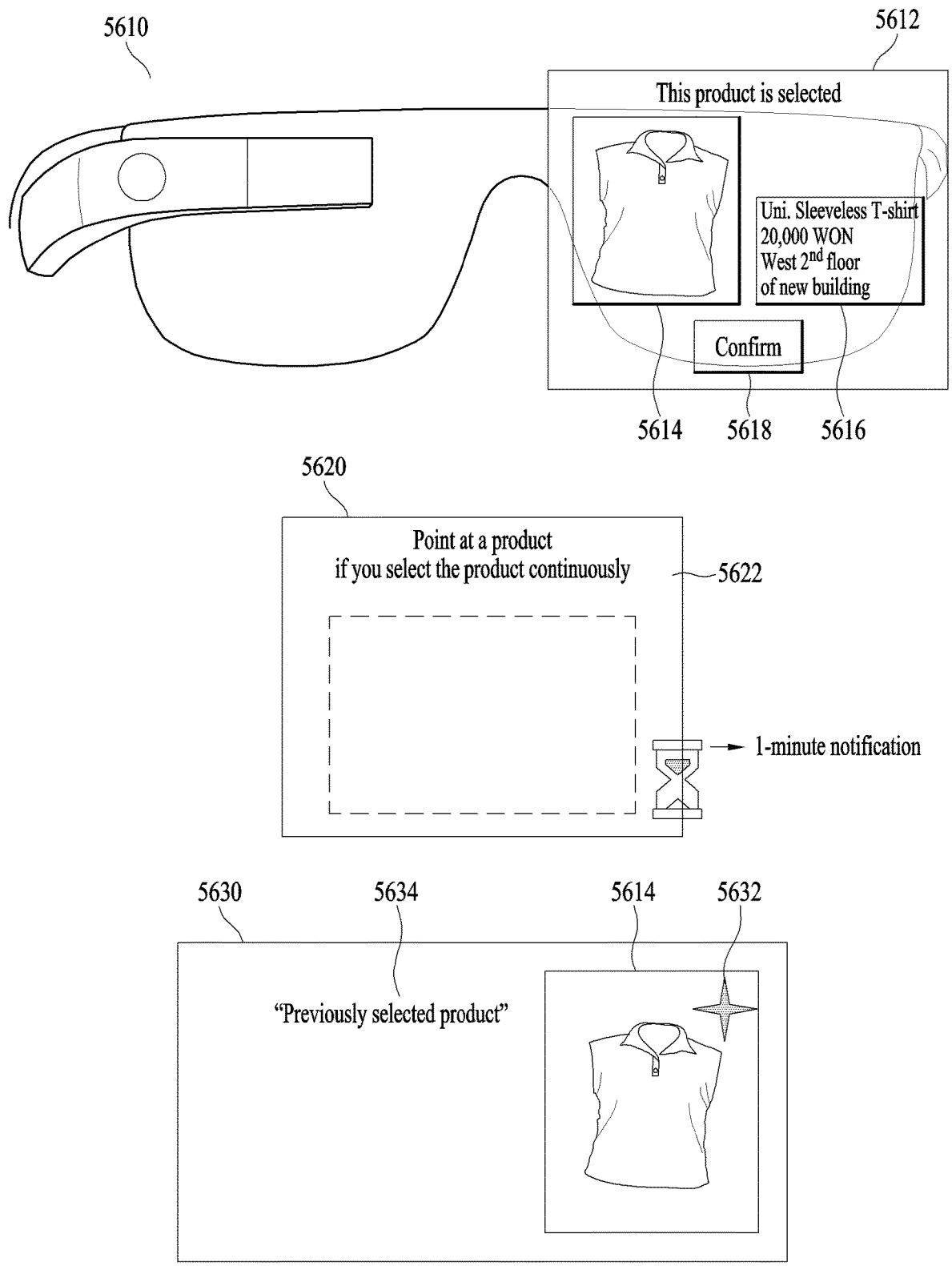
FIG. 52 is a diagram showing an operation of indicating that a specific product is saved and displaying whether to continue to select a product according to one embodiment of the present invention.

FIG. 52 is a diagram showing an operation of indicating that a specific product is saved and displaying whether to continue to select a product according to one embodiment of the present invention.

Like an embodiment 5610, the controller 5040 displays a message box 5612 containing substance for a specific object.

If receiving an input for selecting a specific product 5614 from a user, the controller 5040 displays the message box 5612. The message box 5612 contains the specific product 5614 and information 5616 on the specific product.

If the user sees the specific product and presses a confirm button, the controller 5040 saves an image 5614 of the specific product and the information 5616 on the specific product.

If failing to receive a specific input from the user over a prescribed time, the controller 5040 saves the image 5614 of the specific product and the information 5616 on the specific product to the memory 5050.

If receiving a voice containing a specific word such as 'Put', 'OK' or 'Yes' from the user through the input unit 5030 within a prescribed time, the controller 5040 saves the image 5614 of the specific product and the information 5616 on the specific product to the memory 5050.

If the sensor unit 5020 senses a user's motion of moving a user's head right and left, the controller 5040 does not save the image 5614 of the specific product and the information 5616 on the specific product to the memory 5050 but makes the message box 5612 disappear after expiration of a prescribed time.

If receiving a voce containing a specific word such as 'Don't put' or 'No' from the user through the input unit 5030 within a prescribed time, the controller 5040 does not save the image 5614 of the specific product and the information 5616 on the specific product to the memory 5050 but makes the message box 5612 disappear after expiration of a prescribed time.

A process for a user to continue to select a specific product is described as follows.

If an image captured by the camera 5060 within a prescribed time is a second object different from a first object that is a specific object, the controller 5040 maintains an activated state of the camera 5060.

Like an embodiment 5620, the controller 5040 displays a message box 5622 containing substance 'Point at a thing to continue to select a specific product'.

If a different specific product appears in a lens unit (not shown) of the camera 5060, the controller 5040 maintains the activated state of the camera 5060.

Although the prescribed time expires, if a different specific product does not appear in the lens unit of the camera 5060, the controller 5040 deactivates the camera 5060.

Like an embodiment 5630, if a product appearing in the lens unit of the camera 5060 is identical to a specific product stored in the memory 5050, the controller 5040 displays a message box 5630 containing a substance 5634 and an icon 5632 that indicate the product previously selected by the user.

Figure 53:
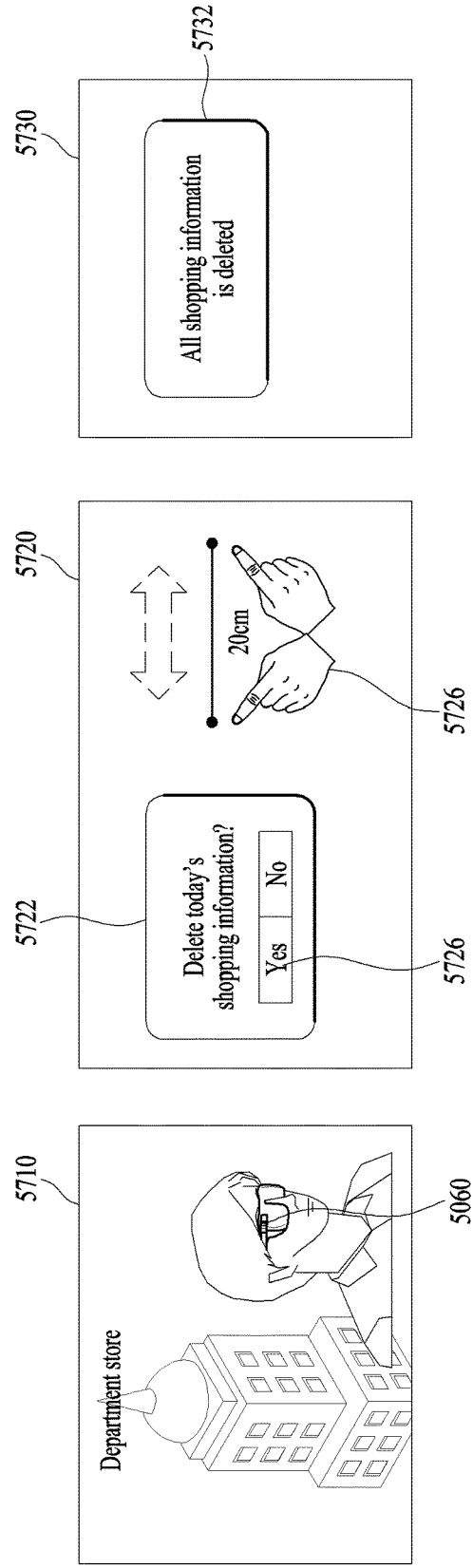
FIG. 53 is a diagram showing an operation of deleting relevant information of a specific product generated from a department store according to one embodiment of the present invention.

FIG. 53 is a diagram showing an operation of deleting relevant information of a specific product generated from a department store according to one embodiment of the present invention.

If an image captured by the camera 5060 is a specific image, the controller 5040 displays a message box querying whether to delete information. If receiving at least one of a specific gesture, a touch input and a voice containing a specific word from a user, the controller 5040 deletes an image of a specific object and relevant information of the specific object, which are stored in the memory 5050.

Like an embodiment 5710, if the user gets out of a department store, an image captured by the camera 5060 contains a parking lot, an external building, and an external vehicle.

Like an embodiment 5720, the controller 5040 displays a message box 5722 querying whether to delete information.

At least one of a gesture 5724 of moving a finger right and left over 20 cm in the air, a touch input of clicking a Yes button 5726, and a voice containing a specific word such as 'Yes', 'Delete all' or the like is received from the user.

Like an embodiment 5730, in response to the received gesture, touch input or voice, the controller 5040 deletes an image of a specific object and relevant information of the specific object, which are stored in the memory 5050. The controller 5040 displays a message box 5732 containing the substance indicating that shopping information is deleted.

Figure 54:
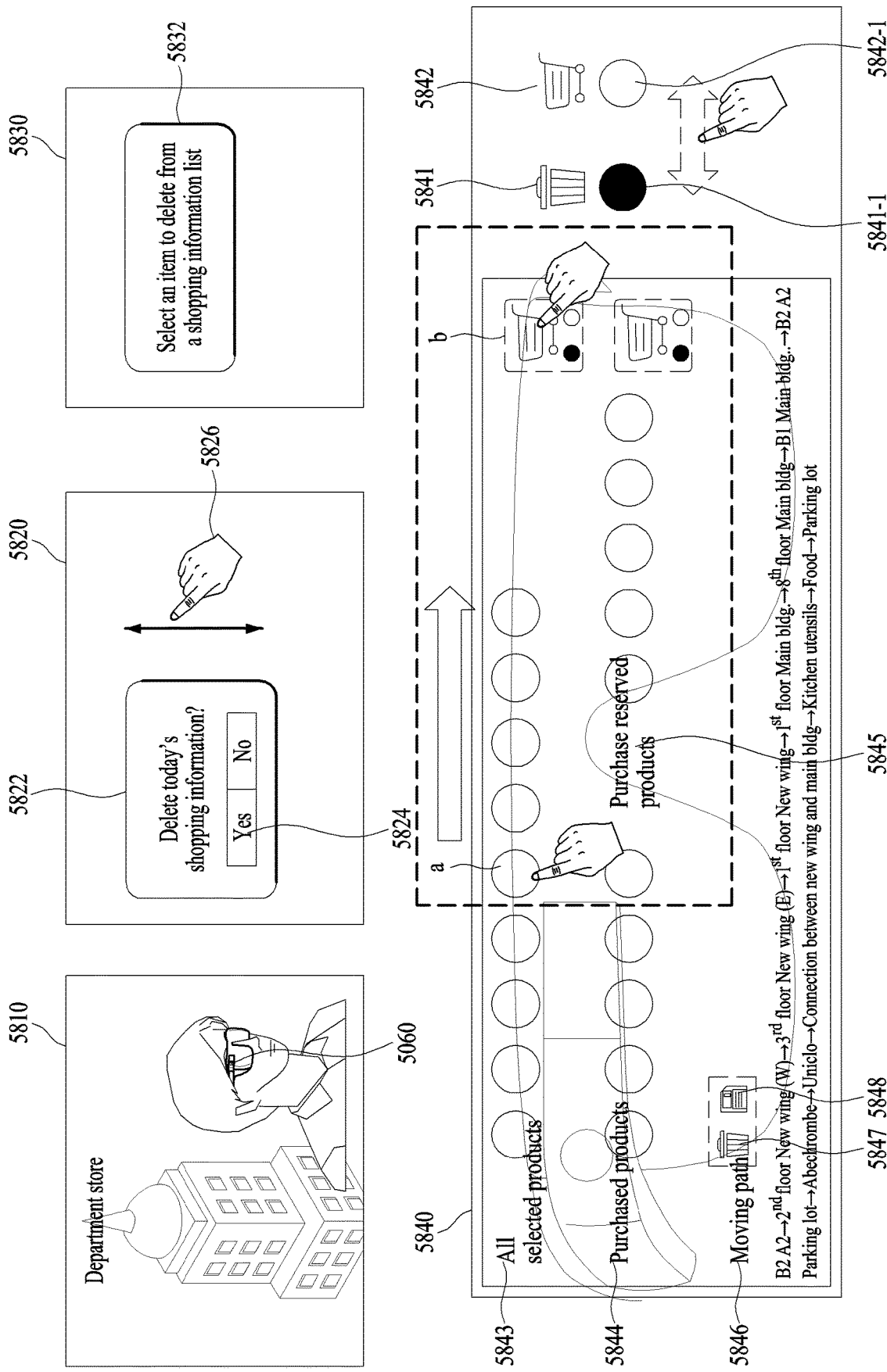
FIG. 54 is a diagram showing an operation of selectively deleting relevant information of a specific product generated from a department store according to one embodiment of the present invention.

FIG. 54 is a diagram showing an operation of selectively deleting relevant information of a specific product generated from a department store according to one embodiment of the present invention.

If an image captured by the camera 5060 is a specific image, the controller 5040 displays a message box querying whether to delete information. If receiving at least one of a specific gesture, a touch input and a voice containing a specific word from a user, the controller 5040 displays an image of sorting out a stored image of a specific object by a specific reference and a specific icon. If receiving a touch input of dragging a specific object image to the specific icon from the user, the controller executes a specific function responding to the specific icon for the specific object image.

Like an embodiment 5810, if the user gets out of a department store, an image captured by the camera 5060 contains a parking lot, an external building, and an external vehicle.

Like an embodiment 5820, if the image captured by the camera 5060 contains the parking lot, the controller 5040 displays a message box 5822 querying whether to delete information.

At least one of a gesture 5826 of moving a finger up and down by a prescribed distance in the air, a touch input 5824 of touching a Yes button, and a voice containing a specific word such as 'Delete partially' or the like is received from the user.

Like an embodiment 5830, in response to the received response, the controller 5040 displays a message box 5832 containing the substance 'Select an item to delete from a shopping information list'.

Like an embodiment 5040, if a prescribed time expires after displaying the message box 5832, the controller 5040 displays images 5843 to 5847 resulting from sorting out images of specific objects by specific references and icons 5841 and 5842 for executing specific functions.

Particularly, the images resulting from sorting out images of specific objects by specific references may include 'all user-selected products' 5843, 'purchased products' 5844, 'purchase reserved products' 5845, 'moving path' 5846, a moving path delete icon 5847, a moving path save icon 5848, and the like.

If receiving an input of touching the delete icon 5847 from the user, the controller 5040 deletes the moving path 5846 all. If receiving an input of touching the save icon 5848 from the user, the controller 5040 saves the moving path 5846 to the memory 5050.

Here, the controller 5040 displays an image of a product purchased by the user and a corresponding product information per category. The user's purchased product is linked to a delete icon 5841 and a shopping basket icon 5842, and the user's moving path is linked to the delete icon 5847 and the save icon 5848.

In an embodiment 5840, when a specific icon b is the shopping basket icon 5842, a process for a user to select a specific product is described.

A touch input for selecting a specific product a is received from the user, and a touch input of dragging an image of the selected specific product a to a shopping basket icon b is received from the user.

The controller 5040 executes a function responding to the shopping basket icon for the specific product a selected in response to the received touch input. Namely, the controller 5040 saves the image of the specific product a and relevant information of the specific product a to the memory 5050.

If the specific icon is the delete icon 5841, the controller 5040 does not save the image of the specific product a and relevant information of the specific product a to the memory 5050 but delete them.

Particularly, the specific icon b may become one of the delete icon 5841 and the shopping basket icon 5842. A toggle switch can indicate that the icon is selected. If a touch input for selecting the delete icon 5841 is received from the user, the toggle switch 5841-1 responding to the delete icon 5841 is enabled. If a touch input for selecting the shopping basket icon 5842 is received from the user, the toggle switch 5842-1 responding to the shopping basket icon 5842 is enabled.

Figure 55:
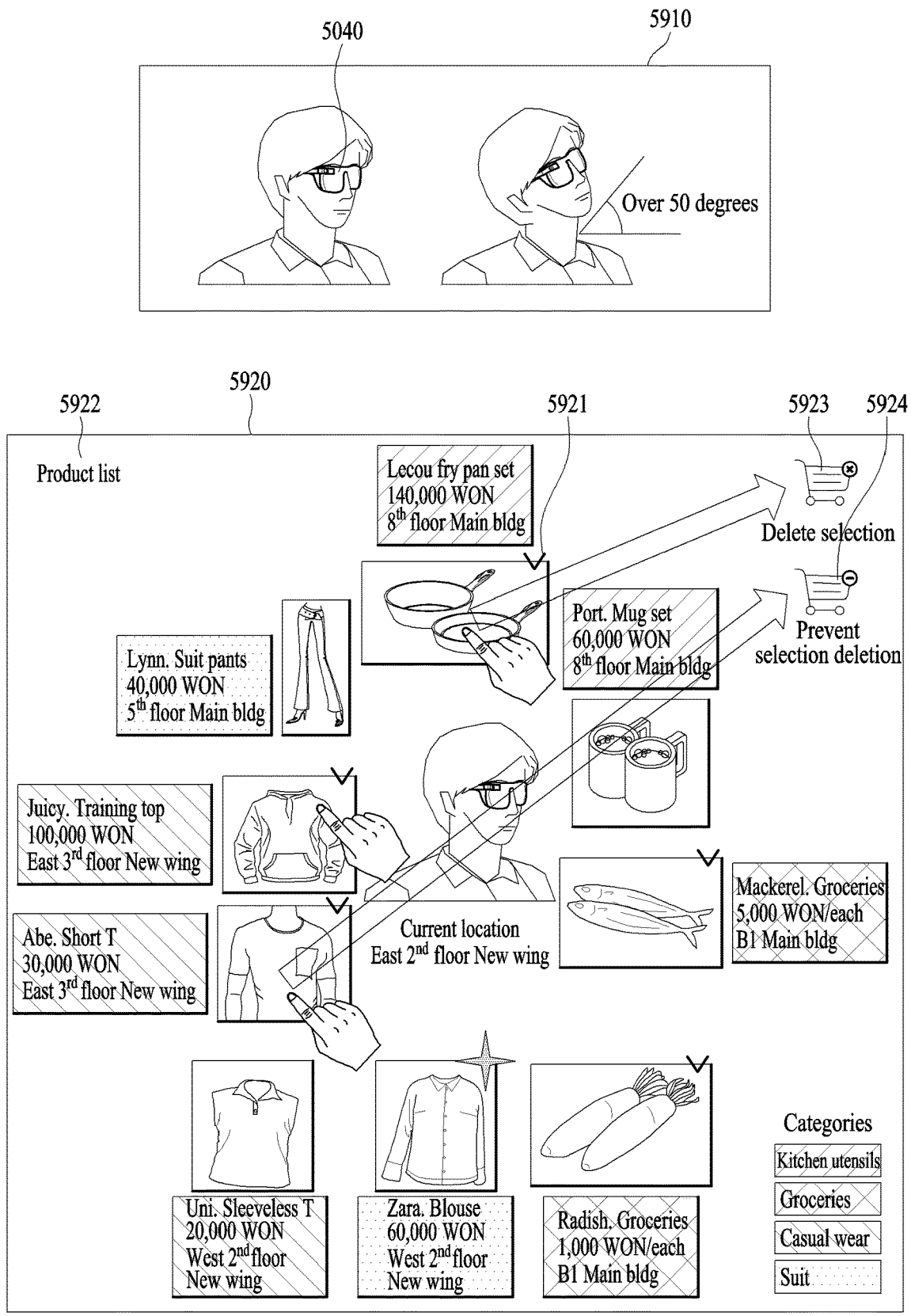
FIG. 55 is a diagram showing an operation of calling out an image of a product selected by a user and relevant information of the product again and then arranging specific products on the basis of a specific reference according to one embodiment of the present invention.

FIG. 55 is a diagram showing an operation of calling out an image of a product selected by a user and relevant information of the product again and then arranging specific products on the basis of a specific reference according to one embodiment of the present invention.

If a user's motion sensed at a specific location by the sensor unit 5020 is a specific motion, the controller 5040 displays a list containing an image of a specific object of which selection input is received from a user and relevant information of the specific object.

Like an embodiment 5910, if the user raises a user's head upward over a prescribed angle in a specific store, the sensor unit 5020 senses the user's motion as a specific motion. Here, the prescribed angle may be 50 degrees.

Like an embodiment 5920, the controller 5040 displays a list 5922 of products selected by the user so far.

While the product list 5922 is displayed, if the user lowers the head, the controller 5040 keeps displaying the product list 5922. If the user raises the head over a prescribed angle and then lowers it, the controller 5040 makes the product list 5922 disappear.

A process for arranging the product list 5922 is described as follows.

If receiving a first touch input from the user, the controller 5040 can arrange a specific object image, of which selection input from the product list 5922 is received from the user, per category. Here, the categories include kitchen utensils, groceries, casual wear, suit, etc.

If receiving a second touch input from the user, the controller 5040 can arrange a specific object image, of which selection input from the product list 5922 is received from the user, in order close to a current location. The specific object is saved to the memory 5050 together with relevant information of the specific object which includes location information of a store. Hence, based on the location information of a specific object located place, the controller 5040 can arrange the specific object image in order close to the current location.

If receiving a touch input of touching a purchase-desired one of images of specific products from the user, the controller 5040 displays a separate selection check icon 5921. The selection check is linked to a selection delete icon 5923 and a selection deletion prevent icon 5924.

The selection delete icon 5923 and the selection deletion prevent icon 5924 are described as follows.

If receiving a touch input of dragging to move an image of a specific object to a specific icon from a user, the controller 5040 executes a function responding to the specific icon on the image of the specific object.

For example, if receiving a touch input of dragging an image of a selection-checked specific product to the selection delete icon 5923 from the user, the controller 5040 unchecks the specific product.

If receiving a touch input of dragging an image of a selection-checked specific product to the selection deletion prevent icon 5924 from the user, the controller 5040 executes a selection deletion preventing function. Here, the selection deletion preventing function is a function of preventing shopping information from being deleted despite executing shopping information deletion after a user gets out of a specific store.

According to the present invention, after a user has gotten out of a specific store, although shopping information deletion is executed, the selection deletion preventing function is executed. After expiration of a prescribed time, when the user revisits the specific store, the user can use shopping information of the previous shopping. Therefore, user convenience can be enhanced.

Figure 56:
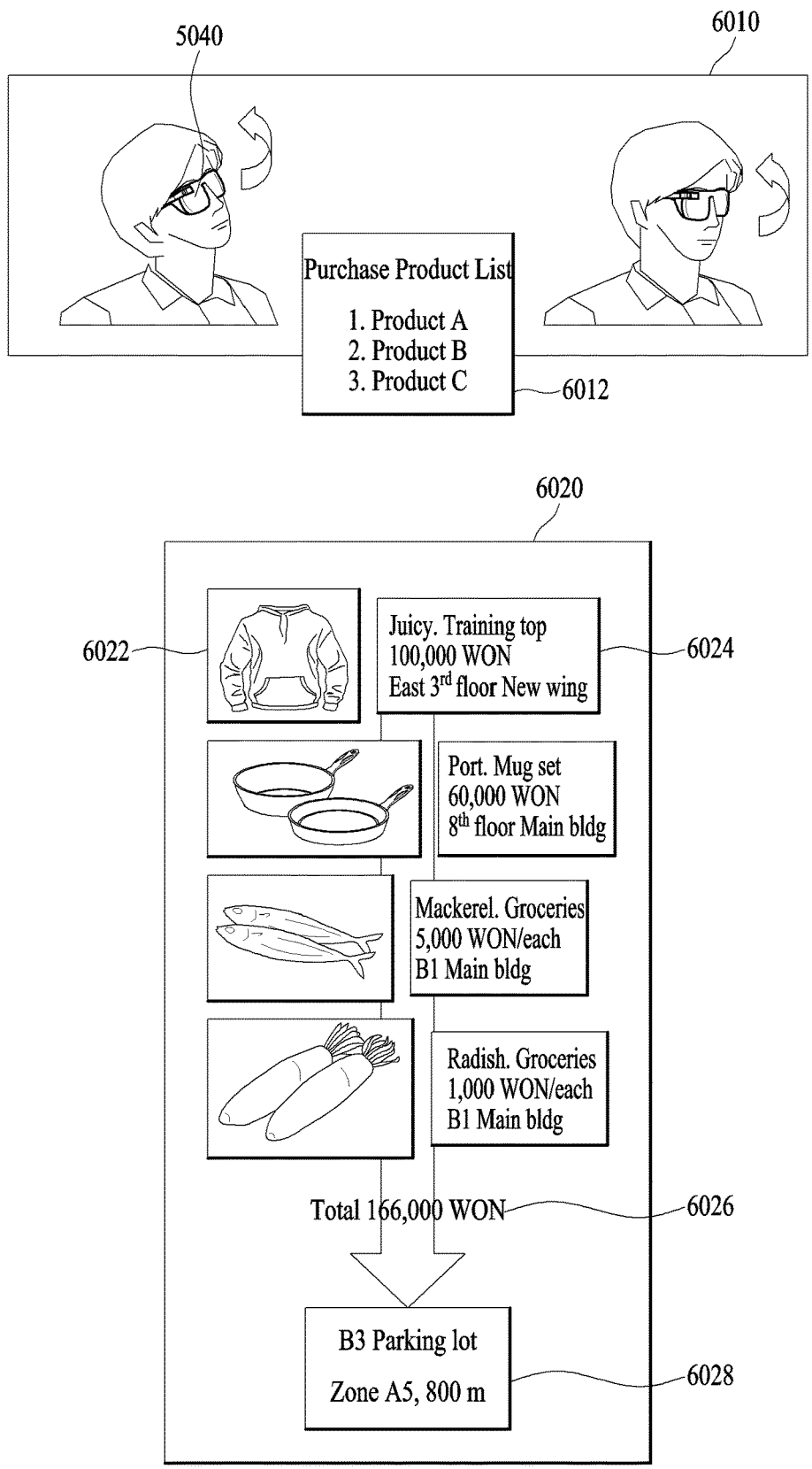
FIG. 56 is a diagram showing that, if a user selects products to purchase, the user watches the selected products by collecting them based on a specific reference, according to one embodiment of the present invention.

FIG. 56 is a diagram showing that, if a user selects products to purchase, the user watches the selected products by collecting them based on a specific reference, according to one embodiment of the present invention.

After receiving a first input for selecting an image of a specific object from a list from a user, while the list is displayed, if a user's motion sensed by the sensor unit 5020 is a specific motion, the controller 5040 displays a screen containing at least one of the image of the specific object responding to the first input, relevant information of the specific object and a moving path from a current location to a specific location.

After the user selects a product to purchase from a selected product list, while the selection list is displayed, if the user turns a user's head in a specific direction, the sensor unit 5020 senses such an action.

Like an embodiment 6010, while the user raises the user's head and watches a selection list, if the user turns the user's head in a right direction, the controller 5040 displays a purchase product list 6012.

While the user lowers the user's head and watches a selection list, if the user turns the user's head in a right direction, the controller 5040 displays a purchase product list 6012.

If the user looks straight ahead, the controller 5040 displays the selection list.

According to the present invention, if a user turns a head in a specific direction, the controller 5040 displays a purchase product list. A modification function of the purchase product list can be executed by receiving an input of 'Check' or 'Uncheck' in the embodiment 5920 from the user.

In an embodiment 6020, a process for if a product to be purchased by a user is selected, displaying a selected product, a store information for purchasing the product, a moving path to a store, a purchase price, and a shortest distance to a parking lot is described as follows.

Like the embodiment 6020, the controller 5040 displays a screen containing an image 6022 of a purchase product, a product information 6024 of the purchase product, a shortest distance 6028 to a parking lot from a current location, and a total purchase price 6026.

According to the present invention, if a product to be purchased by a user is selected, a user can be intuitively aware where a prescribed product can be purchased and how a user should move along a prescribed moving line, whereby user convenience is enhanced.

Figure 57:
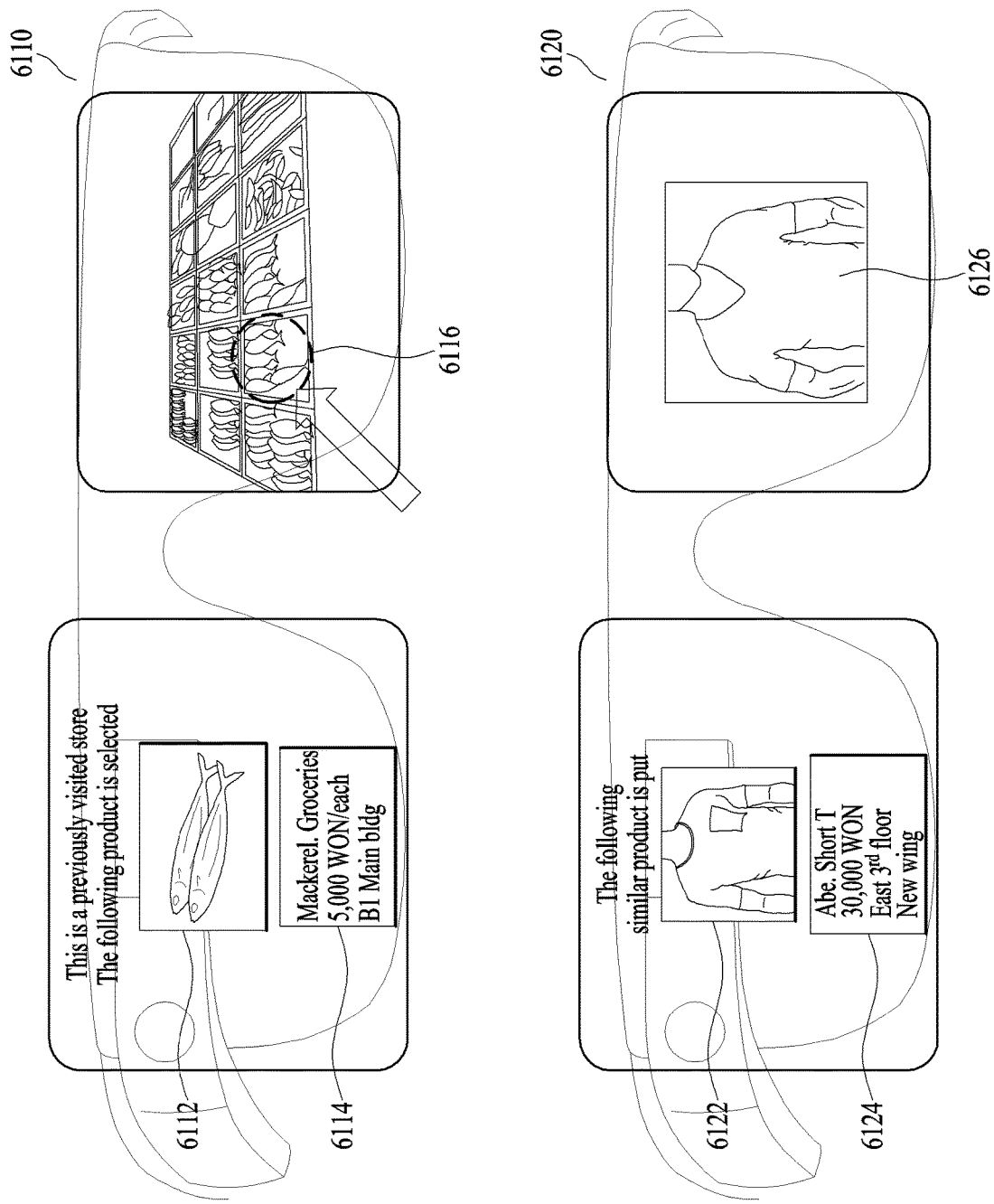
FIG. 57 is a diagram showing an operation of displaying an image of a specific product if a user revisits a specific store and an operation of displaying a stored shopping information if the user selects a product similar to a previously selected product, according to one embodiment of the present invention.

FIG. 57 is a diagram showing an operation of displaying an image of a specific product if a user revisits a specific store and an operation of displaying a stored shopping information if the user selects a product similar to a previously selected product, according to one embodiment of the present invention.

Like an embodiment 6110, the controller 5040 received a current location and a selection input from a user a prescribed time ago. If a distance from a location of a specific object previously stored in the memory 5050 is within a prescribed distance, the controller 5040 displays an image 6112 of the specific object and relevant information 6114 of the specific object.

Namely, if a user re-visits a specific store previously visited by the user, the image 6112 of the specific product and the relevant information 6114 of the specific product, which are stored in the memory 5050, are displayed.

Here, the controller 5040 displays an indicator 6116 indicating a location of the specific object 6112 on a current screen by overlaying the screen with the indicator.

According to the present invention, the user can be intuitively aware of the location of the previously selected specific product 6112 through the indicator 6116. The indicator 6116 can be displayed in a manner that an edge of the indicator flickers.

Moreover, the controller 5040 can output a guide broadcast of the location of the specific store through the output unit 5080. For example, if the user revisits the previously visited specific store, the guide broadcast indicating a location of a specific product located store, i.e., B1 of a main building can be outputted.

In an embodiment 6120, a process for if the user selects a product similar to an already selected product, displaying shopping information stored in the memory 5050 is displayed as follows.

Like an embodiment 6120, if similarity between an image 6126 of a specific object currently captured by the camera 5060 and an image of a specific object stored in the memory 5050 lies within a prescribed range, the controller 5040 displays an image 6122 of the specific object and relevant information 6124 of the specific object, which are stored in the memory 5050.

Here, if the similarity between the product image captured by the camera 5060 and the product image stored in the memory 5050 is equal to or higher than 70%, the controller 5040 determines that they are similar and displays the specific product image 6122 and the relevant information 6124 of the specific product.

Moreover, if a category of the product image captured by the camera 5060 is equal to that of the product image stored in the memory 5050, the controller 5040 determines that they are similar and displays the image 6122 of the specific product and the relevant information 6124 of the specific product.

Here, the categories include one-piece dress, wear, necktie, and shirt. For example, if the category is shirt, the controller 5040 determines that T-shirt and Y-shirt are similar to each other.

According to the present invention, if a user selects a product similar to a previously selected product, as shopping information stored in the memory 5050 is displayed, a user can easily recognize a previously shopped similar product, whereby user convenience can be enhanced.

Figure 58:
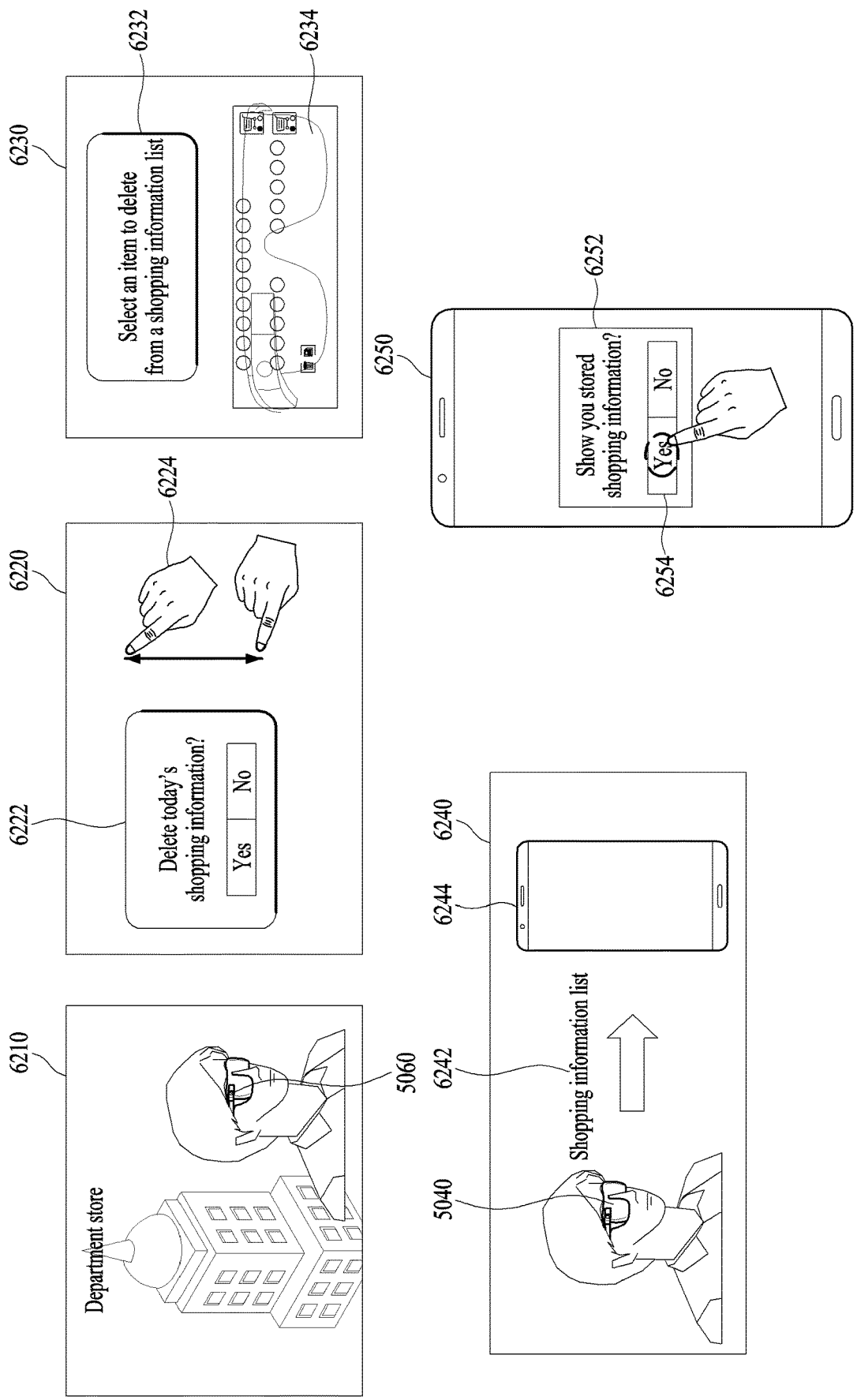
FIG. 58 is a diagram showing that a user organizes shopping information after finishing shopping and leaving a department store, according to one embodiment of the present invention.

FIG. 58 is a diagram showing that a user organizes shopping information after finishing shopping and leaving a department store, according to one embodiment of the present invention.

Like an embodiment 6210, as a user gets out of a department store, the camera 5060 captures a parking lot, an external building or the like. If the image captured by the camera 5060 is the parking lot, the external building or the like, the controller 5040 determines that the user got out of the department store.

Like an embodiment 6220, the controller 5040 displays a message box 6222 querying whether to delete information and receives a specific gesture input 6224 of waving a finger up and down from the user.

Like an embodiment 6230, in response to the specific gesture input 6224, the controller 5040 displays a message box 6232 for selecting an item to delete and a shopping list 6234. If receiving an input for selecting the item to delete from the user, the controller 5040 deletes an image of a specific product and relevant information of the specific product, which are stored in the memory 5050.

Here, the shopping information list includes an image of a specific product and relevant information of the specific product.

Like an embodiment 6240, after organizing the shopping information list, the controller 5040 sends the shopping information list 6242 to an external device 6244.

Like an embodiment 6250, the controller 5040 displays a message box 6252 containing the substance 'Show you the shopping information list'. If receiving a touch input 6254 of touching a button 'Yes' from the user, the controller 5040 displays the shopping information list.

According to the present invention, after leaving a specific store, a user can organize shopping information using a simple gesture and move the organized shopping information to a mobile device having a wide screen from a wearable device. Therefore, the user can watch the organized shopping information through the wide-screen mobile device, whereby user convenience is enhanced.

Figure 59:
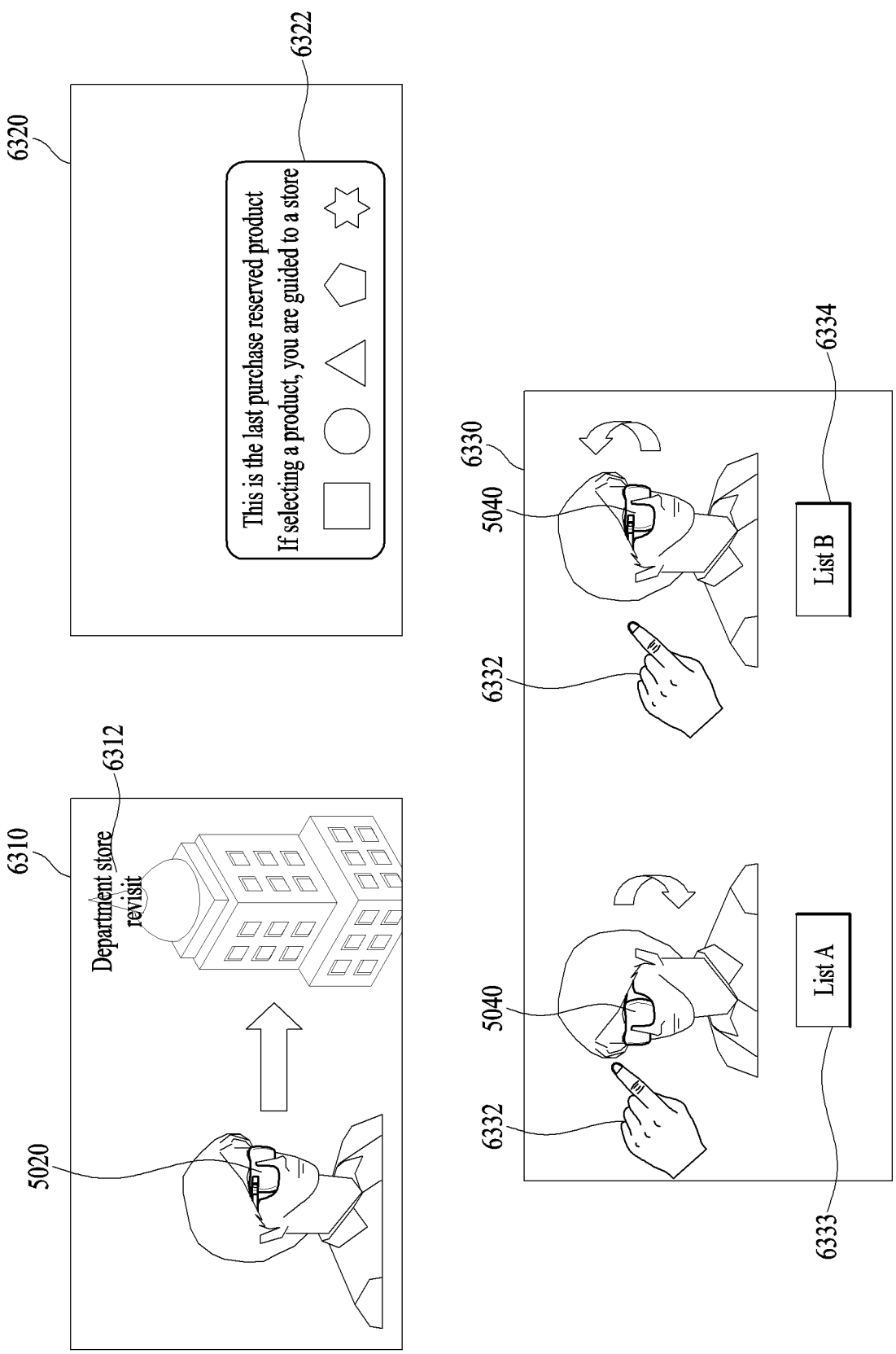
FIG. 59 is a diagram showing an operation of displaying previous shopping information stored in a memory to a user, when the user revisits a department store, according to one embodiment of the present invention.

FIG. 59 is a diagram showing an operation of displaying previous shopping information stored in a memory to a user, when the user revisits a department store, according to one embodiment of the present invention.

Like an embodiment 6310, after expiration of a prescribed time, the controller 5040 detects that a location sensed by the sensor unit 5020 is a specific location 6312 stored in the memory 5050.

Like an embodiment 6320, the controller 5040 displays a list 6322 including an image of a specific object, which is stored in the memory 5050 and for which a specific input indicating a purchase is not received from a user.

According to the present invention, after time passes, as a user revisits a specific store, if the controller 5040 recognizes that the user has entered the specific store, the controller 5040 displays a list including an image of a purchase reserved product selected by the user in a previous visit. If receiving an input for selecting an image of a product from the user, the controller 5040 outputs a guide broadcast for guiding the user to a store.

In an embodiment 6330, if the user turns a head in a right or left direction while touching a specific part of wearable glasses, the user can see a purchase list of different contents according to a direction. Such a process is described as follows.

Like an embodiment 6330, the controller 5040 receives a specific touch input 6332 from the user through the input unit 5030. If a user's motion sensed by the sensor unit 5020 is a specific motion, the controller 5040 differently displays a list 6333/6334 including an image of a specific object based on the specific motion.

For example, after an input of touching a specific part 6332 of the wearable device is received from the user through the input unit 5030, if a user's motion sensed by the sensor unit 5020 is a user's motion of moving a user's head in a right direction, the controller 5040 displays the list 6333 of products selected by the user today.

After an input of touching a specific part 6332 of the wearable device is received from the user through the input unit 5030, if a user's motion sensed by the sensor unit 5020 is a user's motion of moving a user's head in a left direction, the controller 5040 displays the list 6334 of products selected by the user in a previous visit.

According to the present invention, when a user sees a purchase list, if the user turns a user's head in a right direction, the user can see a list of products selected today. Or, if the user turns a user's head in a left direction, the user can see a list of products selected in a previous visit. Therefore, the user can see a different list through a simple action, whereby user convenience is enhanced.

FIG. 60 is a diagram showing an operation of if a user selects a specific product stored in a memory when revisiting a department store, guiding a route to a store having the specific product, according to one embodiment of the present invention.

Like an embodiment 6410, if receiving an input 6414 for selecting an image 6412 of a specific object from a user, the controller 5040 displays a screen 6420/6430/6440 for guiding the user to a specific object located place from a current location.

According to the present invention, if a user wanders each store, the controller 5040 saves an image of a product selected by the user and product information including location information of a store to the memory 5050. If receiving an input for selecting an image of a specific product from the user, the controller 5040 displays the screen 6420/6430/6440 for guiding a path to the product.

Like an embodiment 6420, the controller 5040 displays an indicator 6422 indicating a location of a specific object in a manner that a current screen is overlaid with the indicator 6422 and outputs a guide broadcast 6424 for guiding the location of the specific object through the output unit 5080.

Here, the guide broadcast includes the contents of 'Go down by 1 floor and then proceed to a passage connected to a main building.'

Like an embodiment 6430, the controller 5040 displays an indicator 6432 indicating a location of a specific object in a manner that a current screen is overlaid with the indicator 6432 and outputs a guide broadcast 6434 for guiding the location of the specific object through the output unit 5080.

Here, the guide broadcast includes the contents of 'Go to a main building through a passage.'

Like an embodiment 6440, the controller 5040 displays an indicator 6442 indicating a location of a specific object in a manner that a current screen is overlaid with the indicator 6442 and outputs a guide broadcast 6444 for guiding the location of the specific object through the output unit 5080. The controller 5040 displays an indicator 6446 indicating the location of the specific object differently from the indicator 6442.

Here, the guide broadcast includes the contents of 'Go to $8^{th}$ floor by escalator.'

According to the present invention, by displaying an indicator indicting a location of a sales store of a specific product differently from an indicator indicating a path, a user can be intuitively aware that the user arrives at a specific store. Therefore, user convenience is enhanced.

Figure 61:
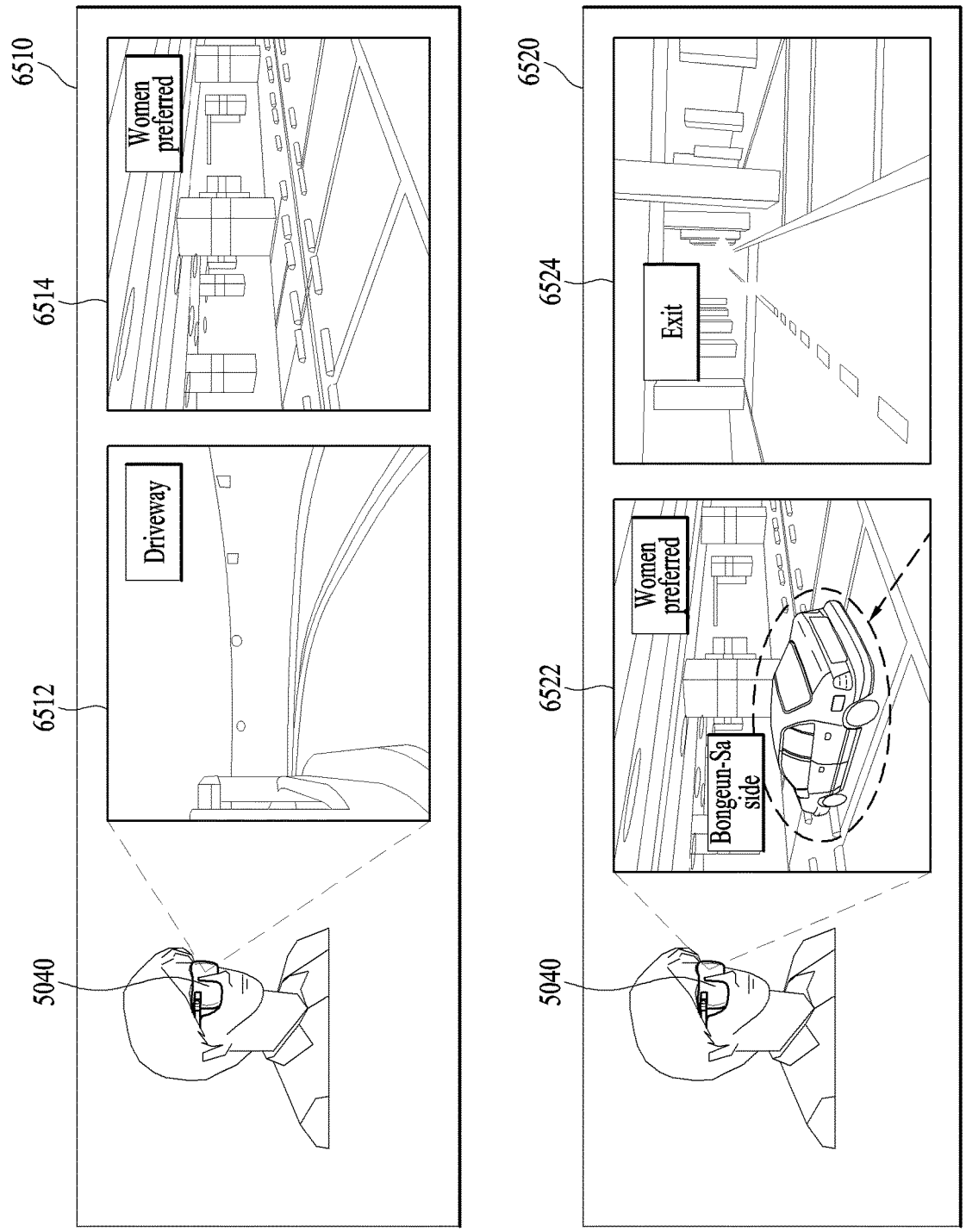
FIG. 61 is a diagram showing that a user utilizes stored information when entering the parking lot, according to one embodiment of the present invention.

FIG. 61 is a diagram showing that a user utilizes stored information when entering the parking lot, according to one embodiment of the present invention.

Like an embodiment 6510, if a user's car enters a parking lot, the controller 5040 receives parking information, which includes a driveway 6512, a women preferred parking zone 6514, a parking space close to an elevator, a vacant parking space and the like, from an external device and displays the received parking information.

If the parking information cannot be received from the external device, the camera 5060 captures images of the driveway and the women preferred parking zone and the controller 5040 saves the captured driveway image 6512 and the captured women preferred parking zone image 6514 to the memory 5050.

Moreover, the controller 5040 saves a moving path in the parking lot and a parking location to the memory 5050.

According to the present invention, when a user's car enters the parking lot, parking information received from an external device can be provided and a moving path in the parking lot and a parking location can be memorized. Therefore, user convenience is enhanced.

In an embodiment 6520, a process for when a user's car leaves a parking lot, providing the user with parking information is described.

Like the embodiment 6520, after expiration of prescribed time, if a location sensed by the sensor unit 5030 is a parking lot, the controller 5040 displays a screen 6522 that guides a user to a parking location where the user's car is parked. If the sensor unit 5020 senses that the car is moving, the controller 5040 displays a screen 6524 that guides the user to a path to an exit.

Namely, if the user returns to the parking lot after expiration of prescribed time, the controller 5040 guides the user to a zone where the user's car is parked. If the user gets in the car and then leaves the parking lot, the controller 5040 displays a path to the exit based on the moving path in the parking lot stored in the memory 5050.

Figure 62:
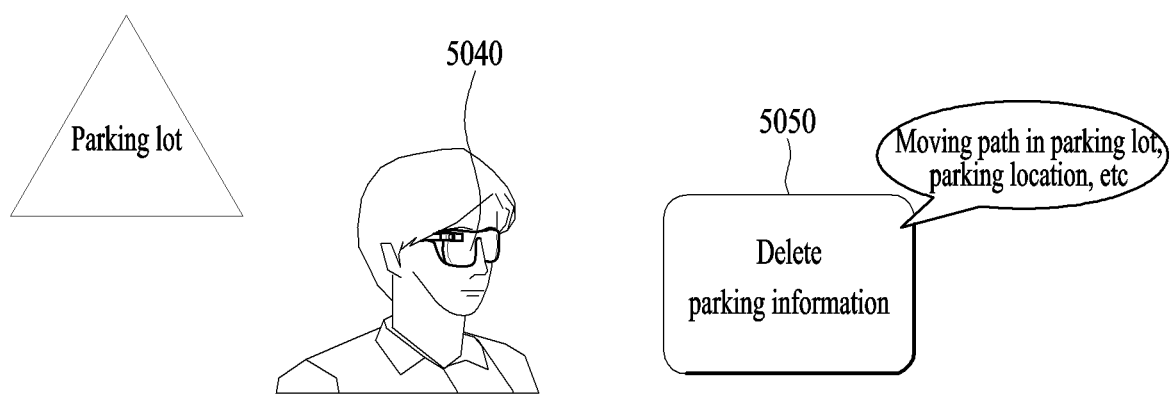
FIG. 62 is a diagram showing that a user deletes stored information when leaving the parking lot, according to one embodiment of the present invention.

FIG. 62 is a diagram showing that a user deletes stored information when leaving the parking lot, according to one embodiment of the present invention.

Referring to FIG. 62, if the sensor unit 5020 senses that a car is located outside the parking lot, the controller 5040 automatically deletes parking information stored in the memory 5050.

FIG. 63 is a diagram showing an operation of when there is a fender bender, activating a camera and processing accident information, according to one embodiment of the present invention.

Like an embodiment 6710, as minor collision is caused in the parking lot, shock and tremble are generated. If the sensor unit 5020 senses the shock and tremble, the controller 5040 activates the camera 5060. The camera 5060 creates an accident video image 6712 by photographing the accident video in response to a control command from the controller 5040.

First of all, described is a case that a user waves a finger upward.

If the sensor unit 5020 senses a motion 6714 of waving a finger upward, the controller 5040 sends an accident video image 6712 to a server of a user-subscribed insurance company and connects a phone call to the insurance company by sensing a call signal to the insurance company.

In doing so, if there are a plurality of insurance companies, right after the motion 6714 of moving the finger upward, the controller 5040 displays an insurance company list 6715 and receives an input for selecting the entire insurance companies or a specific insurance company from the user.

Secondly, described is a case that a user waves a finger downward.

If the sensor unit 5020 senses a motion 6716 of waving a finger downward, the controller 5040 saves the accident video image 6712 to the memory 5050. In this case, although the car is located outside the parking lot, the controller 5040 does not delete the accident video image 6712.

In an embodiment 6720, described is a case that the user leaves the parking lot.

Like the embodiment 6720, as the user leaves the parking lot, if the sensor unit 5020 photographs the panorama outside the parking lot, external buildings and the like, the controller 5040 displays a message box 6722 querying whether to delete the accident video image. If receiving an input 6726 of touching a Yes button 6724 from the user, the controller 5040 deletes the accident video image 6712 from the memory 5050.

According to the present invention, when information stored in the memory is processed outside a parking lot, data stored in the memory can be efficiently managed by querying whether to delete an image generated except basic information (e.g., use path, location), i.e., an accident video image separately saved on an occasion of an accident.

According to one embodiment of the present invention, if a user wearing a wearable device is interested in a specific object in a specific space, a user can watch an image of a specific object and relevant information of the specific object by photographing the specific object automatically, saving the image of the specific object to a memory, and receiving the relevant information of the specific object from an external device. Therefore, user convenience is enhanced.

According to another embodiment of the present invention, if a user wearing a wearable device visits a specific store and shows an interest in a specific product, a camera can be activated by automatically recognizing that the user is interested in the specific product. Therefore, user convenience is enhanced.

According to further embodiment of the present invention, if a user wearing a wearable device visits a specific store and makes a specific gesture at a specific product, a user can photograph the specific product, save an image of the specific product and information related to the specific product to a memory, and utilize them later. Therefore, user convenience is enhanced.

According to another further embodiment of the present invention, a user can organize shopping information per product in a manner of displaying a shopping information list containing a specific product after the user wearing the wearable device visited a specific store and then finished the shopping. Therefore, user convenience is enhanced.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

MODE FOR INVENTION

Various embodiments are described in 'BEST MODE FOR INVENTION' for implementing the present invention.

INDUSTRIAL APPLICABILITY

The present invention is used for a series of mobile terminal related fields.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a frame configured to include a portable device mounted therein; and
   the portable device mounted in the frame,
   wherein the portable device comprises:
   a display playing a video content,
   a communication interface configured to send data to an external device, and receive data from the external device,
   a sensor configured to sense a direction change of the mobile terminal and sense an input signal,
   a camera configured to capture an object of a user and capture an image within an angle of view, and
   a controller, wherein the display is disposed toward eyes of the user wearing the mobile terminal, and
   wherein the controller is further configured to:
   cause the display to display an object corresponding to the captured external device;

determine when the object corresponding to external device is AR (Augmented Reality) controllable, then enter AR control mode according to a first input signal, cause the communication to transmit a control signal to the external device according to a second input signal, wherein at least one of the first input signal and the second input signal includes a gesture input signal captured by the camera, cause the display to play the video content according to at least the first input signal or the second input signal, determine when a direction of the mobile terminal is changed over a first angle during a play of the video content, then cause the display to display a notification of a submenu responding to the changed direction of the mobile terminal on a first prescribed region of the screen, wherein when the direction of the mobile terminal is changed over a second angle greater than the first angle, the controller is further configured to:

pause the play of the video content, launch the submenu, and cause the display to display a screen for the launched submenu on the first prescribed region, and wherein the first prescribed region comprises a region responding to the changed direction of the mobile terminal and the first prescribed region does not overlap with the paused video content.

2. The mobile terminal of claim 1, wherein the controller is further configured to launch the submenu based on data included in a play screen of the paused video content.

3. The mobile terminal of claim 1, wherein when a preset time or more passes after displaying the screen for the submenu, the controller is further configured to dim a play screen of the paused video content.

4. The mobile terminal of claim 3, wherein when the play screen of the paused video content is dimmed, the controller is further configured to cause the display to display the screen for the submenu in a full screen.

5. The mobile terminal of claim 4, wherein when the screen for the submenu is displayed in the full screen, when the direction of the mobile terminal is changed over the first angle into the direction opposite to the changed direction of the mobile terminal, the controller is further configured to cause the display to display a notification of a play of the paused video content on a second prescribed region, and wherein the second prescribed region includes a region responding to the changed direction of the mobile terminal.

6. The mobile terminal of claim 5, wherein when the direction of the mobile terminal is changed into the direction opposite to the changed direction of the mobile terminal over the second angle greater than the first angle, the controller is further configured to:

cause the display to change the displayed screen for the submenu into a screen for the paused video content, and resume the play of the video content.

7. The mobile terminal of claim 1, wherein when the changed direction of the mobile terminal is a first direction, the submenu comprises a Q&A (question and answer) menu related to data of the currently played video content.

8. The mobile terminal of claim 7, wherein when the Q&A menu is launched, the controller is further configured to:

create a virtual object image responding to the captured object of the user, display the virtual object image on a screen having the Q&A menu launched thereon, sense a movement of the captured object, and move the virtual object image in response to the motion of the captured object.

9. The mobile terminal of claim 8, wherein the controller is further configured to:

cause the display unit to display a second submenu on a running screen of the Q&A menu, and launch the selected second submenu when the virtual object image selects the displayed second submenu.

10. The mobile terminal of claim 7, wherein the controller is further configured to:

search for an answer responding to a question when receiving an input of the question and cause the display to display the searched answer, and connect to an adviser when failing to search for the answer responding to the inputted question.

11. The mobile terminal of claim 1, wherein when the changed direction of the mobile terminal is a second direction, the submenu comprises a search menu related to data of the currently played video content.

12. The mobile terminal of claim 11, wherein when the search menu is launched, the controller is further configured to cause the display to display the search menu for a sub-item related to the data included in a play screen of the paused video content.

13. The mobile terminal of claim 1, wherein when the changed direction of the mobile terminal is a third direction, the submenu comprises an input menu related to data of the currently played video content.

14. The mobile terminal of claim 13, wherein when the input menu is launched, the controller is further configured to: capture an external image using the camera, and cause the display to display a display region of the captured external image and a preset information display region.

15. The mobile terminal of claim 14, wherein when the video content comprises a shopping relevant content, the controller is further configured to: photograph a payment card using the camera, and progress a payment procedure when the photographed payment card is displayed on the external image display region.

16. The mobile terminal of claim 1, wherein when the changed direction of the mobile terminal is a fourth direction, the submenu comprises a control menu of the currently played screen.

17. The mobile terminal of claim 1, wherein when the object corresponding to the external device is AR controllable according to third input signal that is sensed before the first input signal, the controller is further configured to enter AR control mode.

* * * * *